US011906966B2

(12) United States Patent
Yahata

(10) Patent No.: US 11,906,966 B2
(45) Date of Patent: *Feb. 20, 2024

(54) METHOD FOR CONTROLLING ROBOT, ROBOT, AND RECORDING MEDIUM

(71) Applicant: Panasonic Intellectual Property Management Co., Ltd., Osaka (JP)

(72) Inventor: Hiroshi Yahata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/048,464

(22) Filed: Oct. 21, 2022

(65) Prior Publication Data

US 2023/0062175 A1    Mar. 2, 2023

Related U.S. Application Data

(63) Continuation of application No. PCT/JP2021/046669, filed on Dec. 17, 2021.

(30) Foreign Application Priority Data

Dec. 23, 2020 (JP) .................. 2020-214232
Nov. 30, 2021 (JP) .................. 2021-194585

(51) Int. Cl.
*G05D 1/00* (2006.01)
*G05D 1/02* (2020.01)
(Continued)

(52) U.S. Cl.
CPC .......... *G05D 1/0094* (2013.01); *G05D 1/021* (2013.01); *B62D 57/032* (2013.01)

(58) Field of Classification Search
CPC ............. G05D 1/0094; G05D 1/021; G05D 2201/0217; G05D 1/0214; B62D 57/032;
(Continued)

(56) References Cited

U.S. PATENT DOCUMENTS 8,234,009 B2 * 7/2012 Kitahama ............ G05D 1/0246
700/253
8,935,006 B2 * 1/2015 Vu ........................ B25J 9/1697
901/1
(Continued)

FOREIGN PATENT DOCUMENTS

JP    2005-103678    4/2005
JP    2007-102488    4/2007
(Continued)

OTHER PUBLICATIONS

Decision to grant dated May 24, 2023 issued in Japanese patent application No. 2022-522064 along with corresponding English translation.
(Continued)

*Primary Examiner* — Rachid Bendidi
(74) *Attorney, Agent, or Firm* — GREENBLUM & BERNSTEIN, P.L.C.

(57) ABSTRACT

A robot detects, through a sensor, the location and movement direction of a user and an object near the user, sets a nearby ground area in front at the feet of the user according to the detected location and movement direction of the user, controls an illumination device in the robot to irradiate the nearby ground area with light while driving at least one pair of legs or wheels of the robot to cause the robot to accompany the user, specifies the type and the location of the detected object, and if the object is a dangerous object and is located ahead of the user, controls the illumination device to irradiate a danger area including at least a portion of the
(Continued)

dangerous object with light in addition to irradiating the nearby ground area with light.

3 Claims, 33 Drawing Sheets

(51) Int. Cl.
 *B62D 57/00* (2006.01)
 *B62D 57/032* (2006.01)

(58) Field of Classification Search
 CPC ............ B25J 5/00; B25J 9/1656; B25J 13/00; G08B 21/02; G08B 25/04; H04M 11/00
 See application file for complete search history.

(56) References Cited

U.S. PATENT DOCUMENTS

| | | | |
|---|---|---|---|
| 9,174,342 | B2 | 11/2015 | Pinter |
| 9,530,058 | B2 | 12/2016 | Moore |
| 10,532,003 | B2 | 1/2020 | Yu |
| 11,213,943 | B2 | 1/2022 | Kim |
| 11,231,706 | B1 | 1/2022 | Curlander |
| 11,372,408 | B1 | 6/2022 | Webster |
| 11,703,881 | B2 * | 7/2023 | Chen ............... G05D 1/0242 700/245 |
| 2005/0096790 | A1 | 5/2005 | Tamura |
| 2006/0106496 | A1 * | 5/2006 | Okamoto ........... G05D 1/0278 700/255 |
| 2007/0192910 | A1 | 8/2007 | Vu |
| 2010/0063627 | A1 | 3/2010 | Kitahama |
| 2012/0101632 | A1 | 4/2012 | Ha |
| 2013/0131985 | A1 | 5/2013 | Weiland |
| 2013/0184980 | A1 | 7/2013 | Ichikawa |
| 2016/0188977 | A1 | 6/2016 | Kearns |
| 2017/0136631 | A1 | 5/2017 | Li |
| 2019/0375094 | A1 | 12/2019 | Kim |
| 2021/0154827 | A1 | 5/2021 | Kim |
| 2022/0003569 | A1 | 1/2022 | Maeda |
| 2022/0155092 | A1 | 5/2022 | Lam |
| 2022/0027637 | A1 | 10/2022 | Madden |
| 2023/0099265 | A1 | 3/2023 | Ouellette |
| 2023/0315117 | A1 | 10/2023 | Komuro |

FOREIGN PATENT DOCUMENTS

| | | |
|---|---|---|
| JP | 2007-234066 | 9/2007 |
| JP | 2007-264950 | 10/2007 |
| JP | 2007-316924 | 12/2007 |
| JP | 2008-307658 | 12/2008 |
| JP | 2015-016080 | 1/2015 |
| JP | 2016-194742 | 11/2016 |
| JP | 2017-047519 | 3/2017 |
| JP | 2019-079248 | 5/2019 |
| WO | 2018/074069 | 4/2018 |
| WO | 2021171291 | 9/2021 |

OTHER PUBLICATIONS

International Search Report of PCT application No. PCT/JP2021/046669 dated Mar. 15, 2022.
International Search Report of PCT application No. PCT/JP2021/046670 dated Mar. 8, 2022.
International Search Report of PCT application No. PCT/JP2021/046668 dated Feb. 15, 2022.
Decision to grant dated May 24, 2022 issued in Japanese patent application No. 2022-68735 along with corresponding English translation.
Decision to grant dated Sep. 6, 2022 issued in Japanese patent application No. 2022-515096 along with corresponding English translation.
Decision to grant dated Feb. 7, 2023 issued in Japanese patent application No. 2022-566174 along with corresponding English translation.

* cited by examiner

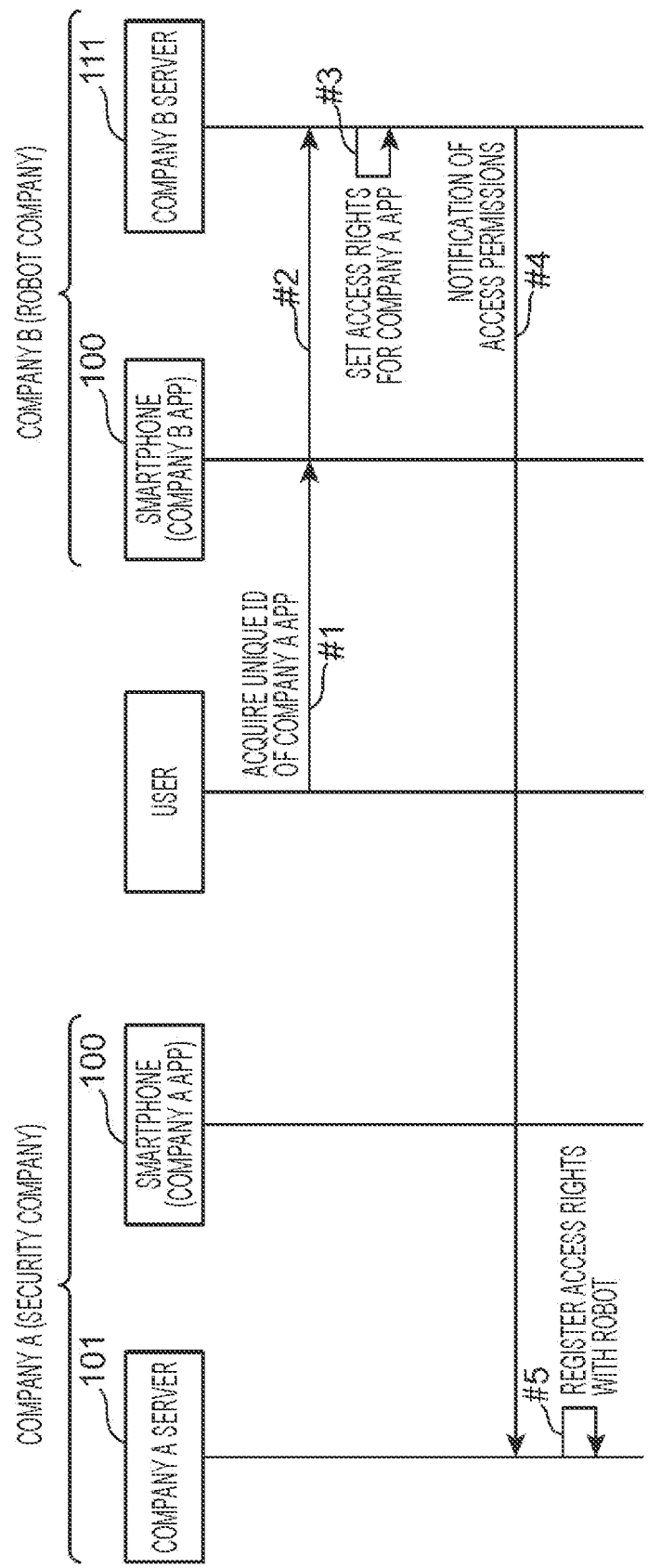

FIG. 5

| TYPE OF ACCESS RIGHT | | PERMISSION LEVEL (ONLY LEVELS OTHER THAN "0: NOT PERMITTED" LISTED) |
|---|---|---|
| SENSOR | CAMERA IMAGE | 1: ONLY STILL IMAGES PERMITTED<br>2: UP TO LOW-QUALITY VIDEO PERMITTED<br>3: ALL PERMITTED |
| | DISTANCE MEASUREMENT SENSOR | 1: PERMITTED |
| | INFRARED SENSOR | 1: PERMITTED |
| | MICROPHONE AUDIO | 1: PERMITTED |
| | TACTILE SENSOR | 1: ONLY PARTIALLY PERMITTED<br>2: ALL PERMITTED |
| | TEMPERATURE/HUMIDITY/BAROMETRIC SENSOR | 1: PERMITTED |
| | LOCATION SENSOR | 1: PERMITTED |
| | EXPRESSION-CHANGING SKILLS | 1: PERMITTED |
| | VOCALIZATION SKILLS | 1: PERMITTED |
| | POSE-CHANGING SKILLS | 1: ONLY HEAD PERMITTED<br>2: ALL PERMITTED |
| MOTOR SKILLS | MOBILITY SKILLS | 1: LOW-SPEED MOVEMENT PERMITTED ONLY IN APPROVED AREA INSIDE HOME<br>2: LOW-SPEED MOVEMENT PERMITTED IN APPROVED AREA INSIDE/OUTSIDE HOME<br>3: HIGH-SPEED MOVEMENT PERMITTED IN APPROVED AREA INSIDE/OUTSIDE HOME<br>4: ALL PERMITTED |

FIG. 6

| TYPE OF ACCESS RIGHT | | PERMISSION LEVELS FOR "AT HOME" SECURITY MODE | PERMISSION LEVELS FOR "WALK" SECURITY MODE |
|---|---|---|---|
| SENSOR | CAMERA IMAGE | 2: UP TO LOW-QUALITY IMAGES PERMITTED | 3: ALL PERMITTED |
| | DISTANCE MEASUREMENT SENSOR | 0: NOT PERMITTED | 1: PERMITTED |
| | INFRARED SENSOR | 0: NOT PERMITTED | 1: PERMITTED |
| | MICROPHONE AUDIO | 1: PERMITTED | 1: PERMITTED |
| | TACTILE SENSOR | 0: NOT PERMITTED | 0: NOT PERMITTED |
| | TEMPERATURE/HUMIDITY/ BAROMETRIC SENSOR | 1: PERMITTED | 1: PERMITTED |
| | LOCATION SENSOR | 1: PERMITTED | 1: PERMITTED |
| MOTOR SKILLS | EXPRESSION-CHANGING SKILLS | 1: PERMITTED | 1: PERMITTED |
| | VOCALIZATION SKILLS | 1: PERMITTED | 1: PERMITTED |
| | POSE-CHANGING SKILLS | 1: ONLY HEAD PERMITTED | 1: ONLY HEAD PERMITTED |
| | MOBILITY | 1: LOW-SPEED MOVEMENT PERMITTED ONLY INSIDE APPROVED HOME | 3: HIGH-SPEED MOVEMENT PERMITTED INSIDE/ OUTSIDE APPROVED HOME |
| ILLUMINATION FUNCTION | | OFF | ON |

SECURITY MODE (AT HOME)

SECURITY MODE (WALK)

LOW BATTERY

METHOD FOR CONTROLLING ROBOT, ROBOT, AND RECORDING MEDIUM

BACKGROUND

1. Technical Field

The present disclosure relates to a technology that provides the skills of a robot to external parties.

2. Description of the Related Art

Japanese Unexamined Patent Application Publication No. 2007-264950 discloses, for the objective of deterring crime against a specific person, a robot capable of moving alongside the specific person, in which the robot uses a display and a speaker to announce that the robot is monitoring the specific person and to emit a warning when an incident occurs.

SUMMARY

However, Japanese Unexamined Patent Application Publication No. 2007-264950 has room for further improvement.

In one general aspect, the techniques disclosed here feature a method for controlling a robot that accompanies a user, the method comprising: detecting, through at least one sensor included in the robot, a location and a movement direction of the user who is moving, and an object around the user; setting, based on the location and the movement direction of the user, a nearby ground area in front at the feet of the user; controlling an illumination device included in the robot to irradiate the nearby ground area with light while driving at least one pair of legs or wheels of the robot to cause the robot to accompany the user; specifying a type and a location of the detected object; and controlling, in a case where the object is a dangerous object and is located ahead of the user, the illumination device to irradiate a danger area with light in addition to irradiating the nearby ground area with light, the danger area including at least a portion of the dangerous object.

It should be noted that general or specific embodiments may be implemented as a system, a method, an integrated circuit, a computer program, a storage medium, or any selective combination thereof.

According to the present disclosure, further improvement is made possible.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flowchart illustrating an example of a process when a company A and a robot cooperate;

FIG. 5 is a table illustrating an example of relationships between types of access rights to a robot and permission levels;

FIG. 6 is a table illustrating an example of relationships between security modes and access rights to a robot in each security mode;

Figure 1:
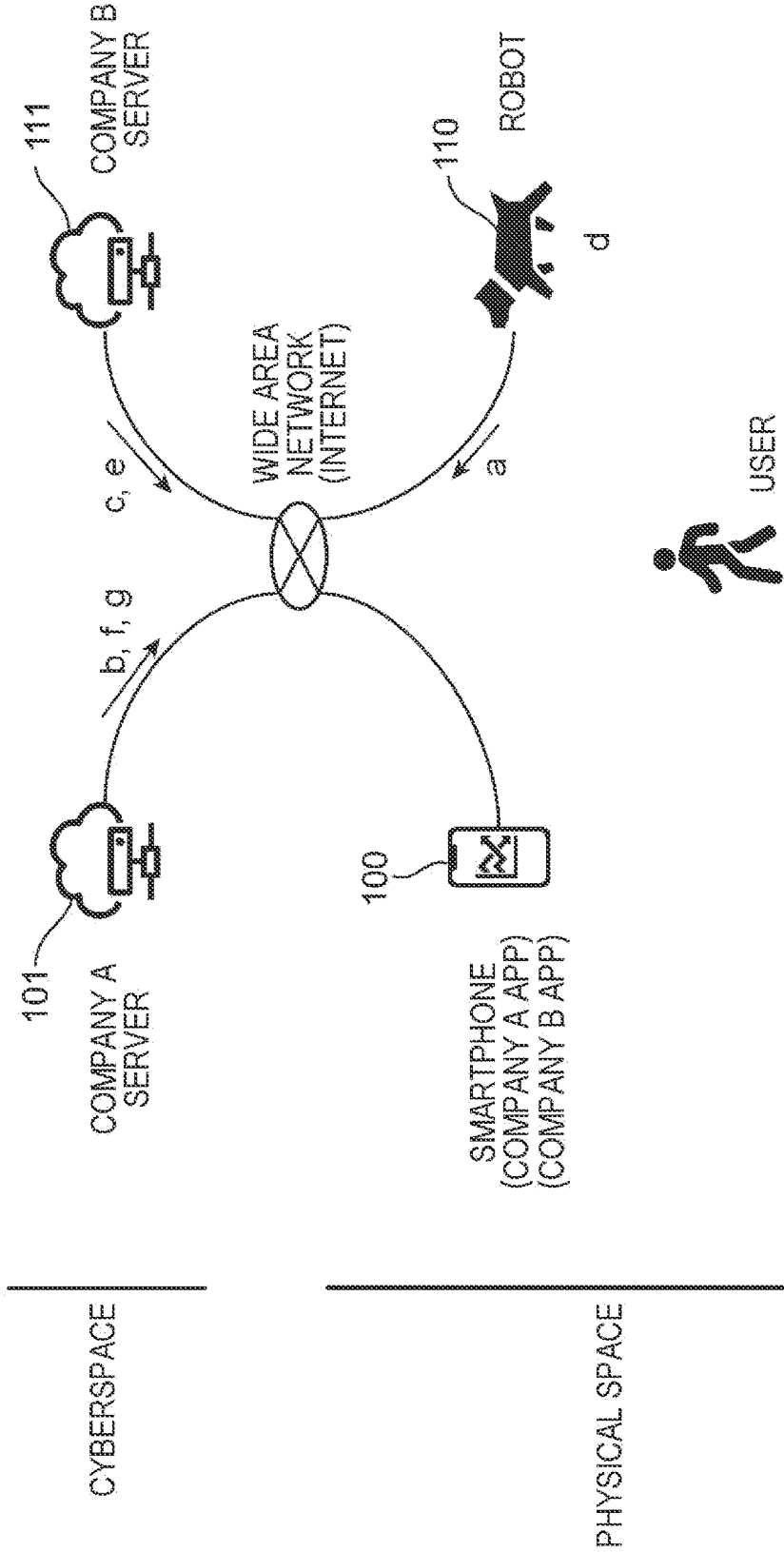
FIG. 1 is a block diagram illustrating an example of an overall configuration of an information system according to an embodiment of the present disclosure.

DETAILED DESCRIPTIONS (Underlying Knowledge Forming Basis of the Present Disclosure)

Our daily lives are becoming more and more digitized. For example, many people carry a smartphone, that is, a personal information communication terminal. Users have come to install and use a variety of applications (hereinafter referred to as apps) on their smartphones, such as apps for managing the user's health, apps supporting personal finance management, social communication apps supporting real-time communication with acquaintances, and news apps that curate news from around the world according to the user's personal interests.

On the other hand, although progress has been gradual, mobile devices capable of performing various movements and tasks autonomously (hereinafter referred to as robots) have also been put into practical use. There are robots that assemble and adjust part in factories, robots that accurately and rapidly sort objects in distribution centers, robots that can carry out specific tasks while also considering the surrounding situation, and the like. Among these robots, there are also robots that collaborate with humans and do specific tasks in place of humans.

The present disclosure helps users live healthy, happy, comfortable, safe, secure, enjoyable, and/or clean lives through cooperative action between a smartphone, that is, an information processing device capable of executing a wide variety of information processing, and a robot, that is, a mobile device capable of performing a wide variety of movements and tasks involving the manipulation of objects.

As an example of one such technology related to the cooperative action between a smartphone and a robot, a technology in which a robot escorts a user to ensure the safety of the user when the user goes out for a walk or a jog outside the home is being examined.

However, unlike the situation at home, the situation outside the home varies considerably, and the current functionality of robots has been inadequate for appropriately ensuring the safety of a user performing activities such as taking a walk outside the home.

For example, the disclosure in Patent Literature 1 merely indicates that, to increase the effect of deterring crime at nighttime or the like, a robot lights up the area around a user with backlight light source or detects an incident involving the user and uses a display and speaker to announce that the area is being monitored. Therefore, the technology disclosed in Patent Literature 1 is inadequate for appropriately ensuring the safety of a user performing activities outside the home.

The present disclosure has been devised to address problems like the above.

(1) A method according to one aspect of the present disclosure is a method for controlling a robot that accompanies a user, the method comprising: detecting, through at least one sensor included in the robot, a location and a movement direction of the user who is moving, and an object around the user; setting, based on the location and the movement direction of the user, a nearby ground area in front at the feet of the user; controlling an illumination device included in the robot to irradiate the nearby ground area with light while driving at least one pair of legs or wheels of the robot to cause the robot to accompany the user; specifying a type and a location of the detected object; and controlling, in a case where the object is a dangerous object and is located ahead of the user, the illumination device to irradiate a danger area with light in addition to irradiating the nearby ground area with light, the danger area including at least a portion of the dangerous object.

According to the above aspect, in a case where a dangerous object exists ahead of the user while the escorting robot is irradiating the nearby ground area in front at the feet of the user, the robot irradiates the dangerous object with light, thereby causing the user to reliably recognize the existence of the dangerous object and ensure the user's safety more appropriately.

(2) The above method of controlling a robot may further comprise, in a case where the object is the dangerous object and is located ahead of the user: setting a relative position where the robot is to be located with respect to the user to an emission position from which light of the illumination device reaches both the nearby ground area and the danger area; driving the at least one pair of legs or wheels to move the robot to the emission position if a current relative position of the robot with respect to the user is different from the emission position; and controlling the illumination device to irradiate the nearby ground area and the danger area with light while driving the at least one pair of legs or wheels to cause the robot to accompany the user in the emission position.

In some cases, the relative positions of the robot and the user may change easily while the user is being escorted, and the robot may no longer be capable of irradiating both the nearby ground area and the danger area with light. According to the above aspect, if the robot is not at the emission position where the robot can irradiate both the nearby ground area and the danger area while escorting the user, the robot moves to the emission position. Accordingly, a situation in which the robot cannot irradiate both the nearby ground area and the danger area can be avoided, and the user's safety can be ensured more appropriately.

(3) The above method of controlling a robot may further comprise: continuing to irradiate the nearby ground area with light while moving the robot to the emission position.

According to the above aspect, the robot continues to irradiate the nearby ground area with light while moving to the emission position, thereby ensuring the user's safety more appropriately.

(4) In the above method of controlling a robot, at least one of a beam shape, a color, or a blink pattern of the light irradiating the danger area may be different from the light irradiating the nearby ground area.

According to the above aspect, the danger area can be irradiated with light that is different from the light irradiating the nearby ground area, thereby causing the user to recognize the dangerous object more reliably.

(5) The above method of controlling a robot may further comprise: presetting, according to input from the user, a standard relative position where the robot is to be positioned with respect to the user by default; and in a case where no dangerous object is detected around the user, driving the at least one pair of legs or wheels to cause the robot to accompany the user in the standard relative position.

According to the above aspect, in the case where a dangerous object does not exist near the user, the robot can be mode to escort the user from a default position, namely the standard relative position.

(6) In the above method of controlling a robot, the input from the user may be acquired over a network from a communication terminal of the user, and the standard relative position may be selected by having the user select a position on a graphical user interface displayed on a screen of the communication terminal.

According to the above aspect, the user can easily select a desired position as the standard relative position.

(7) A robot according to another aspect of the present disclosure comprises: a main body; the at least one pair of legs or wheels; an actuator that drives the at least one pair of legs or wheels; the at least one sensor; the illumination device including at least one light source; a processor; and a memory storing a program causing the processor to execute the method of controlling a robot according to any of (1) to (6).

The above aspect makes it possible to provide a robot that can escort a user while irradiating the nearby ground area and a dangerous object with light to ensure the safety of the user moving outside the home.

(8) A non-transitory computer-readable medium storing a program according to another aspect of the present disclosure causes a processor installed in a robot to execute the method for controlling a robot according to any of (1) to (6).

The above aspect makes it possible to provide a program that can escort a user while irradiating the nearby ground area and a dangerous object with light to ensure the safety of the user moving outside the home.

(9) A method according to another aspect of the present disclosure is a method for controlling a robot that accompanies a user, the method comprising: detecting, through at least one sensor included in the robot, a location and a movement direction of the user who is moving, and an object around the user; setting, based on the location and the movement direction of the user, a nearby ground area in front at the feet of the user; controlling an illumination device included in the robot to irradiate the nearby ground area with light while driving at least one pair of legs or wheels of the robot to cause the robot to accompany the user; specifying a type and a location of the detected object; and controlling, in a case where the object is a dangerous object and is located in the movement direction of the user, the illumination device to irradiate a new nearby ground area with light to guide the user to change the movement direction, the new nearby ground area being located in front at the feet of the user and in a direction different from the movement direction.

According to the above aspect, if a dangerous object exists in the movement direction of the user, the new nearby ground area different from the movement direction is irradiated with light, thereby enabling the robot escorting the user to guide the user so as not to collide with the dangerous object, and ensure the user's safety more appropriately.

(10) A robot according to another aspect of the present disclosure comprises: a main body; the at least one pair of legs or wheels; an actuator that drives the at least one pair of legs or wheels; the at least one sensor; the illumination device including at least one light source; a processor; and a memory storing a program causing the processor to execute the method of controlling a robot according to (9).

The above aspect makes it possible to provide a robot that can guide the user so as not to collide with a dangerous object and ensure the user's safety more appropriately.

(11) A non-transitory computer-readable medium storing a program according to another aspect of the present disclosure causes a processor installed in a robot to execute the method for controlling a robot according to (9).

The above aspect makes it possible to provide a program that can guide the user so as not to collide with a dangerous object and ensure the user's safety more appropriately.

(12) A method according to another aspect of the present disclosure is a method for controlling a robot that accompanies a user, the method comprising: detecting, through at least one sensor included in the robot, a location and a movement direction of the user who is moving, and an object around the user; setting, based on the location and the movement direction of the user, a nearby ground area in front at the feet of the user; controlling an illumination device included in the robot to irradiate the nearby ground area with light while driving at least one pair of legs or wheels of the robot to cause the robot to accompany the user; specifying a type and a location of the detected object; and controlling, in a case where the object is a moving object and comes within a range of a prescribed distance from the user, the illumination device to irradiate a notification area with light in addition to irradiating the nearby ground area with light, the notification area being located on a road surface between the user and the moving object.

According to the above aspect, if a moving body comes within the range of a prescribed distance from the user, the notification area on the road surface between the user and the moving body is irradiated with light in addition to the nearby ground area, thereby ensuring the user's safety more appropriately.

(13) The above method of controlling a robot may further comprise, in a case where the object is the moving object and comes within the range of the prescribed distance from the user: setting a relative position where the robot is to be located with respect to the user to an emission position from which light of the illumination device reaches both the nearby ground area and the notification area; driving the at least one pair of legs or wheels to move the robot to the emission position if a current relative position of the robot with respect to the user is different from the emission position; and controlling the illumination device to irradiate the nearby ground area and the danger area with light while driving the at least one pair of legs or wheels to cause the robot to accompany the user in the emission position.

In some cases, the relative positions of the robot and the user may change easily while the user is being escorted, and the robot may no longer be capable of irradiating both the nearby ground area and the notification area with light. According to the above aspect, if the robot is not at the emission position where the robot can irradiate both the nearby ground area and the notification area while escorting the user, the robot moves to the emission position. Accordingly, a situation in which the robot cannot irradiate both the nearby ground area and the notification area can be avoided, and the user's safety can be ensured more appropriately.

(14) The above method of controlling a robot may further comprise: continuing to irradiate the nearby ground area with light while moving the robot to the emission position.

According to the above aspect, the robot continues to irradiate the nearby ground area with light while moving to the emission position, thereby ensuring the user's safety more appropriately.

(15) In the above method of controlling a robot, light irradiating the notification area may draw, in the notification area, a mark or character string for delivering a message to the moving object.

According to the above aspect, a message can be delivered to the moving body approaching the user to ensure user's safety more appropriately.

(16) The above method of controlling a robot may further comprise: presetting, according to input from the user, a standard relative position where the robot is to be positioned with respect to the user by default; and in a case where no dangerous object is detected around the user, driving the at least one pair of legs or wheels to cause the robot to accompany the user in the standard relative position.

According to the above aspect, in the case where a dangerous object does not exist near the user, the robot can be mode to escort the user from a default position, namely the standard relative position.

(17) In the above method of controlling a robot, the input from the user may be acquired over a network from a communication terminal of the user, and the standard relative position may be selected by having the user select a position on a graphical user interface displayed on a screen of the communication terminal.

According to the above aspect, the user can easily select a desired position as the standard relative position.

(18) The above method of controlling a robot may further comprise, in a case where the object is the moving object and comes within the range of the prescribed distance from the user, outputting an audio message to the moving object through a speaker included in the robot.

According to the above aspect, an audio message can be delivered to the moving body approaching the user to ensure user's safety more appropriately.

(19) A robot according to another aspect of the present disclosure comprises: a main body; the at least one pair of legs or wheels; an actuator that drives the at least one pair of legs or wheels; the at least one sensor; the illumination device including at least one light source; a processor; and a memory storing a program causing the processor to execute the method of controlling a robot according to any of (12) to (18).

The above aspect makes it possible to provide a robot in which, if a moving body comes within the range of a prescribed distance from the user, the notification area on the road surface between the user and the moving body is irradiated with light in addition to the nearby ground area, thereby ensuring the user's safety more appropriately.

(20) A non-transitory computer-readable medium storing a program according to another aspect of the present disclosure causes a processor installed in a robot to execute the method for controlling a robot according to any of (12) to (18).

The above aspect makes it possible to provide a program in which, if a moving body comes within the range of a prescribed distance from the user, the notification area on the road surface between the user and the moving body is irradiated with light in addition to the nearby ground area, thereby ensuring the user's safety more appropriately.

(21) A method according to another aspect of the present disclosure is a method for controlling a robot that accompanies a use, the method comprising: detecting, through at least one sensor included in the robot, a location and a movement direction of the user who is moving, and an object around the user; setting, based on the location and the movement direction of the user, a nearby ground area in front at the feet of the user and a relative position where the robot is to be located with respect to the user; and controlling an illumination device included in the robot to irradiate the nearby ground area with light while driving at least one pair of legs or wheels of the robot to cause the robot to accompany the user in the relative position.

The above aspect makes it possible for the robot escorting the user to irradiate the nearby ground area with light while also escorting the user from the relative position where the robot is to be located with respect to the user, thereby ensuring the user's safety more appropriately.

(22) The above method of controlling a robot may further comprise: if a current position of the robot is different from the set relative position, driving the at least one pair of legs or wheels to cause the robot to move from the current position to the set relative position; and continuing to irradiate the nearby ground area with light by varying an irradiation direction of the light from the illumination device while moving the robot to the relative position.

According to the above aspect, in the case where the robot moves from its current position to the relative position, the irradiation of the nearby ground area with light is continued by varying the irradiation direction, thereby ensuring the user's safety more appropriately.

(23) A robot according to another aspect of the present disclosure comprises: a main body; the at least one pair of legs or wheels; an actuator that drives the at least one pair of legs or wheels; the at least one sensor; the illumination device including at least one light source; a processor; and a memory storing a program causing the processor to execute the method of controlling a robot according to (21) or (22).

The above aspect makes it possible to provide a robot that irradiates the nearby ground area with light while escorting the user from the relative position where the robot is to be located with respect to the user, thereby ensuring the user's safety more appropriately.

(24) A non-transitory computer-readable medium storing a program according to another aspect of the present disclosure causes a processor installed in a robot to execute the method for controlling a robot according to (21) or (22).

The above aspect makes it possible to provide a program that causes a robot to irradiate the nearby ground area with light while escorting the user from the relative position where the robot is to be located with respect to the user, thereby ensuring the user's safety more appropriately.

The present disclosure may also be implemented as an information system that operates according to such a program. In addition, a computer program like the above obviously may be distributed on a non-transitory computer-readable recording medium such as CD-ROM, or over a communication network such as the Internet.

Note that the embodiments described hereinafter all illustrate specific examples of the present disclosure. Features such as numerical values, shapes, structural elements, steps, and the ordering of steps indicated in the following embodiments are merely examples, and are not intended to limit the present disclosure. In addition, among the structural elements in the following embodiments, structural elements that are not described in the independent claim indicating the broadest concept are described as arbitrary or optional structural elements. Furthermore, the individual contents in all of the embodiments may also be combined.

EMBODIMENTS

The Internet is expected to become even more widespread in society in the future, with various types of sensors becoming commonplace. Accordingly, in society, information related to the internal states and activities of individuals as well as information about a city as a whole, including features such as buildings and traffic, is anticipated to become digitized and usable by computer systems. Digitized data related to individuals (personal information) is managed securely in cloud servers such as information banks as big data through communication networks and used for various purposes for individuals and society.

Such a highly information-oriented society is referred to as Society 5.0 in Japan. A highly information-oriented society is one in which economic advancement and the resolution of social issues are anticipated through an information infrastructure (cyber-physical system) that highly integrates real space (physical space), which is the physical world that surrounds people, and virtual space (cyberspace), where computers cooperate with each other to perform various processes related to physical space.

In such a highly information-oriented society, communication (including the acquisition and provision of information, and methods of expressing such information) and activities that an individual carries out in a variety of situations in daily life are analyzed, and by analyzing big data containing accumulated personal information, it is possible to provide the individual information and services that the individual needs via a method of communication that is considered optimal for the individual according to the situation.

Hereinafter, close support with the daily life of an individual user will be treated as a theme to describe a specific arrangement for increasing a user's health and happiness on the presupposition of a highly information-oriented society in which such a cyber-physical system operates.

FIG. 1 is a block diagram illustrating an example of an overall configuration of an information system according to an embodiment of the present disclosure. The upper half of FIG. 1 illustrates cyberspace while the lower half illustrates physical space. On the left side of the diagram, resources related to a non-robot-providing company A are arranged, including a company A server 101 in cyberspace, and a company A software application (app) that runs on a user's smartphone 100 in physical space. The company A server 101 operates in tandem with the company A app. On the right side of the diagram, resources related to a robot-providing company B are arranged, including a company B server 111 in cyberspace, and a mobile device (robot 110) and a company B app that runs on the smartphone 100 in physical space. The company B server 111 operates in tandem with the robot 110 and/or the company B app. In the middle of physical space is the user who interacts with the company A and company B apps installed on the smartphone 100 and with the robot 110. The smartphone 100, the robot 110, the company A server 101, and the company B server 111 are communicably interconnected by a wide area network including the Internet.

As illustrated in the diagram, the companies A and B have contact points with the user through the respective apps and the robot. The company A only has a contact point through the company A app on the smartphone 100, which is one aspect of a customer contact point often seen in today's world. On the other hand, the company B in the diagram not only has a contact point through the company B app on the smartphone 100, but also has a contact point through the robot 110. A company having a contact point with a user (general consumer) through an autonomous mobile device, namely the robot 110, is still unheard of aside from some toy manufacturers, but is expected to become more widespread.

Note that a dog-like robot is adopted as an example of the robot 110 herein, but the robot 110 may have a configuration based on some other living thing, including humans, or have an inorganic configuration that is unlike a living thing. The configuration of the robot 110 is not limited insofar as the robot 110 has autonomous motor skills (such as the ability to change pose and location) and/or action skills (the ability to move another object, such as pressing a button or picking something up).

The information system according to an embodiment of the present disclosure provide higher value to users by coordinating respective customer contact points, namely the apps, the robot 110, and additional appliances and household equipment operated by the robot 110 to a higher degree than in the past to expand the quality of its own services while leveraging the information and skills of others. The cognitive and motor skills of the robot 110 continue to evolve on a daily basis, and if such an all-purpose robot 110 is achieved, a framework enabling other companies to access the unique skills of the robot 110 should be constructed. Such a framework would serve as the foundation for creating a wide variety of value linkages for users, for non-robotic companies that provide services, and for robotic companies that provide robots.

In FIG. 1, the company A is a security company with which the user has a contract. The company A causes a security app provided by the company A to be installed as the company A app on the smartphone 100, and prompts the user to establish various settings regarding security services provided by the company A.

The robot 110 continually collects data about the user via onboard sensors. The data about the user includes information about the user's biological activity and information about the user's surroundings, for example. The biological activity information includes heart rate, blood pressure, body temperature, activity level (calorie expenditure), number of steps taken, posture, and exercise, for example. The surrounding information includes surrounding image information, information indicating the user's location, the ambient temperature, recognition results regarding the surrounding space, and object recognition results, for example. The robot 110 records the collected data about the user in a memory of the robot 110. At the same time, the robot 110 periodically uploads the collected data about the user to the company B server 111 (a).

Note that the entity that collects the biological activity information and surrounding information is not limited to the robot 110 and may also be the smartphone 100, a wearable sensor (not illustrated) worn by the user, or a sensor (not illustrated) installed in the user's home or residential area.

The company B server 111 continually acquires data about the user from the robot 110. The company B server 111 allows the company A server 101 having access rights to acquire the data about the user. Here, authentication settings based on user confirmation are established between the company A server 101 and the company B server 111, and the company A server 101 has access rights for acquiring the most recent data held in the company B server.

The company A server 101 having access rights periodically acquires the most recent data about the user held in the company B server 111, and analyzes the acquired data about the user. From image information about the user's surroundings or temporal changes in the information about the user's location included in the data about the user, the company A server 101 determines that the user has exited his or her home and is taking a walk with the robot 110. At this point, the image information about the user's surroundings is acquirable if the company A server 101 or the company A app has a camera image access permission level of 1 or higher, and the information about the user's location is acquirable if the company A server 101 or the company A app has a location sensor access permission level of 1. Alternatively, the company A server 101 and/or company A app and the company B server 111 and/or company B app may be set up to coordinate with each other through communication, and the company A server 101 may be capable of detecting that the robot 110 is about to guide the user on a walk of approximately 3000 steps.

In the case of determining that the user is out with the robot 110 and moving at a walking pace, the company A server 101 transmits, to the company B server 111, request information for switching the security mode of the robot 110 from "at home" to "walk".

The security mode is one of multiple behavioral regulations (program-based robot behavioral control) set in the robot 110 by the company A to ensure the user's safety. When the security mode changes, the access permission levels with respect to the onboard sensors of the robot 110 are updated. This makes it easy for the company A server 101 to collect necessary information. Additionally, the priority order for determining which actions the robot 110 should take in response to the user and the surrounding situation also changes. Herein, the security mode is described as being preset to switch automatically between when the user is at home and when the user is out, but the present disclosure is not limited thereto.

The "at home" security mode is an example of a "first specification enabling the collection of information about the user's surroundings while the user is inside the prescribed area expressing the user's home". The "walk" security mode is an example of a "second specification enabling the collection of information about the user's surroundings while the user is outside the prescribed area expressing the user's home".

At the timing when it is determined that the user has begun a walk, the company A server 101 may switch the security mode of the company A app in the smartphone 100 to "walk". However, it is difficult for the security company A to realistically ensure the user's safety while out for a walk by switching the security mode of the company A app. For example, the user may not necessarily be carrying the smartphone 100 when out for a walk. Furthermore, even if the user carries the smartphone 100 and the security mode of the company A is set to "walk", it is difficult for the company A app to realistically detect sources of trouble and risks that the user may encounter while out for a walk, help the user avoid such situations, and ensure the physical safety of the user.

In other words, there is a limit to what the company A can do as a security company for the user if the only daily contact point with the user is the company A app. The autonomous robot 110 by the user's side can enhance the security of the user to a greater degree than an app that does not have direct physical interaction with the real world. For this reason, to provide a highly effective security service through the robot 110 possessed by the user, the company A server 101 requests the robot 110 of the company B to switch to the "walk" security mode while the user is out for a walk.

In the information-oriented society up to the present (also referred to as Society 4.0), the security service via the company A app described here has been achieved. However, some dangers that occur in physical space would be difficult or impossible to resolve with the company A app. The present embodiment describes an arrangement using the robot 110 which is provided with autonomous motor skills and which stays by the user's side, whereby the company A app uses the autonomous motor skills possessed by the robot 110 but not possessed by the company A app to design and implement a security service that is better at keeping the user safe. In this regard, the description of FIG. 1 will be resumed.

The company B server 111 acquiring request information from the company A server 101 confirms whether the company A has the access rights necessary for the request issued from the company A server 101 to the robot 110. Here, it is assumed that various settings (the details of which will be described later) regarding the security mode "walk" and access permission level information (the details of which will be described later) indicating what is allowed when the security mode is active are preset by the user. If the company A has access rights, the company B server 111 instructs the robot 110 to change to the security mode "walk" (c). If the company A does not have access rights, the company B server 111 denies the request.

The robot 110 receiving the instruction for changing to the security mode "walk" from the company B server 111 activates the security mode "walk" (d). The robot 110, having activated the security mode "walk", escorts the user taking a walk, alerts the user taking a walk by shining a spotlight on dangerous objects, indicates to persons who pose a risk that the user is being monitored, intimidates persons who pose a risk, and so on. Furthermore, if the user is determined to be in a state of danger, the robot 110 notifies the company A server 101 or the police. In this way, in the security mode "walk", the robot 110 determines various dangers that the user may possibly encounter while on a walk and ensures the user's safety by avoiding the dangers and causing security personnel to intervene if necessary.

Additionally, upon determining that there is a possibility that the robot 110 may be unable to ensure the user's safety, the robot 110 notifies the company B server 111 with a message indicating the same. The company B server 111 forwards the notification to the company A server 101 (e).

The company A server 101 receiving the notification message implements security by security personnel through the robot 110 on the basis of the notification (f). Specifically, company A security personnel may listen to the situation from the user and intimidate dangerous persons through a camera, microphone, and speaker of the robot 110. Furthermore, a location sensor may be used to dispatch security personnel to the scene.

When the user finishes the walk and returns home, the company A server 101 detects that the user has returned home on the basis of sensor data (such as a camera image or location information from the location sensor) from the robot 110 acquired via the company B server 111. Accordingly, the company A server 101 transmits, to the company B server 111, request information for updating the security mode of the robot 110 to "at home" (g). The company B server 111 receiving the request information instructs the robot 110 to update the security mode to "at home". The robot 110 receiving the instruction activates the security mode "at home".

By changing the security mode from "walk" to "at home", the robot 110 autonomously changes its own behavioral regulations for ensuring the user's safety. Specifically, the company B server 111 updates the access permission levels for the company A server 101 with respect to sensor data collected from the robot 110 to levels for use at home, and changes the priority order of actions the robot 110 should take in response to the user's state or surrounding situation to a priority order for use at home. Note that in the case where the robot 110 can confirm that the company A has access rights, the robot 110 may also automatically update the access permission levels for the company A server 101 with respect to sensor data collected by the robot 110 and the motor skills of the robot 110 to levels for use at home.

In this way, the company B server 111 automatically selects a security mode to be provided by the company A according to the user's state or surrounding situation. The company B server 111 may also automatically optimize the disclosure levels with respect to sensor data measured by the robot 110 that are necessary to execute security services. For example, to improve image recognition accuracy and raise the admissibility of evidence if an incident occurs while the user is out for a walk, the company B server 111 allows the company A server 101 to access image data captured by the camera of the robot 110 at a high-definition video level (permission level=3: all permitted). On the other hand, when the user is at home where there are few external threats, the company B server 111 allows the company A server 101 to access low-definition video (permission level=2: up to low-quality video permitted) to alleviate privacy concerns.

The above description presupposes that the company A server 101 has an access permission level of "3" with respect to camera images. If it is assumed that the company A server 101 has an access permission level of "2" with respect to camera images, when the user is out for a walk, the company A server 101 would only be capable of using up to low-quality video at permission level=2. If difficulties occur with security fulfillment while the user is out for a walk, the company A server 101 or the company A app may notify and/or request the user, through the company A app or the company B app, to raise the permission level to "3" with respect to camera images in the company B server 111.

Ensuring safety in the user's daily life is difficult to achieve with only messages such as video information and audio information on the smartphone 100 that serves as the customer contact point that the company A has with the user. By continually monitoring information about the user's biological activity and information about the user's surroundings not through the company A app but instead through the autonomous robot 110 of the company B that stays close by the user, the company A can better ensure the safety of the user's daily life and provide a higher degree of security.

In the description of FIG. 1, the entity that determines whether or not the user is out is the company A server 101, but the present disclosure is not limited thereto. The determining entity may also be the company B server 111 or the robot 110.

Figure 2:
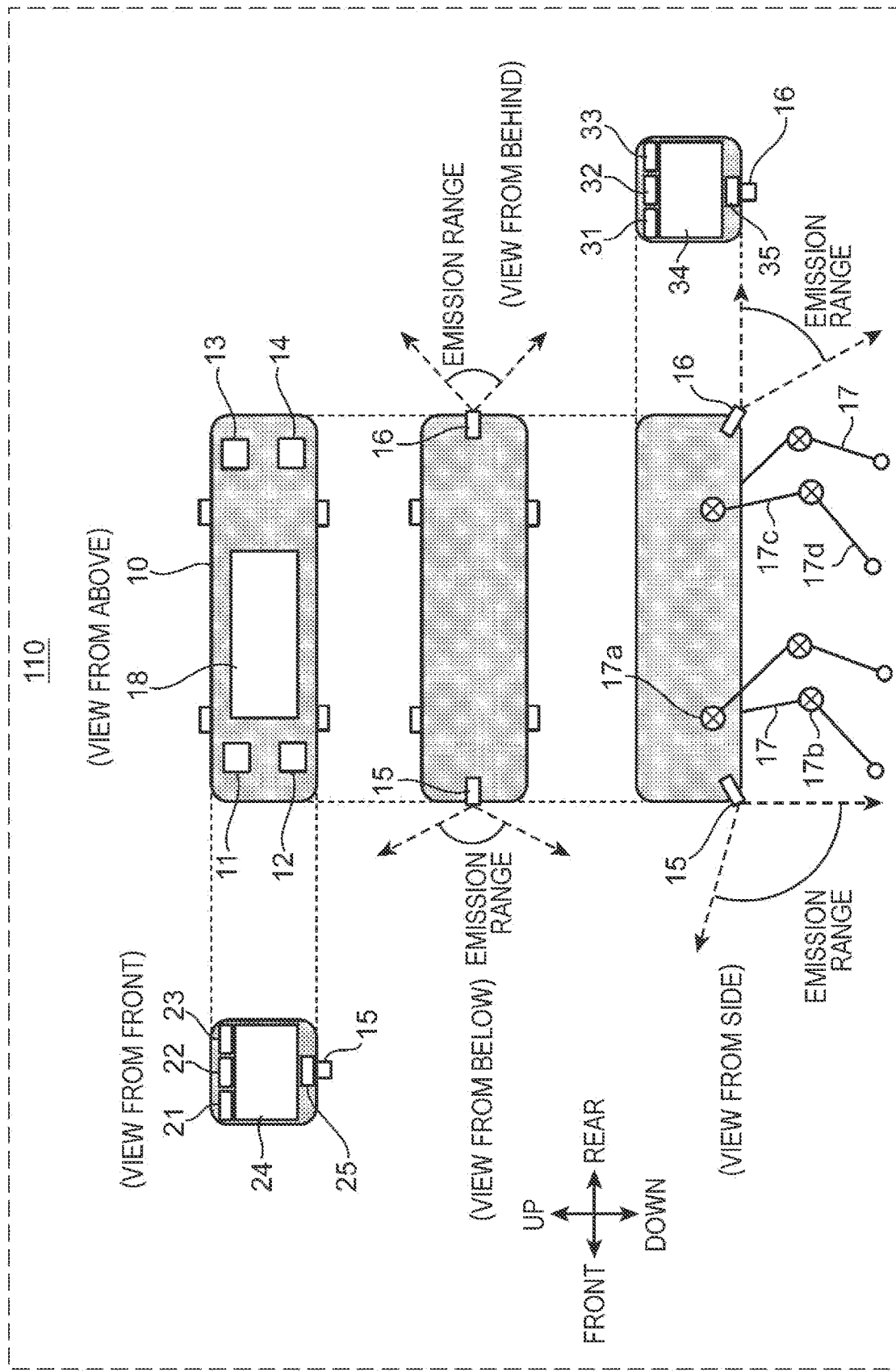
FIG. 2 is an illustration of the external appearance of a robot according to the embodiment.

FIG. 2 is an illustration of the external appearance of the robot 110 according to the present embodiment. In FIG. 2, the longitudinal direction of the robot 110 is referred to as the front-rear direction, the direction orthogonal to the walking plane of the robot 110 is referred to as the vertical direction, and the direction orthogonal to both the front-rear direction and the vertical direction is referred to as the left-right direction.

In FIG. 2, a robot that moves on four legs 17 is illustrated as an example implementation of the robot 110. The robot 110 includes a body 10 and four legs 17. An illumination device 15 is disposed at the front of the undersurface of the body 10, and an illumination device 16 is disposed at the rear of the undersurface of the body 10. By providing the illumination devices 15 and 16, light of sufficient intensity can be emitted in front of and behind the robot 110. The illumination configuration (illumination pattern, color, blink pattern) is adjustable for each the illumination devices 15 and 16 to illuminate dangerous objects and make it easier for the user to be aware of the dangerous objects. To achieve such functionality, the illumination devices 15 and 16 are not lights that can emit light of a single color, but also have a projection mapping function that projects images of any type onto surrounding objects such as dangerous objects or streets.

Figure 14:
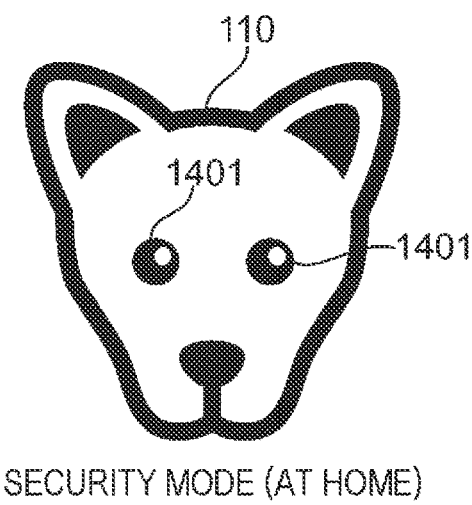
FIG. 14 is a diagram illustrating an example of a notification that a robot issues to a user.

A display 24 is disposed in the center of the front surface of the body 10. The display 24 is a liquid crystal display (LCD) panel or an organic light-emitting diode (OLED) panel, for example. The display 24 is mainly used by the robot 110 to communicate with the user. As illustrated in FIG. 14, the display 24 may display an image representing a facial expression of the robot 110.

A display 18 is disposed in the center of the top surface of the body 10, and a display 34 is disposed in the center of the rear surface of the body 10. The displays 18 and 34 are LCD panels or OLED panels, for example. The displays 18 and 34 are mainly used to display messages and states from the robot 110. For example, the displays 18 and 34 may be used to display warning information to another person in an alert area described later. In this case, the displays 18 and 34 may also display a logo of the security company A that provides security services to the user through the robot 110.

A speaker 25 is disposed in a lower part of the front surface of the body 10, and a speaker 35 is disposed in a lower part of the rear surface of the body 10. The speaker 25 is used by the robot 110 to communicate face-to-face with the user in front. The speaker 35 is used to communicate with people approaching from behind.

An RGB camera 21, a distance measurement sensor 22, and an infrared camera 23 are disposed on the front surface of the body 10. An RGB camera 31, a distance measurement sensor 32, and an infrared camera 33 are disposed on the rear surface of the body 10. The RGB cameras 21 and 31 are used for spatial awareness and object identification. The distance measurement sensors 22 and 32 are used to detect the shapes of the surrounding space and objects, such as the shapes of dangerous objects and uneven road surfaces. The infrared cameras 23 and 33 are used to detect people in low-light environments and the ambient temperature distribution. By combining the RGB cameras 21 and 31, the distance measurement sensors 22 and 32, and the infrared cameras 23 and 33, the robot 110 can accurately detect the surrounding situation.

Four microphones 11, 12, 13, and 14 are disposed on the top surface of the body 10. By providing four microphones, the robot 110 can localize sounds.

Each leg 17 includes joints 17a and 17b, an upper leg 17c, and a lower leg 17d. The joint 17a connects the upper leg 17c to a side surface of the body 10 to allow the upper leg 17c to rotate about an axis extending in the left-right direction. The joint 17b attaches the upper leg 17c and the lower leg 17d to allow the legs to rotate about an axis extending in the left-right direction.

Figure 3:
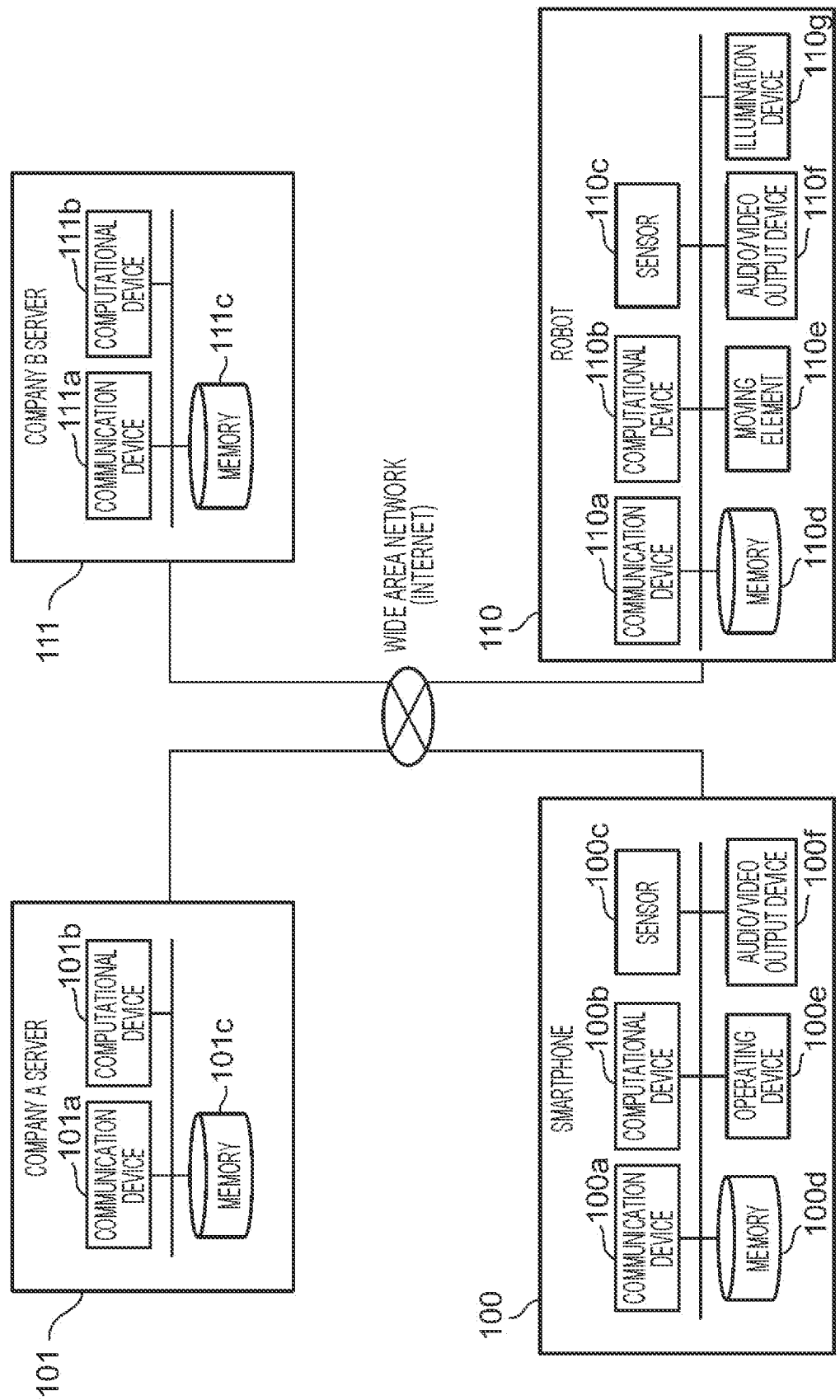
FIG. 3 is a block diagram illustrating an example of a configuration of the information system according to an embodiment of the present disclosure.

FIG. 3 is a block diagram illustrating an example of a configuration of the information system according to an embodiment of the present disclosure. The smartphone 100 includes a communication device 100a, a computational device 100b, sensors 100c, a memory 100d, an operating device 100e, and an audio/video output device 100f.

The communication device 100a is a communication circuit that communicates information with other computers over a network. The computational device 100b is a processor such as a CPU, for example, and performs information processing such as speech recognition, speech synthesis, information searching, and information rendering. The sensors 100c acquire video information, audio information, and/or surrounding environment information. The sensors 100c are a camera, a microphone, an acceleration sensor, an angular velocity, and a GPS sensor, for example. The memory 100d is flash memory, for example, and holds various data. The operating device 100e is a touch panel, for example, and receives button operations, touch operations, and the like from the user. The audio/video output device 100f is a display and a speaker, for example.

If the company A app and the company B app are installed, programs and necessary data are recorded in the memory 100d, and the programs are executed by the computational device 100b.

The company A server 101 is a computer that cooperates with the company A app installed in the smartphone 100. The company A server 101 includes a communication device 101a, a computational device 101b, and a memory 101c. The communication device 101a is a communication circuit that communicates information with other computers over a network. The computational device 101b is a processor such as a CPU, for example, and processes data transmitted from other computers over a network. The memory 101c is a solid-state drive or a hard disk drive, for example, and records information related to the company A app and the user.

The company B server 111 is a computer that cooperates with the company B app installed in the smartphone 100. The company B server 111 includes a communication device 111a, a computational device 111b, and a memory 111c. The communication device 111a is a communication circuit that communicates information with other computers over a network. The memory 111c is a solid-state drive or a hard disk drive, for example, and records information related to the company B app, information related to the robot 110, and information related the user. The computational device 111b processes various data transmitted from other computers.

The robot 110 includes a communication device 110a, a computational device 110b, sensors 110c, a memory 110d, a moving element 110e, an audio/video output device 110f, and an illumination device 110g.

The communication device 110a is a communication circuit that communicates information with other computers over a network. The computational device 110b is a processor such as a CPU, for example. The computational device 110b performs a process for controlling the moving element 110e to control movement and actions by the robot 110 and a process for causing the robot 110 to mechanically interact with other objects. Additionally, the computational device 110b performs a processor for generating various information to be outputted from the audio/video output device 110f.

The sensors 110c acquire video information, audio information, and surrounding environment information. The sensors 110c include the RGB cameras 21 and 31, the distance measurement sensors 22 and 32, the infrared cameras 23 and 33, and the microphones 11 to 14, for example.

The memory 110d is a semiconductor memory such as flash memory, for example, and holds various data.

The moving element 110e includes the legs 17 and an actuator that moves the legs 17, for example. A motor is one example of an actuator. In the case where the robot 110 has wheels instead of the legs 17, the actuator is a motor that causes the wheels to turn. The moving element 110e causes the robot 110 to move, act, and mechanically interact with other objects.

The audio/video output device 110f includes the speakers 25 and 35 and the displays 18, 24, and 34, for example, and outputs audio and video.

The illumination device 110g includes the illumination devices 15 and 16 illustrated in FIG. 2. The illumination device 110g may include one or more laser diodes and a microlens array or a micromirror array. Furthermore, the illumination device 110g may include an LCD panel and a polarizer. Furthermore, the robot 110 may also be provided with an operating device (not illustrated) that receives button operations, touch operations, and the like from the user.

Note that the wide area network connecting the company A server 101, the smartphone 100, the robot 110, and the company B server 111 may be any one of a mobile communication network, a satellite communication network, the Internet, a dedicated communication network, a fiber-optic network, short-range wireless communication, or a combination of the above.

FIG. 4 is a flowchart illustrating an example of a process when the company A and a robot cooperate. To allow the company A app or the company A server 101 to give the company B access to the information and skills of the robot 110 as described with reference to FIG. 1, access rights are set appropriately in advance. FIG. 4 illustrates an example of a process for setting access rights in advance.

The user uses the company B app installed in the smartphone 100 to set up the company B app to cooperate with the company A app. Specifically, the company B app acquires a unique ID of the company A app used by the user on the basis of user input (step #1). The company B app transmits a registration request for registering the acquired unique ID of the company A app with a unique ID of the company B app in the company B server 111 (step #2). The company B server 111 receiving the registration request registers pairing information between the company A app and the company B app. In the registration process, access rights are also registered at the same time (step #3), the access rights indicating which skills of the robot 110 the company A is allowed to utilize, and to what degree. Details regarding access rights will be described later using FIG. 5. Pairing information including a robot ID of the robot 110 and the unique ID of the company B app is preregistered in the company B server 111. The pairing information is registered by having the user input the unique ID of the robot 110 on an initial setup screen of the company B app, for example.

The company B server 111 receiving the registration of the company A app notifies the company A server 101 of setting information regarding the access rights granted to the company A app (step #4). Specifically, the company B server 111 notifies the company A server 101 of the setting information regarding the access rights in addition to the pairing information of the unique ID of the company A app and the unique ID of the company B app.

The company A server 101 registers the pairing information of the unique ID of the company A app and the unique ID of the company B app and the setting information regarding the access rights in the memory 101c (step #5). The above information is used when the company A app or the company A server 101 utilizes the skills of the robot 110 provided by the company B, and is used to specify the robot 110 to be utilized and determine whether its skills can be utilized.

The above is merely one example, and the access rights of the company A app or the company A server 101 with respect to robot 110 provided by the company B may be established correctly in any way. A registration method different from the above may also be used.

FIG. 5 is a table illustrating an example of relationships between types of access rights to the robot 110 and permission levels. The robot 110 is equipped with various sensors 110c and motor skills (the moving element 110e). Access rights of other companies with respect to the sensors 110c and motor skills are registered not only in the company B server 111, but also in the company A server 101 on the utilizing side. Hereinafter, types of access rights and their permission levels will be described with respect to the sensors 110c.

"Camera image" refers to the access rights to an image sensor (for example, an RGB image sensor) provided in the robot 110. The image sensor may be a sensor that is provided in a location recognized as the robot's eye from the outward appearance of the robot. As indicated below, the access rights to the "camera image" are set in levels from "0", which denotes no access rights, to "3", which denotes unrestricted access rights. For example, in response to an access request from the company A server 101 having a permission level of "2", the company B server 111 controls the robot 110 and/or the company B server 111 to return low-quality video.

0: Not permitted
1: Only still images permitted
2: Up to low-quality video permitted
3: All permitted "Distance measurement sensor" refers to the access rights to a sensor (such as a time-of-flight (ToF) sensor or LiDAR, for example) which is provided in the robot 110 and which can measure the distance to an object. As indicated below, the access rights to the "distance measurement sensor" are set to either "0", which denotes no access rights, or "1", which denotes access rights. For example, in response to an access request from the company A server 101 having a permission level of "1", the company B server 111 controls the robot 110 to return data (for example, a depth image) acquired by the distance measurement sensor.

0: Not permitted
1: Permitted

"Infrared sensor" refers to the access rights to a sensor which is provided in the robot 110 and which can measure infrared radiation. A near-infrared region measured by the infrared sensor is used for subject recognition in the dark, and a far-infrared region is used for subject temperature distribution or the like. As indicated below, the access rights to the "infrared sensor" are set to either "0", which denotes no access rights, or "1", which denotes access rights. For example, in response to an access request from the company A server 101 having a permission level of "1", the company B server 111 controls the robot 110 to return data (for example, a thermographic image) acquired by the infrared sensor.

0: Not permitted
1: Permitted

"Microphone audio" refers to the access rights to the microphones provided in the robot 110. As indicated below, the access rights to the "microphone audio" are set to either "0", which denotes no access rights, or "1", which denotes access rights. For example, in response to an access request from the company A server 101 having a permission level of "1", the company B server 111 controls the robot 110 to return audio data acquired by the microphones.

0: Not permitted
1: Permitted

"Tactile sensor" refers to the access rights to a sensor (for example, a MEMS silicon-hair device sensor) which is provided in the robot 110 and which can measure a tactile sensation on the robot surface. As indicated below, the access rights to the "tactile sensor" are set in levels from "0", which denotes no access rights, to "2", which denotes unrestricted access rights. For example, in response to an access request from the company A server 101 having a permission level of "1", the company B server 111 controls the robot 110 to return only data from a portion (for example, the head) of the robot 110 from among the data (for example, a pressure distribution image) acquired by the tactile sensor.

0: Not permitted
1: Only partially permitted
2: All permitted

"Temperature/humidity/barometric sensor" refers to the access rights to a temperature, humidity, and barometric sensor provided in the robot 110. As indicated below, the access rights to the "temperature/humidity/barometric sensor" can be set to either "0", which denotes no access rights, or "1", which denotes access rights. For example, in response to an access request from the company A server 101 having a permission level of "1", the company B server 111 controls the robot 110 to return data acquired by the temperature, humidity, and barometric sensor.

0: Not permitted
1: Permitted

"Location sensor" refers to the access rights to a sensor which is provided in the robot 110 and which measures the current location of the robot. As indicated below, the access rights to the "location sensor" are set to either "0", which denotes no access rights, or "1", which denotes access rights. For example, in response to an access request from the company A server 101 having a permission level of "1", the company B server 111 controls the robot 110 to return data which is acquired by the location sensor and which indicates information about the current location of the robot.

0: Not permitted
1: Permitted

The description so far relates to access rights to the sensors 110c provided in the robot 110. Next, access rights to the "motor skills" provided in the robot 110 will be described.

"Expression-changing skills" refer to the access rights to skills for changing the outward characteristics of a facial expression displayed by the audio/video output device 110f of the robot 110. In the case where the robot 110 has parts recognizable as a face from the outward appearance, the expression-changing skills may involve moving the parts and changing the colors of the parts. As indicated below, the access rights to the "expression-changing skills" are set to either "0", which denotes no access rights, or "1", which denotes access rights. For example, in response to an access request from the company A server 101 having a permission level of "1", the company B server 111 controls the robot 110 to change its facial expression according to a request for changing the facial expression.

0: Not permitted
1: Permitted

"Vocalization skills" refer to the access rights to sound output skills provided by the audio/video output device 110*f* of the robot 110. In the case where the robot has parts recognizable as a mouth from the outward appearance, the vocalization skills may involve moving the parts and outputting sound from an area near the mouth. As indicated below, the access rights to the "vocalization skills" are set to either "0", which denotes no access rights, or "1", which denotes access rights. For example, in response to an access request from the company A server 101 having a permission level of "1", the company B server 111 controls the robot 110 to output sound according to sound information to be vocalized.

0: Not permitted
1: Permitted

"Pose-changing skills" refer to the access rights to skills for changing the robot's pose provided by the moving element 110*e* of the robot 110. These skills may be skills for changing the angle of the joint mechanisms in the moving element 110*e* of the robot 110. However, the pose-changing skills are not intended to be skills for changing the location of the robot 110 itself. As indicated below, the access rights to the "pose-changing skills" are set in levels from "0", which denotes no access rights, to "2", which denotes unrestricted access rights. For example, in response to an access request from the company A server 101 having a permission level of "1", the company B server 111 controls the robot 110 to move only the head according to the request.

0: Not permitted
1: Only head permitted
2: All permitted

"Mobility skills" refer to the access rights to skills for changing location provided by the moving element 110*e* of the robot 110. These skills may be skills for changing the angle of the joint mechanisms in the moving element 110*e* of the robot 110. The mobility skills are used to change the location of the robot 110 itself. As indicated below, the access rights to the "mobility skills" are set in levels from "0", which denotes no access rights, to "4", which denotes unrestricted access rights. For example, in response to an access request from the company A server 101 having a permission level of "1", the company B server 111 controls the robot 110 to permit low-speed movement only in a user-approved area inside the user's home. As another example, in response to an access request from the company A server 101 having a permission level of "3", the company B server 111 controls the robot 110 to permit high-speed movement only in a user-approved area inside the home and outside the home. Here, the user-approved area is a parameter that the user sets in advance. For example, the robot 110 may be preset to not go near a certain area (such as the bath) where there would be concerns about invading the user's privacy.

0: Not permitted
1: Low-speed movement permitted only in approved area inside home
2: Low-speed movement permitted in approved area inside/outside home
3: High-speed movement permitted in approved area inside/outside home
4: All permitted FIG. 6 is a table illustrating an example of relationships between security modes and access rights to the robot 110 in each security mode. The table illustrates an example of how the access rights to the sensors 110*c* provided in the robot 110 and the access rights to the motor skills of the robot 110 are changed when the security mode is changed. Note that although the access rights are described as being changed in synchronization with the security mode, the access rights may also be changed individually, without being synchronized with the security mode.

The table illustrates an example in which the permission levels set when the security mode "at home" is active are different from the permission levels set when the security mode is "walk" is active. Since the request parameters regarding the sensors and motor skills needed in each security mode are different, the access rights to the sensors and motor skills are also different for different security modes. The security mode "at home" is a security mode applied when the user and the robot 110 are at home. The security mode "walk" is a security mode applied when the user and the robot 110 go out for a walk.

The access rights to "camera image" are set to "2: Up to low-quality images permitted" for the security mode "at home", as a setting with consideration for the need for camera images and the user's privacy. On the other hand, the access rights to "camera image" are set to "3: All permitted" for the security mode "walk", as a setting with consideration for the need for camera images (improved image recognition accuracy for dangerous objects) and the admissibility of camera images as evidence. For similar reasons, the access rights to "distance measurement sensor" and "infrared sensor" are also each set to higher permission levels in the security mode "walk" than in the security mode "at home". Note that the access rights to "microphone audio", "temperature/humidity/barometric sensor", and "location sensor" are each set to "1: Permitted" in both the security mode "at home" and the security mode "walk", while the access rights to "tactile sensor" are set to "0: Not permitted" in both the security mode "at home" and the security mode "walk".

With regard to "motor skills", the access rights to "mobility skills" are set to a higher permission level in the security mode "walk" than in the security mode "at home". This is because a walk is taken outside the home, and thus it is necessary to extend the range of allowed movement to outside the home. Furthermore, to enable the robot 110 to escort the user while maintaining a fixed distance to the user, it is necessary to allow the robot 110 to move faster while on a walk compared to while at home. With regard to other motor skills, the access rights to "expression-changing skills" and "vocalization skills" are each set to "1: Permitted" in both the security mode "at home" and the security mode "walk", while the access rights to "pose-changing skills" are set to "1: Only head permitted" in both the security mode "at home" and the security mode "walk".

"Illumination function" is a function for turning the illumination device 110*g* on and off. The illumination function is turned off in the security mode "at home" and turned on in the security mode "walk".

In this way, the access rights of the company A server 101 with respect to data and event information related to the robot 110 accumulated in the company B server 111 are changed depending on the security mode. The access rights of the company A server 101 in each security mode are preset. On the other hand, to minimize the data about the user that is shared depending on the user's situation, the access rights to the data about the user are changed appropriately according to the security mode by the company B server 111, the robot 110, the company A app, the company B app, and/or the company A server 101.

Figure 7:
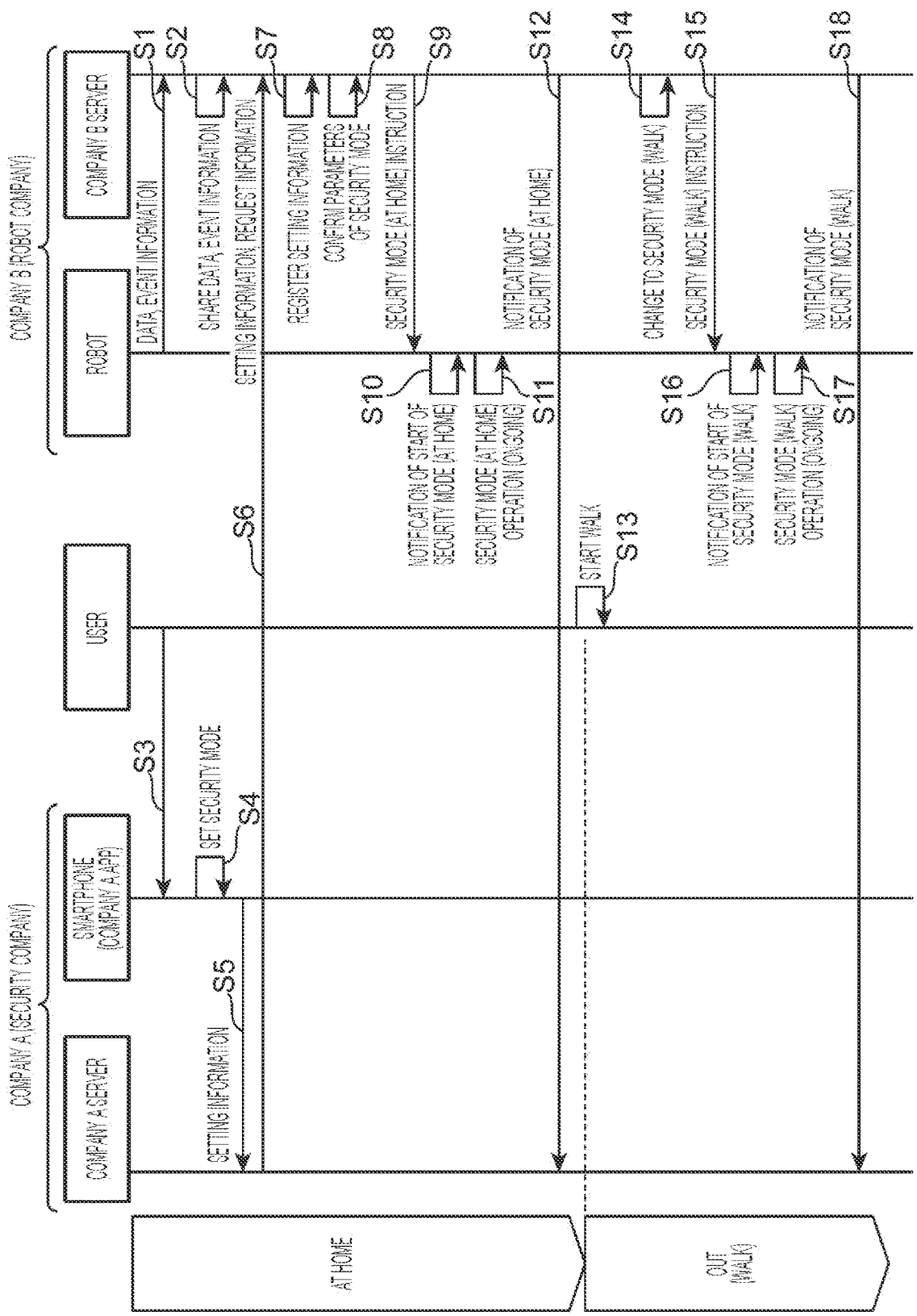
FIG. 7 is a sequence diagram illustrating an example of a process by an information system in a case where the entity that determines whether or not a robot and a user are out is a company B server.

FIG. 7 is a sequence diagram illustrating an example of a process by the information system in a case where the entity that determines whether or not the robot 110 and the user are out is the company B server 111.

First, it is assumed that the user is at home. In addition, it is assumed that the security mode of the robot 110 is not set to either "at home" or "walk".

(Step S1)

The robot 110 continually transmits data and event information to the company B server 111. The robot 110 uses the provided sensors 110c to continually collect information about the user's biological activity and information about the user's surroundings. The robot 110 continually transmits data including the collected information about the user's biological activity and information about the user's surroundings to the company B server 111. The robot 110 continually generates event information by analyzing the collected information about the user's biological activity and information about the user's surroundings, and continually transmits the generated event information to the company B server 111.

The event information is information with which the robot 110 issues notifications about changes in the state of the robot 110 or changes in the state of the user detected by the robot 110. For example, the event information includes "moving event information" produced upon detecting that the user is in a moving state, "rest event information" produced upon detecting that the user is in a resting state, "sleep event information" indicating that the user is in a sleeping state, "danger event information" produced upon detecting that the user is in a state of danger, "low battery event information" produced upon detecting that the remaining battery level of the robot 110 is low, and "lost event information" produced upon detecting that the robot 110 has lost track of the user while escorting the user outside the home.

By sending event information, the robot 110 can issue notifications regarding changes of state related to the user and the robot 110 without sending large quantities of sensor data. For example, if "moving event information" signifying that the user has started to move is analyzed from a camera image obtained as video data, the processing load on the server increases, and the load on the network bandwidth also increases. Accordingly, by using event information, more efficient cooperation between the robot 110 and the company B server 111 can be attained.

Furthermore, the event information includes confirmation information indicating that the robot 110 is near the user. The confirmation information includes, for example, location information about the smartphone 100 that the robot 110 has acquired from the smartphone 100, or in other words, location information about the user. Alternatively, the confirmation information may be information about a user recognition result obtained by the robot 110 determining whether the user appears in a camera image from an optical sensor included among the sensors 110c, the determination being made by analyzing the camera image with face authentication, gait authentication, or the like. The confirmation information may also be information that includes location information about the user.

(Step S2)

The company B server 111 continually transmits or discloses the obtained data and event information to the company A server 101 in the category of the access rights set for the company A server 101, and thereby shares the data and event information with the company A server 101.

(Steps S3, S4)

The smartphone 100 sets a security mode in accordance with input from the user. Setting information indicating the set content of the security mode includes the information displayed in FIG. 23 or 24 described later, for example. For example, the setting information includes security mode parameters. The security mode parameters include parameters of the security mode "at home" and parameters of the security mode "walk". The parameters of the security mode "walk" are parameters that change the security mode from "at home" to "walk". The parameters of the security mode "at home" are parameters that change the security mode from "walk" to "at home". For example, when the security mode is changed to "walk", the setting information may include information with which the robot 110 notifies the user of the change. The notification may be the display of information on the face of the robot 110 and/or a part of the body 10, the display of a logo of the security company, the output of speech announcing the change, or the output of a sound logo of the security company. Furthermore, the notification may also be a combination of the above.

(Step S5)

The smartphone 100 transmits the setting information and request information to the company A server 101. With respect to the security mode "walk", for example, the request information is information stipulating a request for causing the robot 110 to execute a code of conduct (a program, or an order of priority for actions) that causes the computational device 110b to control the moving element 110e of the robot 110 to escort the user outside the home, that is, outside a set at-home area, while keeping within a prescribed distance relative to the user, and at the same time causes the robot 110 to collect information about the user's surroundings using the sensors 110c. With respect to the security mode "at home", for example, the request information is information stipulating a request for causing the robot 110 to execute a code of conduct that causes the computational device 110b to control the moving element 110e and the sensors 110c of the robot 110 to keep within a prescribed distance relative to the user to monitor the user's safety inside the home, that is, inside a set at-home area.

(Step S6)

The company A server 101 receiving the setting information transmits the setting information and the request information to the company B server 111.

(Step S7)

The company B server 111 registers the received setting information and request information in the memory 111c.

(Step S8)

On the basis of the data and event information continually transmitted from the robot 110 and map information, the company B server 111 confirms whether the user satisfies the parameters of one of the security modes.

(Step S9)

If it is determined that the user satisfies the parameters of the security mode "at home", or if it is determined that the user satisfies the parameters of the security mode "at home" the most, the company B server 111 transmits an instruction to the robot 110 for changing to the security mode "at home".

(Step S10)

The robot 110 receiving the instruction for the security mode "at home" notifies the user about the start of the security mode "at home". Details about the notification will be described later.

(Step S11)

The robot 110 operates in the security mode "at home". The security mode continues until a new security mode instruction is received.

(Step S12)

The company B server 111 detects that the security mode has been changed to "at home" according to a response from the robot 110 (not illustrated), and transmits the result of the change to the security mode "at home" to the company A server 101.

(Step S13)

The user goes out with the robot 110 and starts a walk.

(Step S14)

Sensing results from the robot 110 satisfy the parameters of the security mode "walk", and therefore the company B server 111 changes the security mode to "walk".

(Step S15)

The company B server 111 transmits an instruction for changing the security mode to "walk" to the robot 110. The instruction is an example of a "command for changing the setting of the robot from a first specification to a second specification". The instruction includes a command causing the robot 110 to output an indication that the security mode has been changed after changing the security mode setting in the robot 110.

(Step S16)

The robot 110 receiving the instruction for the security mode "walk" notifies the user about the start of the security mode "walk". Details about the notification will be described later.

(Step S17)

The robot 110 continually operates in the security mode "walk".

(Step S18)

The company B server 111 detects that the robot 110 has changed the security mode "walk" according to a response from the robot 110 (not illustrated), and transmits the result of the change to the security mode "walk" to the company A server 101.

In FIG. 7, the company A server 101 is an example of an external computer. In FIG. 7, the smartphone 100 (or the company A app or the company B app executed thereon) may also transmit the setting information and the request information to the company B server 111. In this case, the smartphone 100 is an example of an external computer.

In FIG. 7, the confirmation information is location information about the user, but this is merely an example. For example, the confirmation information may also be information indicating that the robot 110 is determined to be near the user. In this case, the robot 110 may determine whether the robot 110 is near the user on the basis of a recognition result regarding an image of the user acquired using the sensors 110c, or determine whether the robot 110 is near the user on the basis of information about the current location of the smartphone 100 acquired from the smartphone 100.

Figure 8:
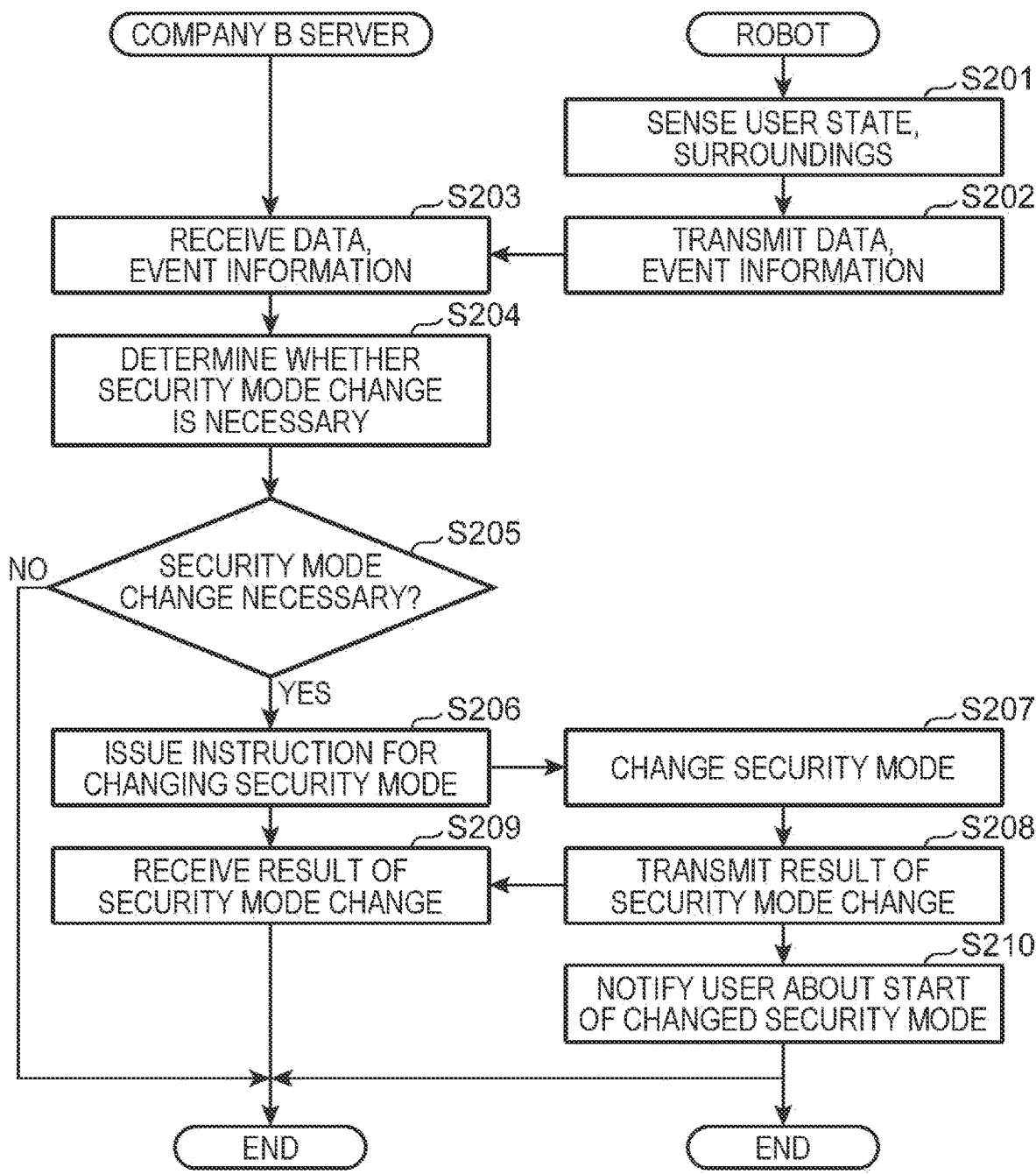
FIG. 8 is a diagram illustrating an example of a process by the company B server and the robot corresponding to FIG. 7.

FIG. 8 is a diagram illustrating an example of a process by the company B server 111 and the robot 110 corresponding to FIG. 7.

(Step S201)

The robot 110 uses the sensors 110c to sense the state of the user and the surroundings. Accordingly, information about the user's biological activity and information about the user's surroundings are obtained.

(Step S202)

The robot 110 transmits data including the biological information about the user and the information about the user's surroundings, and event information generated on the basis of the biological information about the user and the information about the user's surroundings, to the company B server 111.

(Step S203)

The company B server 111 receives the data and event information.

(Step S204)

The company B server 111 determines whether the security mode should be changed according to whether the data and event information received from the robot 110 satisfy the parameters of one of the security modes. For example, in the case where the currently set security mode is "at home" and the data and event information received from the robot 110 satisfy the parameters of the security mode "walk", the company B server 111 determines that it is necessary to change the security mode to "walk". As another example, in the case where the currently set security mode is "walk" and the data and event information received from the robot 110 satisfy the parameters of the security mode "walk", the company B server 111 determines that it is not necessary to change the security mode. As another example, in the case where the currently set security mode is "walk" and the data and event information received from the robot 110 do not satisfy the parameters of the security mode "walk" but do satisfy the parameters of the security mode "at home", the company B server 111 determines that it is necessary to change the security mode to "at home". As another example, in the case where the currently set security mode is "at home" and the data and event information received from the robot 110 satisfy the parameters of the security mode "at home", the company B server 111 determines that it is not necessary to change the security mode from "at home".

The company B server 111 compares the location information about the robot 110 included in the data and the location information about the user included in the confirmation information of the event information to the at-home area obtained from the map information, and if it is determined that the robot 110 and the user are both outside the at-home area, the company B server 111 may determine that the user (that is, the data and event information received from the robot 110) satisfies the parameters of the security mode "walk". On the other hand, in the case where the robot 110 and the user are both at home, the company B server 111 may determine that the user (that is, the data and event information received from the robot 110) does not satisfy the parameters of the security mode "walk" but does satisfy the parameters of the security mode "at home". The map information is stored in the memory 111c and includes information about the latitude and longitude of the home. The at-home area is an example of a prescribed area expressing the home.

Note that in the case where the confirmation information is the result of a determination by the robot 110 indicating that the user is near the robot 110, the company B server 111 may determine that the user (that is, the data and event information received from the robot 110) satisfies the parameters of the security mode "at home" if the location information about the robot 110 is located in the at-home area. Conversely, it may be determined that the parameters of the security mode "walk" are satisfied if the location information about the robot 110 is located outside the at-home area.

(Step S205)

If it is determined that a change of security mode is necessary (step S205, YES), the company B server 111 advances the process to step S206. On the other hand, if it is determined that a change of security mode is not necessary (step S205, NO), the company B server 111 ends the process.

(Step S206)

The company B server 111 transmits an instruction for changing the security mode to the robot 110.

(Step S207)

The robot 110 receiving the instruction changes the security mode. For example, the robot 110 changes the security mode from "at home" to "walk".

(Step S208)

The robot 110 transmits the result of changing the security mode to the company B server 111.

(Step S209)

The company B server 111 receives the result of changing the security mode.

(Step S210)

The robot 110 notifies the user about the start of the changed security mode. As described above, the company B server 111 uses the data and event information from the robot 110 to successively determine the security mode, and instructs the robot 110 to execute the security mode.

Figure 9:
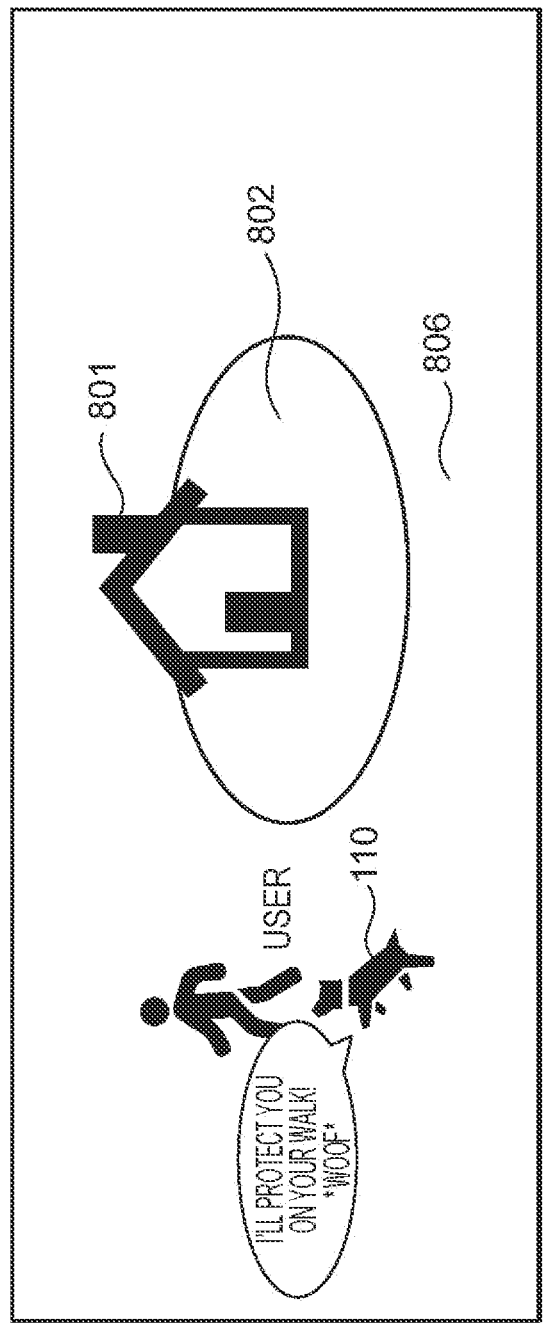
FIG. 9 is a diagram illustrating an example of a scenario in which a security mode is switched from "at home" to "walk"

FIG. 9 is a diagram illustrating an example of a scenario in which the security mode is switched from "at home" to "walk". For example, an at-home area 802 is a circular region of fixed radius centered on the location of a home 801. The area outside the at-home area 802 is an outside area 806 (walk area). If the robot 110 and the user are in the at-home area 802, the security mode "at home" is set, and if the robot 110 and the user are in the outside area 806, the security mode "walk" is set.

If the user and the robot 110 move from the at-home area 802 to the outside area 806, the security mode is changed to "walk". In this case, the robot 110 may notify the user about the change to the security mode "walk" by using the audio/video output device 100*f* to output sound information such as words, a barking sound, and a sound logo. One example of the sound information is a message such as "I'll protect you on your walk! *woof*". The robot 110 may also notify the user about the change to the security mode "walk" by displaying image information of a prescribed mark, such as a logo of the security company, on the displays 18, 24, and 34. The robot 110 may also notify the user about the change to the security mode "walk" with a specific behavior, such as walking on two legs. Also, if a display is provided in a location corresponding to the eyes, the robot 110 may also notify the user about the change to the security mode "walk" by changing the appearance of the eyes. Through these notifications, the user can be informed about the change in the security mode of the robot 110 which is difficult to discern from the outward appearance of the robot 110.

FIGS. 10, 11, 12, and 13 are diagrams that each illustrate an example of the at-home area 802. In FIGS. 10 to 13, the region inside the thick lines is the at-home area 802. The area where the user and the robot 110 are, the area being a parameter for switching the security mode of the robot 110, is one of the following or a combination thereof.

Figure 10:
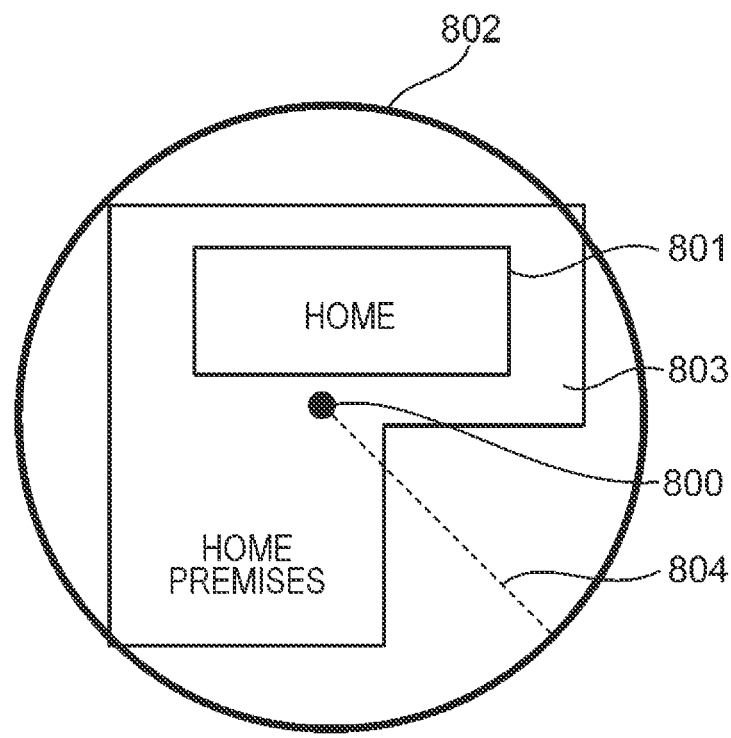
FIG. 10 is a diagram illustrating an example of an at-home area.

(1) The at-home area 802 in FIG. 10 is a circular region with a radius 804 centered on a spot 800. The spot 800 is location information acquired by the GPS of the smartphone 100 inside home premises 803. In this case, for example, the at-home area 802 is prescribed by latitude and longitude information about the spot 800 and information about the radius 804.

Figure 11:
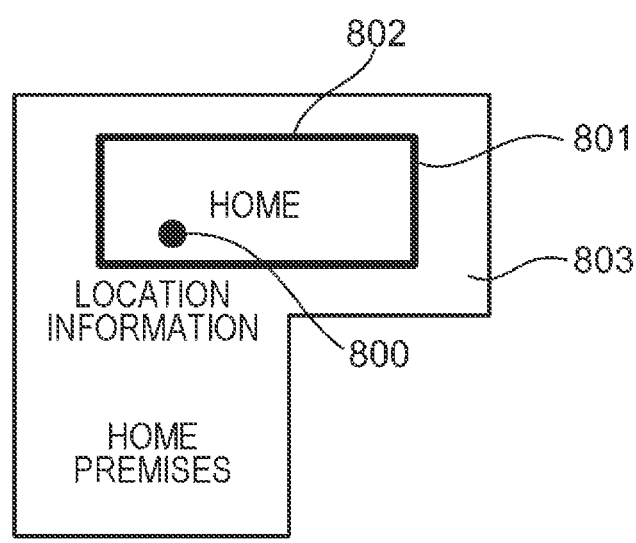
FIG. 11 is a diagram illustrating an example of an at-home area.

(2) The at-home area 802 in FIG. 11 is the region surrounded by the outline of the home 801. The outline shape of the home 801 is acquired from map information, for example.

Figure 12:
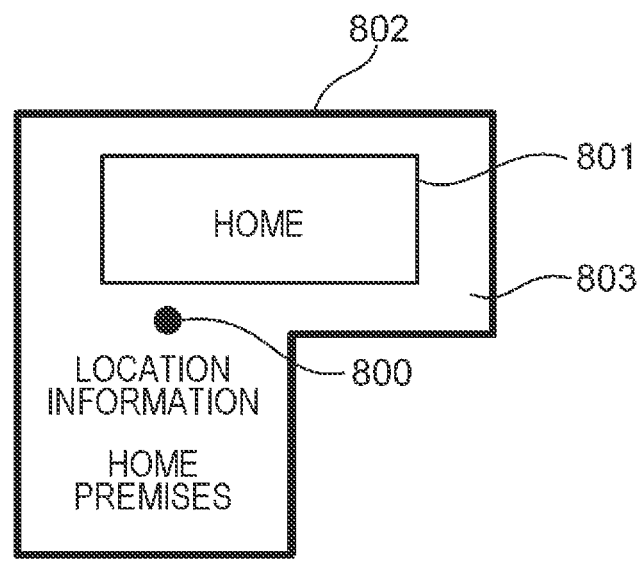
FIG. 12 is a diagram illustrating an example of an at-home area.

(3) The at-home area 802 in FIG. 12 is the region surrounded by the outline of the home premises 803. The outline of the home premises 803 is acquired from map information.

Figure 13:
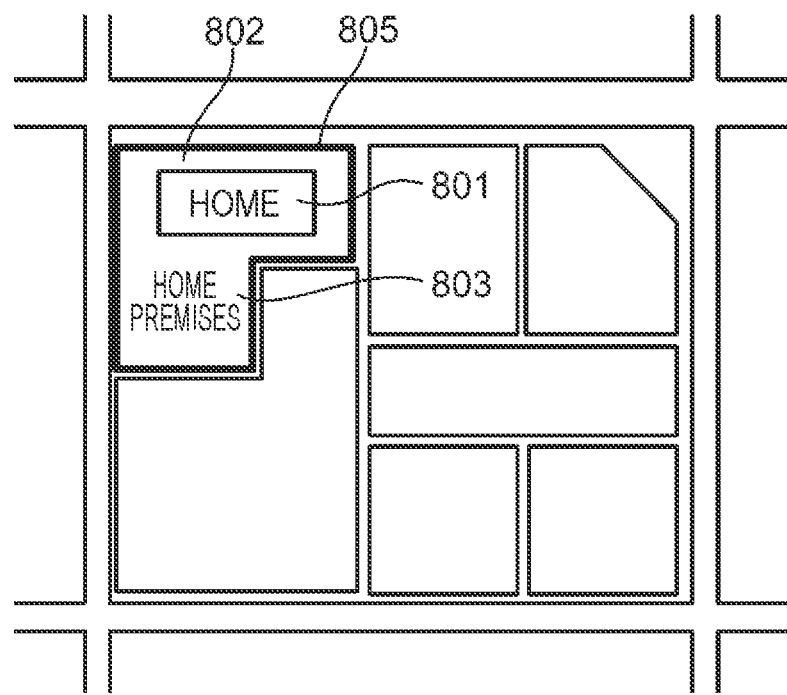
FIG. 13 is a diagram illustrating an example of an at-home area.

(4) The at-home area 802 in FIG. 13 is a region of any shape that the user designates on a map. For example, in a map image displayed on the smartphone 100, the inside of an outline 805 of the home premises 803 traced by the user is set as the at-home area 802.

(5) Otherwise, the at-home area 802 may be set on the basis of the location information of the spot 800 and a setting rule designated by the information system. The location information of the spot 800 is location information acquired by the GPS of the smartphone 100, for example. In this case, a region prescribed by a setting rule based on latitude and longitude information about the spot 800 is set as the at-home area 802. The setting rule may also be a circle like the one illustrated in FIG. 10.

(6) The information system may also set the at-home area 802 automatically using address information about the user's home and map information including the home 801 and/or the home premises 803. In this case, the at-home area 802 is set using home address information designated by the user and map information including the home 801 and/or the home premises 803 linked to the address information.

In all of the above cases (1) to (6), all areas other than the at-home area 802 may be treated as the outside area 806. With this arrangement, there is a clear boundary between the at-home area 802 and the outside area 806, and the security mode of the robot 110 can be changed accurately depending on the current location of the user and the robot 110.

The setting information about the at-home area 802 is recorded and managed in one or more locations from among the company A server 101, the company B server 111, and the memory 110*d* of the robot 110, for example. The setting information may also be information indicating the outline of the at-home area 802.

In all of the above cases (1) to (6), the setting information about the at-home area 802 may also be confirmed and set by the user through the smartphone 100. The setting information is acquired through the company A app, the company B app, or software by another company.

Figure 15:
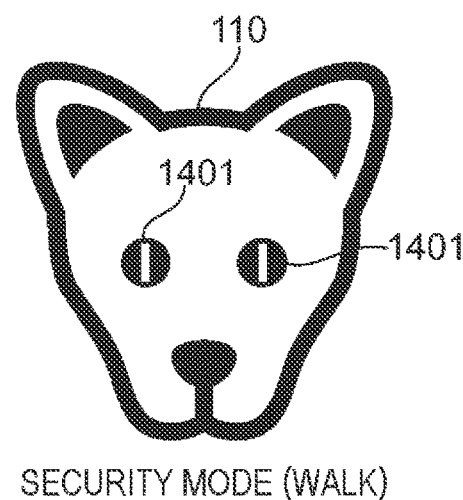
FIG. 15 is a diagram illustrating an example of a notification that a robot issues to a user.
Figure 16:
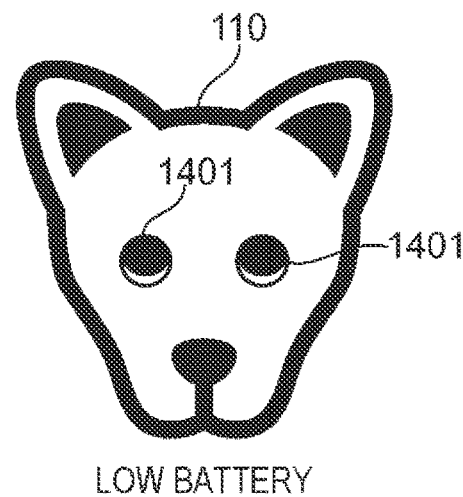
FIG. 16 is a diagram illustrating an example of a notification that a robot issues to a user.

FIGS. 14 to 16 are diagrams illustrating examples of notifications that the robot 110 issues to the user. FIG. 14 illustrates a notification issued when the security mode is changed to "at home". In the example of FIG. 14, the robot 110 displays images 1401 of left and right eyes with pupils having small circular glowing portions. FIG. 15 illustrates a notification issued when the security mode of the robot 110 is changed to "walk". In the example of FIG. 15, the robot 110 displays images 1401 of left and right eyes with pupils having long, narrow vertical lines. FIG. 16 illustrates a notification issued by the robot 110 when specific event information is generated. In the example of FIG. 16, the robot 110 displays images 1401 of left and right eyes with pupils having a crescent shape, as though the eyelids are half-closed. One example of the event information is low battery event information. Low battery refers to a state in which the remaining battery level of the robot 110 has fallen to a prescribed level or lower.

According to the above, the user can look at the image information displayed in the portion of the robot 110 corresponding to the eyes of the audio/video output device 110*f*, and thereby easily confirm whether the current mode of the robot 110 is the security mode "at home" or "walk" and also confirm whether event information such as "low battery" is occurring in the robot 110. These images 1401 are predetermined according to the types of security modes and the types of event information. Note that the images 1401 are displayed on the display 24 (FIG. 2), for example.

Figure 17:
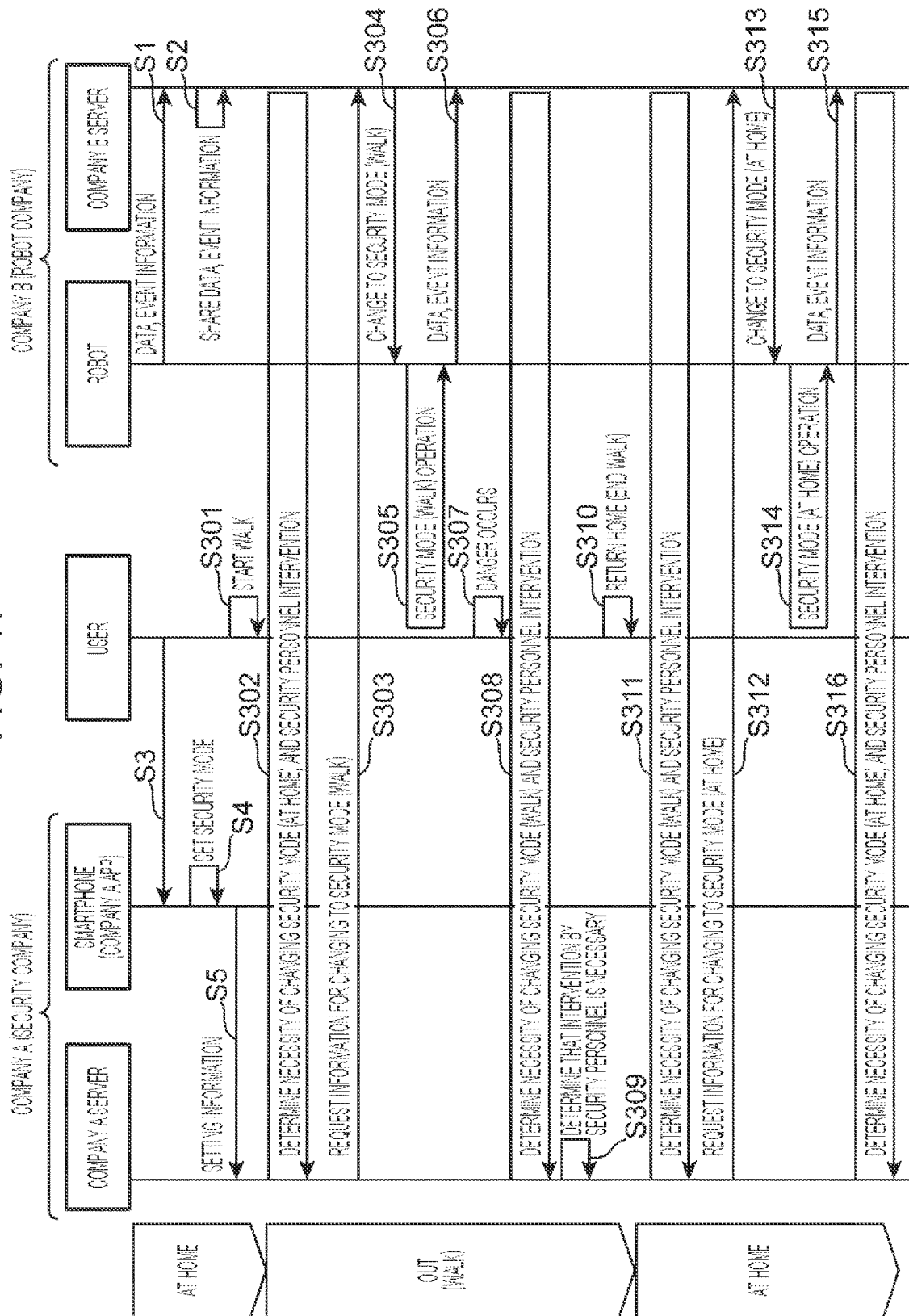
FIG. 17 is a sequence diagram illustrating an example of a process by an information system in a case where the entity that determines whether or not a robot and a user are out is a company A server.

Next, an arrangement in which the entity that determines whether or not the robot 110 and the user are out is the company A server 101 (an example of a second server) will be described. FIG. 17 is a sequence diagram illustrating an example of a process by an information system in a case where the entity that determines whether or not the robot 110 and the user are out is the company A server 101.

In FIG. 17, processes which are the same as FIG. 7 are denoted by the same signs and may be omitted from the following description.

(Step S301)

The user goes out with the robot 110 and starts a walk.

(Step S302)

The company A server 101 acquires the most recent data and event information about the user and the robot 110 through the company B server 111, and thereby continually determines the necessity of changing the security mode and security personnel intervention while monitoring the user and the robot 110. For example, from data acquired by the sensors 110c (location information about the robot 110), the company A server 101 detects that the robot 110 is out, from a camera image captured by the robot 110 (or confirmation information indicating the same), the company A server 101 detects that the user is near the robot 110 and that the user is moving at a walking pace (that is, the user is walking). Alternatively, the company A server 101 may detect that the user has started a walk outside the at-home area from a notification of "walk start event information" issued by the robot 110 to the company B server 111. Note that in the above case, the company A server 101 acquires the data and event information acquired by the robot 110 through the company B server 111, but the company A server 101 may additionally acquire map information, including at-home area information, through the company B server 111.

(Step S303)

The company A server 101 analyzes the acquired data and event information, detects that the user has started a walk with the robot 110, and transmits request information for changing the security mode from "at home" to "walk" to the company B server 111. Like in FIG. 7, the company A server 101 may transmit request information for changing the security mode from "at home" to "walk" if it is determined that the user (that is, the data and event information received from the 110) satisfies the parameters of the security mode.

The access rights that the company A server 101 has with respect to the sensors 110c and the motor skills of the robot 110 necessary for guarding the user through the robot 110 are different between the security mode "at home" and the security mode "walk". For this reason, the company A server 101 transmits request information for changing the security mode from "at home" to "walk" to the company B server 111. By switching the security mode, the access rights with respect to the sensors 110c and the motor skills are changed automatically.

(Step S304)

The company B server 111 receiving the request information transmits, to the robot 110, an instruction for changing the security mode of the robot 110 to "walk". The security modes "at home" and "walk" usable by the company A server 101 are preregistered in the company B server 111, similarly to the access rights to the sensors and motor skills.

(Step S305)

The robot 110 receiving the instruction for changing to the security mode "walk" changes its security mode to "walk". Thereafter, as long as an instruction for changing to a security mode other than "walk" is not received from the company B server 111, the computational device 110b of the robot 110 continues to control the moving element 110e and the sensors 110c such that the robot 110 operates on the basis of the code of conduct specified by the security mode "walk".

(Step S306)

Even after changing the security mode to "walk", the robot 110 continues to transmit data acquired using the sensors 110c and event information generated on the basis of the data to the company B server 111.

While the user continues the walk, the robot 110 continues to guard the user according to the code of conduct stipulated by the security mode "walk". How the robot 110 escorts the user and how the robot 110 responds to dangers that the user encounters are preset by the user using the company A app. Details will be described later.

(Step S307)

A danger to the user occurs. A danger refers to a situation in which there is an obstacle in the user's forward direction and a situation in which another person is approaching the user, for example.

(Step S308)

The company A server 101 receives data and event information from the company B server 111 and determines the necessity of changing the security mode "walk" and the necessity of security personnel intervention. In addition to the data and event information, the company A server 101 may also receive map information including at-home area information from the company B server 111.

(Step S309)

The company A server 101 determines the necessity of intervention by security personnel for ensuring the user's safety on the basis of the data and event information. The determination may also be made by security personnel (a human being) checking the camera image, that is, video data captured by the robot 110, for example. Alternatively, the company A server 101 may use image recognition technology to calculate a danger level of the user from the camera image, and determine the necessity of intervention by security personnel from the calculated danger level. Alternatively, the company A server 101 uses speech recognition technology or a technology for analyzing the user's emotions from speech to analyze speech information from the user acquired by the robot 110 and determine the danger level of the user, and determine the necessity of intervention by security personnel from the determined danger level. Alternatively, if image recognition technology is used to determine that a danger to the user has occurred, the company A server 101 may also transmit an alert indicating the occurrence to an external terminal operated by security personnel. In this case, the security personnel may check the alert through the external terminal and mobilize to go to the scene.

There are two stages of intervention by the company A security personnel. The first stage is remote security intervention. Security personnel do not go to the scene, but instead take measures for avoiding danger by using the sensors 110c and the audio/video output device 110f of the robot 110 to talk to the user at the scene, a person near the user, or a person attempting to harm the user. The second stage is security intervention at the scene. Security personnel are dispatched to the scene and take action for avoiding danger to the user at the scene. Both stages of security intervention are security services executed when the company A server 101 or the company A security personnel have determined that it would be difficult to ensure the user's safety with the robot 110 alone.

If the user is in a state of danger, the robot 110 may use the sensors 110c to sense the user and the situation around the user to enable later inspection of the scene, and saved the sensed data in the company A server 101, the company B server 111, and/or the memory 111c of the robot 110. In addition, the company A server 101, the company B server 111, and the robot 110 may also share the sensed data together with control information that disables deletion of the data for a fixed period. The company A server 101, the company B server 111, and/or the robot 110 may also calculate a hash value for proving that the sensed data has not been tampered with, and save the calculated hash value in two or more locations (for example, a company C server and the company B server).

(Step S310)

The user avoids danger thanks to the security service provided by the company A, and returns home safely. At this point, the walk ends.

(Step S311)

The company A server 101 receives data and event information from the company B server 111 and determines the necessity of changing the security mode "walk" and the necessity of security personnel intervention. In addition to the data and event information, the company A server 101 may also receive map information including at-home area information from the company B server 111.

(Step S312)

The company A server 101 detects, from the user's return home, that the user (that is, the data and event information received from the robot 110) does not satisfy the parameters of the security mode "walk" but instead corresponds to the parameters of the security mode "at home", and transmits request information for changing the security mode from "walk" to "at home" to the company B server 111.

(Step S313)

The company B server 111 receiving the request information outputs, to the robot 110, an instruction for changing the security mode from "walk" to "at home".

(Step S314)

The robot 110 receiving the instruction for updating to the security mode "at home" from the company B server 111 changes its security mode to "at home". Thereafter, as long as an instruction for changing to a new security mode is not received from the company B server 111, the computational device 110b of the robot 110 continues to control the moving element 110e and the sensors 110c such that the robot 110 operates according to the code of conduct specified by the security mode "at home".

(Steps S315, S316)

Even after updating the security mode to "at home", the robot 110 continues to transmit data and event information to the company B server 111, similarly to step S1. Similarly to step S302, the company A server 101 continually acquires the most recent data and event information from the company B server 111, and continually determines the necessity of changing the security mode and security personnel intervention. In addition to the data and event information, the company A server 101 may also receive map information including at-home area information from the company B server 111.

In FIG. 17, the company A server 101 is an example of an external computer and a second server. In FIG. 17, the smartphone 100 (or the company A app or the company B app executed thereon) may also transmit the setting information and the request information to the company B server 111. In this case, the smartphone 100 is an example of an external computer. In this case, the smartphone 100 may acquire data and event information from the company B server 111 and determine whether or not to change the smartphone on the basis of the acquired data and event information. In FIG. 17, the event information includes confirmation information, similarly to FIG. 7. The details of the confirmation information are the same as FIG. 7.

Figure 18:
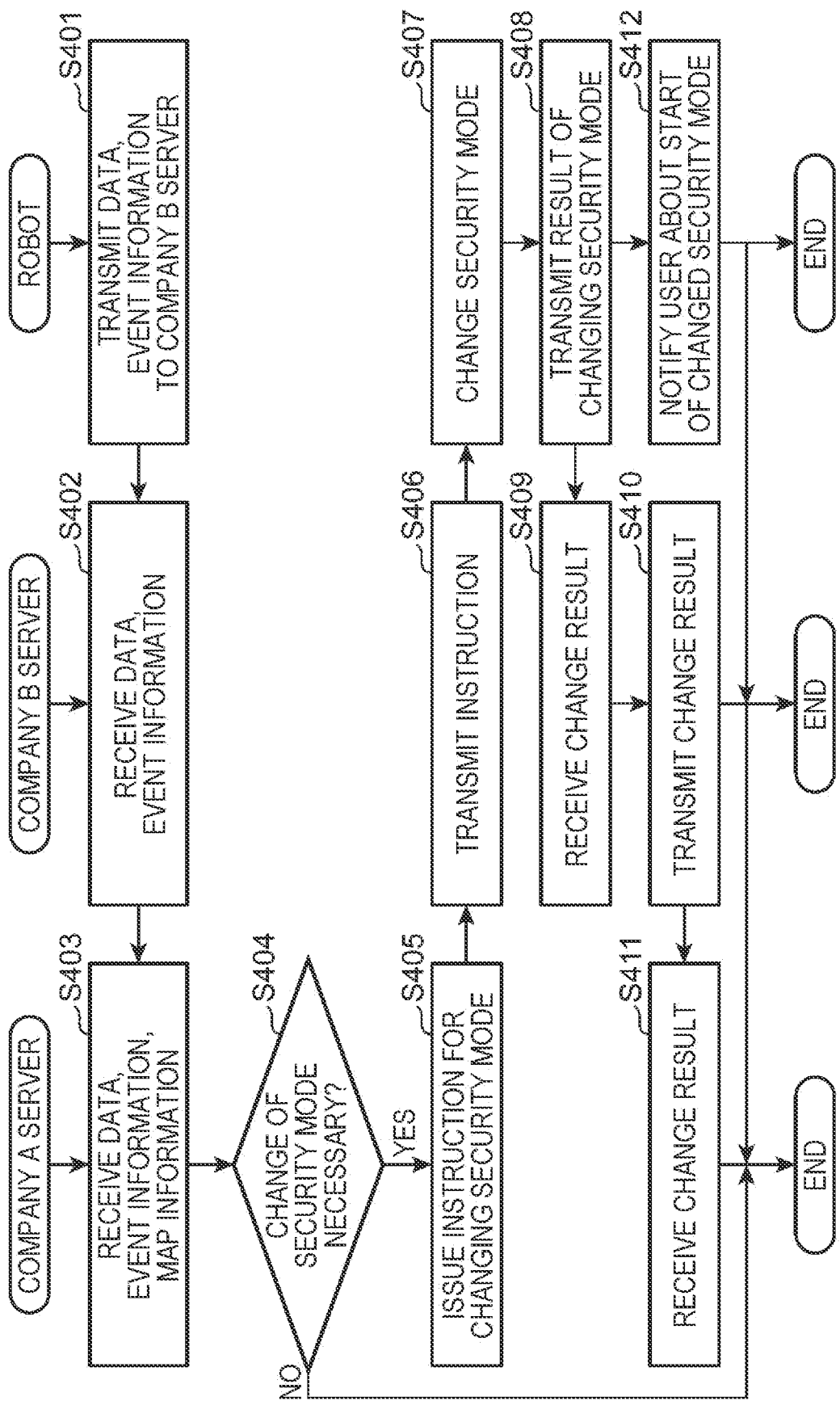
FIG. 18 is a flowchart illustrating an example of a process by the company A server, the company B server, and the robot corresponding to FIG. 17.

FIG. 18 is a flowchart illustrating an example of a process by the company A server 101, the company B server 111, and the robot 110 corresponding to FIG. 17.

(Step S401)

The robot 110 transmits data and event information to the company B server 111.

(Step S402)

The company B server 111 receives the data and event information from the robot 110.

(Step S403)

The company A server 101 receives data and event information from the company B server 111, and also receives the set at-home area information from the memory 101c or the company A app. In addition to the data and event information, the company A server 101 may also receive map information including at-home area information from the company B server 111.

(Step S403)

The company A server 101 determines whether the security mode should be changed through comparison with the parameters of the security modes on the basis of the user (that is, the data and event information received from the robot 110). The details of this process are the same as step S204. If it is determined that a change of security mode is necessary (step S403, YES), the company A server 101 advances the process to step S404. On the other hand, if it is determined that a change of security mode is not necessary (step S403, NO; in other words, the current security mode is to be continued), the company A server 101 ends the process.

(Step S404)

The company A server 101 transmits an instruction for changing the security mode to the company B server 111.

(Step S405)

The company B server 111 receiving the instruction checks the access rights of the company A server, and then transmits the instruction to the robot 110.

(Step S406)

The robot 110 receiving the instruction changes the security mode.

(Step S407)

The robot 110 transmits the result of changing the security mode to the company B server 111.

(Step S408)

The company B server 111 receives the result of the change.

(Step S409)

The company B server 111 transmits the result of the change to the company A server 101.

(Step S410)

The company A server 101 receives the result of the change.

(Step S411)

The robot 110 notifies the user about the start of the newly changed security mode. The details of the notification are the same as the arrangement described above with reference to FIGS. 9, 14, and 15. In the case where the company A server 101 is the entity that determines the security mode, the security mode is changed according to the above process.

Figure 19:
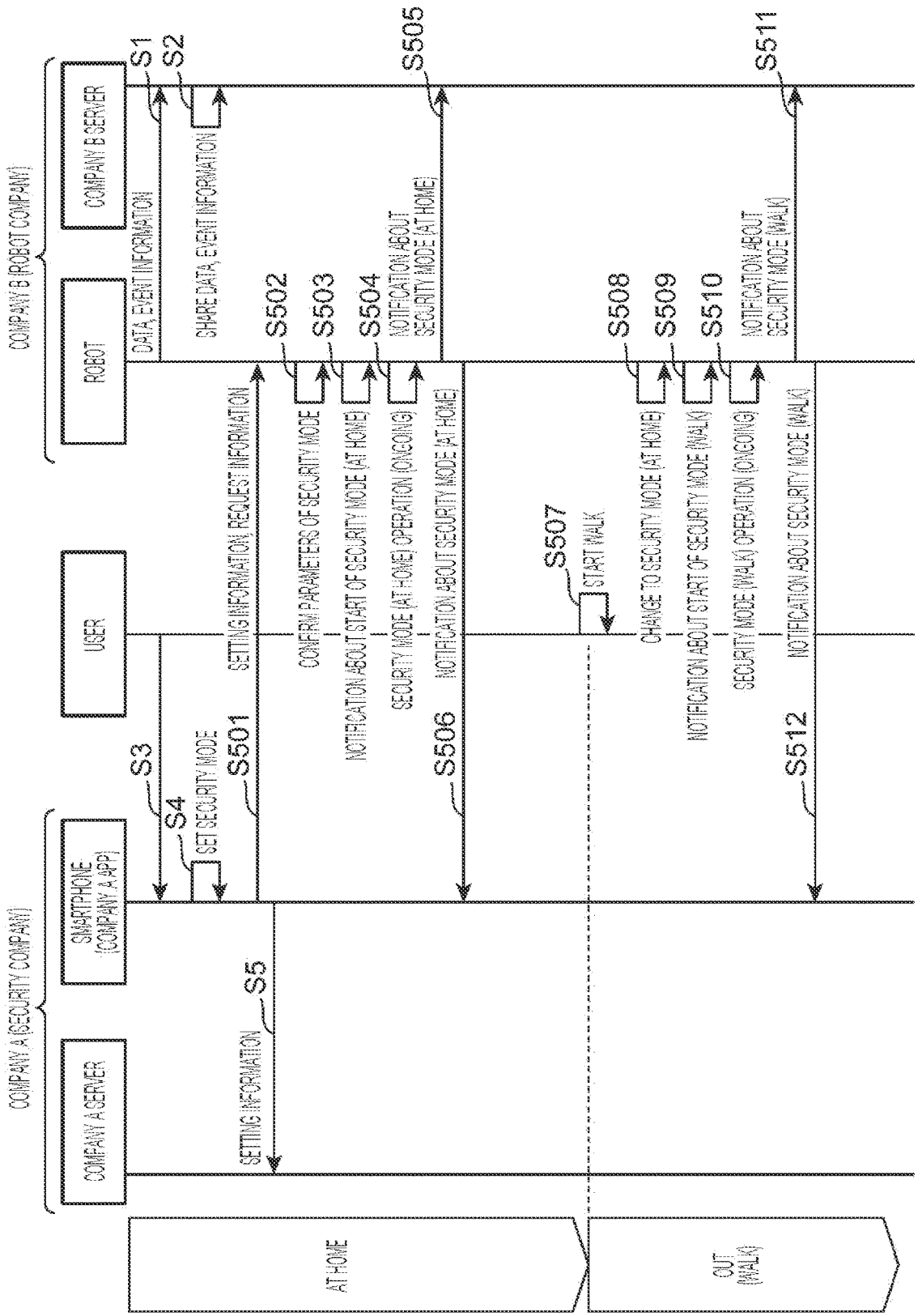
FIG. 19 is a sequence diagram illustrating an example of an information processing system in a case where the entity that determines whether or not a robot and a user are out is the robot.

Next, an arrangement in which the entity that determines whether or not the robot 110 and the user are out and also determines the security mode is the robot 110 will be described. FIG. 19 is a sequence diagram illustrating an example of an information processing system in a case where the entity that determines whether or not the robot 110 and the user are out and also determines the security mode is the robot 110. In FIG. 19, processes which are the same as FIG. 7 are denoted by the same signs and may be omitted from the following description.

In FIG. 19, the smartphone 100 and the robot 110 and paired in advance through a means of communication such as Wi-Fi®, Bluetooth®, or a cellular communication network (4G, 5G).
(Step S501)
The smartphone 100 (or the company A app or the company B app executed thereon) transmits the setting information and the request information to the robot 110. The details of the setting information and the request information are the same as FIG. 7.
(Step S502)
On the basis of the data and event information continually transmitted from the sensors 110c and the preset setting information and request information, the robot 110 confirms whether the user satisfies the parameters of one of the security modes. At this point, the user satisfies the parameters of the security mode "at home", and therefore the robot 110 changes its security mode to "at home". In addition to the data and event information, the company A server 101 may also receive map information including at-home area information from the company B server 111.
(Step S503)
The robot 110 notifies the user about the start of the security mode "at home". This is the same as step S10.
(Step S504)
The robot 110 continually operates in the security mode "at home". This is the same as step S11.
(Step S505)
Since the security mode has been changed to "at home", the robot 110 transmits the result of changing to the security mode "at home" to the company B server 111.
(Step S506)
Since the security mode has been changed to "at home", the robot 110 transmits the result of changing to the security mode "at home" to the smartphone 100 (or the company A app or the company B app executed thereon).
(Step S507)
The user goes out with the robot 110 and starts a walk.
(Step S508)
The user satisfies the parameters of the security mode "walk", and therefore the robot 110 changes its security mode to "walk".
(Step S509)
The robot 110 notifies the user about the start of the security mode "walk". The details of the notification are the same as in FIGS. 14 to 16 described above.
(Step S510)
The robot 110 continually operates in the security mode "walk".
(Step S511)
Since the security mode has been changed to "walk", the robot 110 transmits the result of changing to the security mode "walk" to the company B server 111.
(Step S512)
Since the security mode has been changed to "walk", the robot 110 transmits the result of changing to the security mode "walk" to the smartphone 100.

In FIG. 19, the smartphone 100 (or the company A app or the company B app executed thereon) is an example of an external computer. In FIG. 19, the smartphone 100, the company A app, or the company B app may also transmit the setting information and the request information to the robot 110 by going through (or not going through) the company B server 111. Alternatively, the setting information and the request information may be transmitted from the company A server 101 to the robot 110 by going through (or not going through) the company B server 111. In this case, the company A server 101 is an example of an external computer. In FIG. 19, the event information includes confirmation information, similarly to FIG. 7. The details of the confirmation information are the same as FIG. 7.

Figure 20:
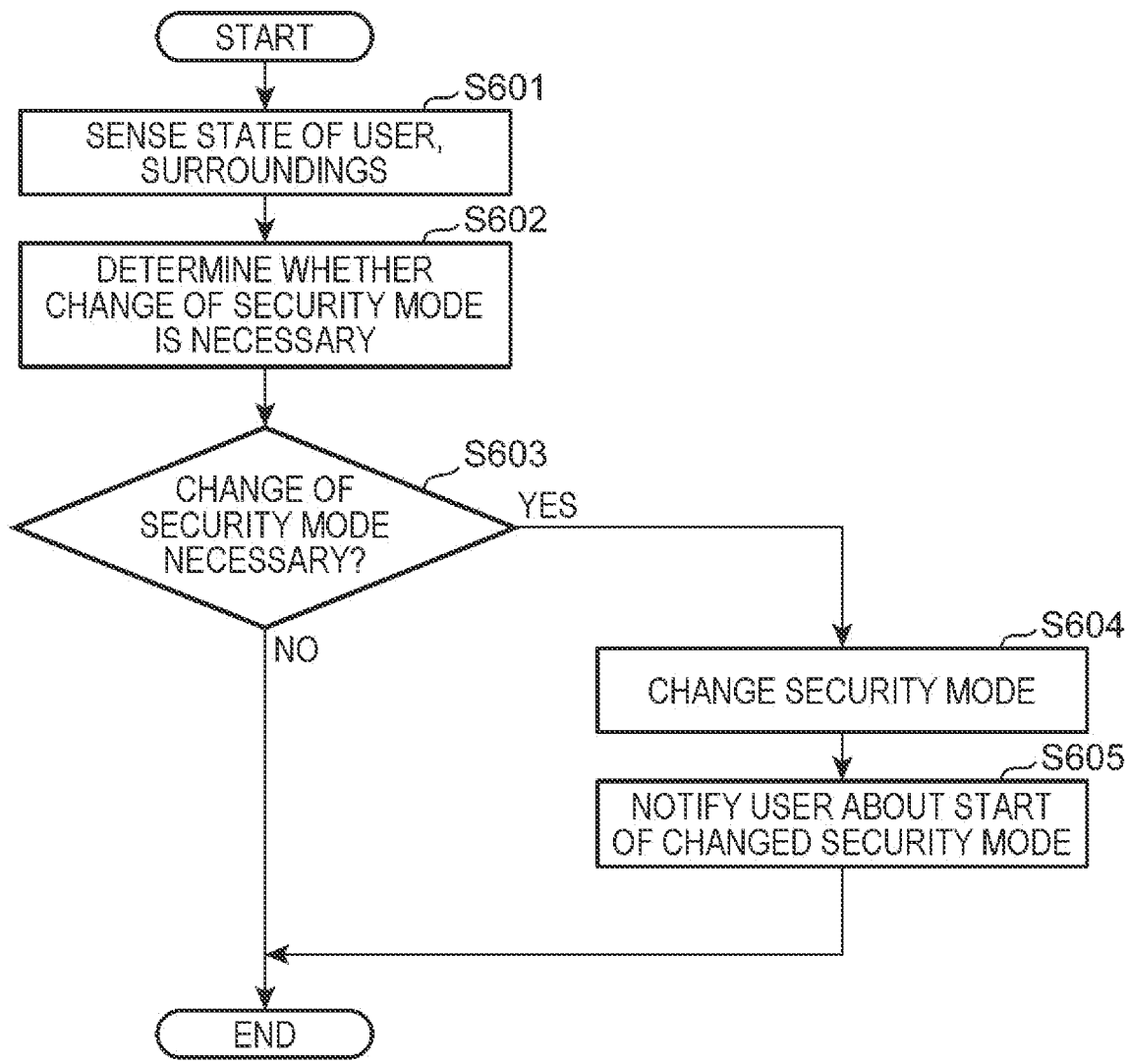
FIG. 20 is a flowchart illustrating an example of a process by the robot corresponding to FIG. 19.

FIG. 20 is a flowchart illustrating an example of a process by the robot 110 corresponding to FIG. 19.
(Step S601)
The robot 110 uses the sensors 110c to sense the state of the user and the surroundings. Accordingly, information about the user's biological activity and information about the user's surroundings are obtained.
(Step S602)
The robot 110 determines whether the security mode should be changed according to whether the user (that is, the data and event information received from the robot 110) satisfies the parameters of one of the security modes. The details of this determination are the same as step S204.
(Step S603)
If it is determined that a change of security mode is necessary (step S603, YES), the robot 110 advances the process to step S604. On the other hand, if it is determined that a change of security mode is not necessary (step S603, NO), the robot 110 ends the process. In this case, the current security mode is continued.
(Step S604)
The robot 110 changes its security mode. For example, the robot 110 changes from the current security mode "at home" to the security mode "walk". Obviously, the reverse change may also be performed in some cases.
(Step S605)
The robot 110 notifies the user about the start of the changed security mode. In this case, a notification is issued like in FIG. 14 or 15 described above.

Figure 21:
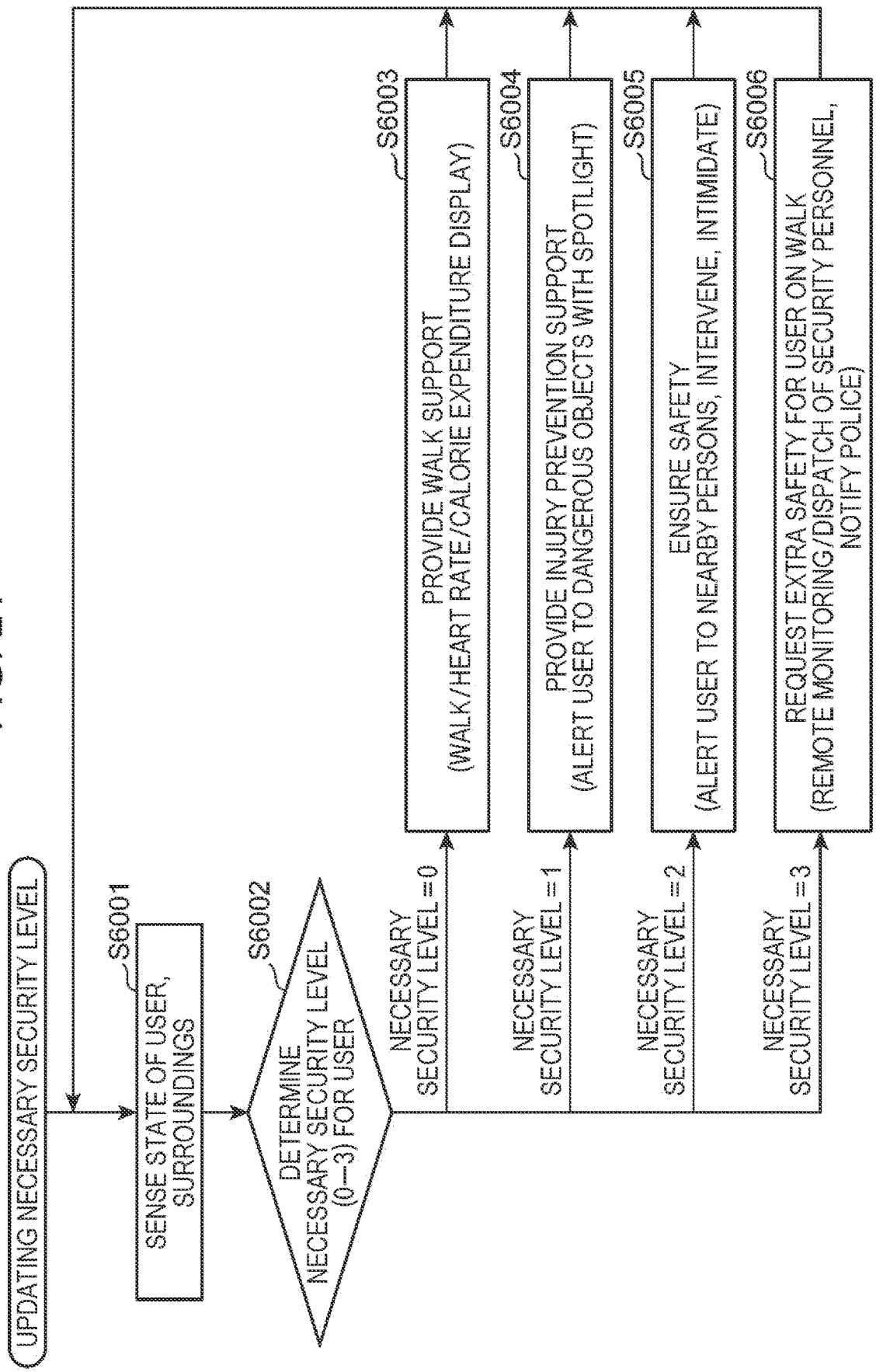
FIG. 21 is a flowchart illustrating an example of a process for updating a necessary security level in a robot.

FIG. 21 is a flowchart illustrating an example of a process for updating a necessary security level in the robot 110.

The necessary security level refers to an indicator obtained by comprehensively evaluating the degree to which the robot 110 needs to ensure the user's safety according to the state of the user and situation surrounding the user.

The necessary security level is expressed as a value from 0 (minimum) to 3 (maximum) as a result of determining the danger level. The specific actions of the robot 110 are determined according to this value in combination with the currently applied security mode.
(Step S6001)
The robot 110 acquires data indicating the state of the user and sensing data indicating the situation surrounding the user, the data being sensed by the sensors 110c. The sensing data is, for example, a camera image, a depth image, an infrared image, microphone audio, tactile sensor values, temperature/humidity/barometric sensor values, and/or location information. The robot 110 may also acquire sensing data sensed by external sensors over a network. The external sensors are, for example, sensors included in a wearable device worn by the user, cameras installed at street corners, and information such as weather forecast information and road traffic information corresponding to the location information about the robot 110, such information being acquirable over the Internet.

(Step S6002)

The robot 110 determines the necessary security level of the user from the danger level of the user obtained by analyzing the acquired sensing data. The following describes processes according to the determined value of the necessary security level.

(Step S6003)

If it is determined from the information from the sensors 110c that no dangerous objects or approachers exist near the user, the computational device 110b of the robot 110 determines that the necessary security level is 0 (minimum danger level). The computational device 110b of the robot 110 controls the moving element 110e, the illumination device 110g, and the like of the robot 110 to perform operations for supporting the user on a walk, and returns the process to step S6001. For example, the robot 110 may use the illumination device 110g to display, ahead of the user in the forward direction, a target number of steps for the walk, a target calorie expenditure for the walk, a target walking time for the walk, the number of steps taken since beginning the walk, the number of steps taken today, the remaining number of steps until today's target number of steps is reached, the user's heart rate, the user's calorie expenditure, the elapsed time of the walk, and/or the predicted time remaining on the walk.

(Step S6004)

If it is determined from the information from the sensors 110c that a dangerous object exists near the user, the computational device 110b of the robot 110 determines that the necessary security level is 1 (low danger level). The computational device 110b of the robot 110 controls the moving element 110e, the illumination device 110g, and the like of the robot 110 to perform supporting operations for preventing injury to the user on the walk, performs processes such as alerting the user by illuminating the detected danger and choosing a route that bypasses the danger, and returns the process to step S6001. For example, the robot 110 may use the illumination device 110g to shine light on a dangerous object near the user and alert the user about the object. A dangerous object refers to an uneven road surface or step of prescribed size, an obstacle ahead in the forward direction, and the like.

Instead of, or in addition to, illuminating a dangerous object with light, if a dangerous object is detected, the robot 110 may also control the moving element 110e to move in front of or beside the user to guide the user such that the user walks on a safe route keeping a certain distance from the dangerous object.

(Step S6005)

If it is determined from the information from the sensors 110c that a dangerous person (or other) exists near the user, the computational device 110b of the robot 110 sets the necessary security level to 2 (high danger level). The computational device 110b of the robot 110 controls the moving element 110e and the like of the robot 110 to perform operations for ensuring the safety of the user on a walk, and returns the process to step S6001. For example, the robot 110 uses the illumination device 110g to display, around the user, information indicating that the user is being guarded by the robot 110. The information indicating that the user is being guarded is, for example, a ring of light surrounding the user, a log of the security company A, and the characters "under guard".

Alternatively, the robot 110 may use the audio/video output device 110f to output sounds that alert or intimidate a suspicious person. The alert notifies the suspicious person that the company A is guarding the user, for example. The intimidation notifies the suspicious person that he or she could be immediately reported to the company A guarding the user, for example.

Alternatively, the robot 110 may control the moving element 110e such that the robot 110 positions itself between the user and the suspicious person to maintain a certain distance between the user and the suspicious person.

(Step S6006)

If it is determined from the information from the sensors 110c that a dangerous person (or other) has not been successfully removed from the vicinity of the user, and/or if the robot 110 is unable to keep the dangerous person (or other) a certain distance from the user via security measures using the audio/video output device 110f, the moving element 110e, and the illumination device 110g of the robot 110, the computational device 110b of the robot 110 sets the necessary security level to 3 (highest danger level). In this case, the user is in a dangerous situation requiring intervention by (human) security personnel, and therefore the computational device 110b of the robot 110 transmits, to the company A server 101, a signal requesting company A security personnel for ensuring the safety of the user on the walk, and returns the process to step S6001. For example, the robot 110 may use the sensors 110c and the audio/video output device 100f to enable security personnel to talk with the suspicious person directly and ensure the user's safety. If the user is in a more dangerous situation, or if the state of danger persists even after performing remote security by the security personnel, the robot 110 may transmit, to the company A server 101, a dispatch request for dispatching company A security personnel to the scene. Alternatively, the robot 110 may report to the police. The report may include information informing the police of the location of the scene and the situation at the scene by using audio, text, and/or camera images.

The necessary security level may be determined by an external computer external to the robot 110, such as any of the company B server 111, the company A server 101, the smartphone 100, or the company A app or company B app executed on the smartphone 100, for example. In this case, the robot 110 may transmit the sensing data from the sensors 110c, the event information obtained by having the computational device 110b process the sensing data, and information about the necessary security level currently implemented by the robot 110 to the external computer over a network, thereby causing the communication device 110a of the robot 110 to receive the necessary security level from the external computer.

Figure 22:
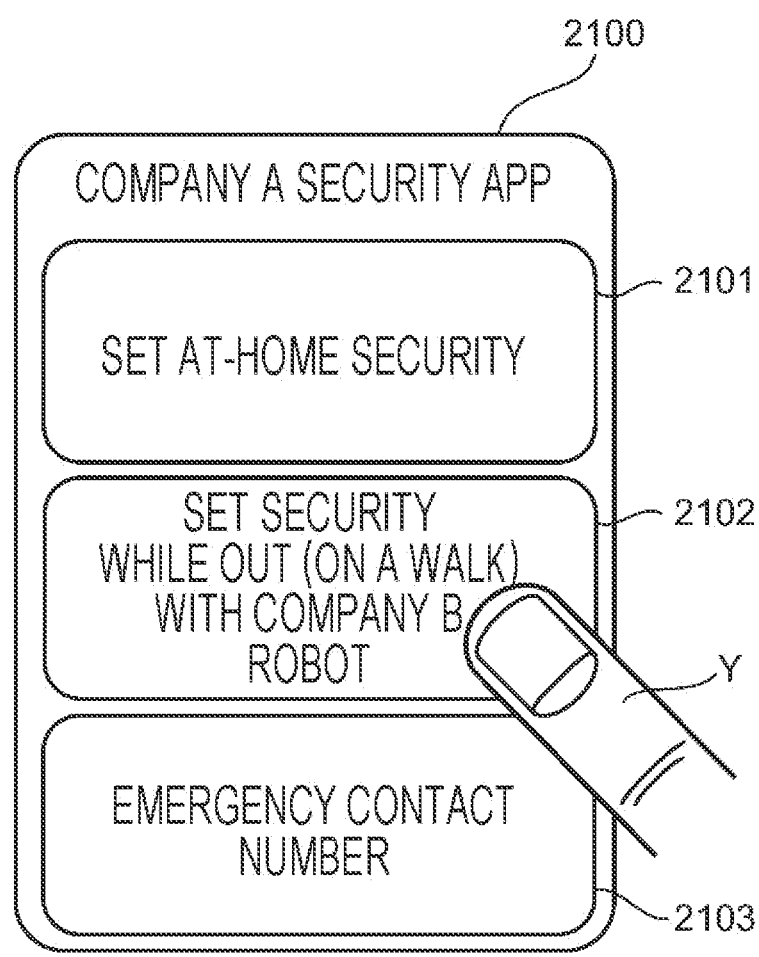
FIG. 22 is a diagram illustrating an example of a home screen displayed on a smartphone after launching a company A app.

FIG. 22 is a diagram illustrating an example of a home screen 2100 displayed on the smartphone 100 after launching the company A app. The home screen 2100 includes a button 2101 labeled "set at-home security", a button 2102 labeled "set security while out (on a walk) with company B robot", and a button 2103 labeled "emergency contact number".

The button 2101 is a button for establishing various settings related to the security provided by the robot 110 when the user is at home with the robot 110. The button 2102 is a button for establishing various settings related to the security provided by the robot 110 when the user is out on a walk together with the robot 110. The button 2103 is a button for specifying the contact number of someone to be notified about the user's danger if an emergency occurs, or for defining the conditions under which such a notification is issued.

Figure 23:
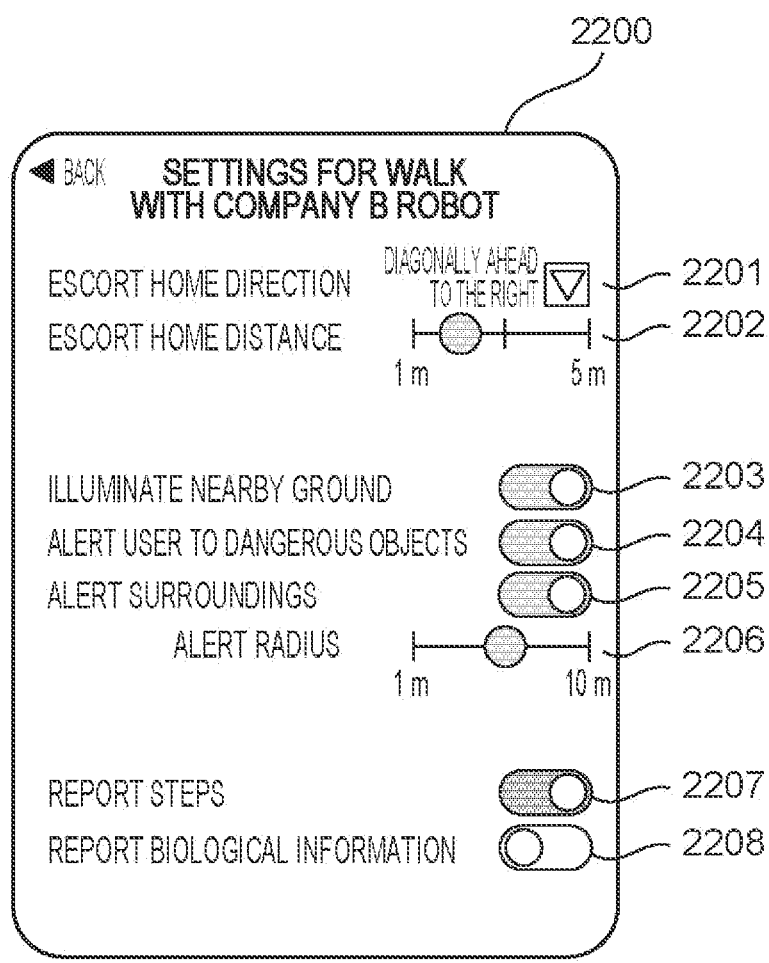
FIG. 23 is a diagram illustrating an example of a settings screen.

If the user launches the company A app installed on the smartphone 100 and performs a touch operation or speech operation on the button 2102, a settings screen 2200 in FIG. 23 is displayed.

FIG. 23 is a diagram illustrating an example of the settings screen 2200. The settings screen 2200 is a screen for setting how the robot 110 escorts the user when the user goes on a walk with the robot, what measures are to be taken by the robot in response to certain kinds of dangers, what kind of supplementary information about the walk is to be reported to the user, and the like.

A setting field 2201 labeled "escort home direction" is a field by which the user uses a pull-down menu to set the home direction of the robot 110 when the robot 110 escorts the user. The home direction is the direction of a home position. The home position is the spot where the robot 110 is positioned relative to the user when escorting the user. The home direction is the direction, relative to the forward direction of the user, in which the home position of the robot 110 is located.

For example, the pull-down menu of the setting field 2201 is configured such that one of the following operations is selectable: "in front" which indicates in front of the user; "diagonally ahead to the right" which is located 45 degrees clockwise from "front"; "right side" which is located another 45 degrees clockwise; "diagonally behind to the right" which is located another 45 degrees clockwise; "behind" which is located another 45 degrees clockwise; "diagonally behind to the left" which is located another 45 degrees clockwise; "left side" which is located another 45 degrees clockwise; and "diagonally ahead to the left" which is located another 45 degrees clockwise. In the diagram, the user has set "diagonally ahead to the right", and therefore the robot 110 moves with the direction "diagonally ahead to the right" of the user as the home direction. To maintain the designated home direction, the robot 110 uses a camera image or the like acquired by the sensors 110*c* to sense the user's location and forward direction, and controls the moving element 110*e* to adjust its own position on the basis of the sensing result.

A setting field 2202 labeled "escort home distance" is a field by which the user uses a slider to set a home distance. The home distance is the distance between the robot 110 and the user when escorting the user. For example, the slider is configured such that the home distance can be set in the range from 1 m to 5 m. In the diagram, the user has set a distance of approximately 2 m, and therefore the robot 110 moves by controlling the moving element 110*e* to basically maintain a distance about 2 m away from the user. To maintain the designated home distance, the robot 110 uses a camera image, depth image, and the like acquired by the sensors 110*c* to sense the user's location, and corrects its own position.

A setting field 2203 labeled "illuminate nearby ground" is a setting for turning on or turning off a nearby ground illumination function by which the robot 110 illuminates the road surface from the user's feet in the forward direction of the user. In the diagram, the user has turned the function "on", and therefore the robot 110 controls the beam direction of the illumination device 110*g* to illuminate the nearby ground at the feet of the user on a walk. Note that in the case where the illumination device 110*g* is not capable of changing the beam direction, the robot 110 may control the beam direction by using the moving element 110*e* to alter the inclination of a portion of the robot 110 that includes the illumination device 110*g*. To maintain illumination indicating the forward direction while on a walk, the robot 110 may use a camera image or the like acquired by the sensors 110*c* to sense the user's location and forward direction, and adjust the illumination device 110*g* and/or the inclination of the above portion on the basis of the sensing result.

On the other hand, if the illumination function is turned "off", the robot 110 does not activate the function for illuminating the nearby ground at the user's feet.

By continually illuminating the nearby ground, nearby persons can be made aware that the robot 110 is ensuring the user's safety. As a result, by turning "on" the nearby ground illumination function, an effect of keeping the user out of dangerous situations with suspicious persons can also be anticipated.

A setting field 2204 labeled "alert user to dangerous objects" is a field for turning on or turning off an alert user to dangerous objects function by which the robot 110 illuminates (with a spotlight) and/or calls out with sound a dangerous object in front of the user. In the diagram, the user has turned the function "on", and therefore the robot 110 shines a spotlight on a dangerous object in the forward direction (ahead) of the user on a walk, or outputs sound alerting the user to the dangerous object. The robot 110 may use a camera image, depth image, and the like acquired by the sensors 110*c* to detect a dangerous object in the forward direction of the user and nearby, and adjust the illumination device 110*g* and/or the inclination of a portion including the illumination device 110*g* to illuminate the dangerous object. The robot 110 may also use the audio/video output device 110*f* to inform the user that there is a dangerous object. If the robot 110 detects a dangerous object, the robot 110 may move from the home position to a position in front of the user and guide the user on a safe route that the user should take. In this case, the robot 110 may return to the home position again after the user has passed the dangerous object.

On the other hand, if the function for alerting the user to dangerous object" is turned "off", the robot 110 does not alert the user to dangerous objects.

Dangerous objects include, for example, objects of a prescribed size or larger, uneven road surfaces, level differences in the road surface, and obstructions in the forward direction of the user. Alternatively, dangerous objects may be cars, bicycles, and the like approaching the user, for example.

A setting field 2205 labeled "alert surroundings" is a field for turning on or turning off a function by which the robot 110 gives notice or demonstrates, in an easily understood way, the presence of the user to moving bodies including people around the user. Besides people, the moving bodies include cars and bicycles ridden by people and objects or vehicles that move autonomously by computer control, for example. With this function, nearby people can be made aware that the user is being guarded by the robot 110. In the diagram, the user has turned "on" the function for alerting the surroundings, and therefore the robot 110 gives notice or demonstrates, in an easily understood way, the presence of the user to moving bodies near or approaching the user on a walk.

The robot 110 uses a camera image, depth image, and the like acquired by the sensors 110*c* to detect moving bodies near or approaching the user. If necessary, the robot 110 uses the illumination device 110*g* to display information on the road surface or the like to a detected moving body, illuminates the user so that the user is perceived more easily, and uses the audio/video output device 110*f* to call out to moving bodies with sound or speech.

Also, if autonomous moving bodies such as other robots, self-driving cars, and drones approach the user, the robot 110 may use the communication device 110a to broadcast a wireless communication signal (for example, a beacon) indicating information about the current location of the user and/or the presence of the robot 110. This arrangement makes it possible to avoid contact with the user and the robot 110.

On the other hand, if the function for alerting the surroundings is turned "off", the robot 110 does not alert moving bodies near or approaching the user.

A setting field 2206 labeled "alert radius" is a parameter related to "alert surroundings". In the diagram, the alert radius has been set to approximately 5 m, and therefore persons or moving bodies within 5 m from the user are alerted to the presence of the user. If the "alert surroundings" function is "off", the alert radius is disabled.

A setting field 2207 labeled "report steps" is a setting for turning on or turning off a function by which the robot 110 notifies the user of information about the user's steps. In the diagram, the function is turned "on", and therefore the robot 110 notifies the user of information about the steps taken by the user on a walk. For example, the robot 110 uses the audio/video output device 110f to output speech notifying the user about the number of steps, in units of 1000 steps, that the user has taken since the start of the walk. The robot 110 may also notify the user of step information by using the illumination device 110g to display, on the road surface, the number of steps that the user has taken today.

On the other hand, if the function is turned "off", the robot 110 does not notify the user of step information while on a walk.

A setting field 2208 labeled "report biological information" is a setting for turning on or turning off a function by which the robot 110 notifies the user of information about the user's biological activity. In the diagram, the function is turned "off", and therefore the robot 110 does not notify the user of information about the user's biological activity while on a walk. If the function is turned "on", similarly to "report steps" above, the robot 110 uses the audio/video output device 110f and the illumination device 110g to notify the user of biological activity information such as the user's heart rate, blood pressure, body temperature, and activity level (calorie expenditure).

In this way, through the settings screen 2200, the user is able to establish presets to his or her liking with regard to various operations that the robot 110 performs while on a walk. With this arrangement, the user can use the robot 110 to go on a walk, which is associated with a certain degree of risk, more safely. Moreover, the user gains a sense of relief knowing that he or she can go for a walk safely, thereby increasing opportunities for the user to maintain his or her health and attain mental stability.

Figure 24:
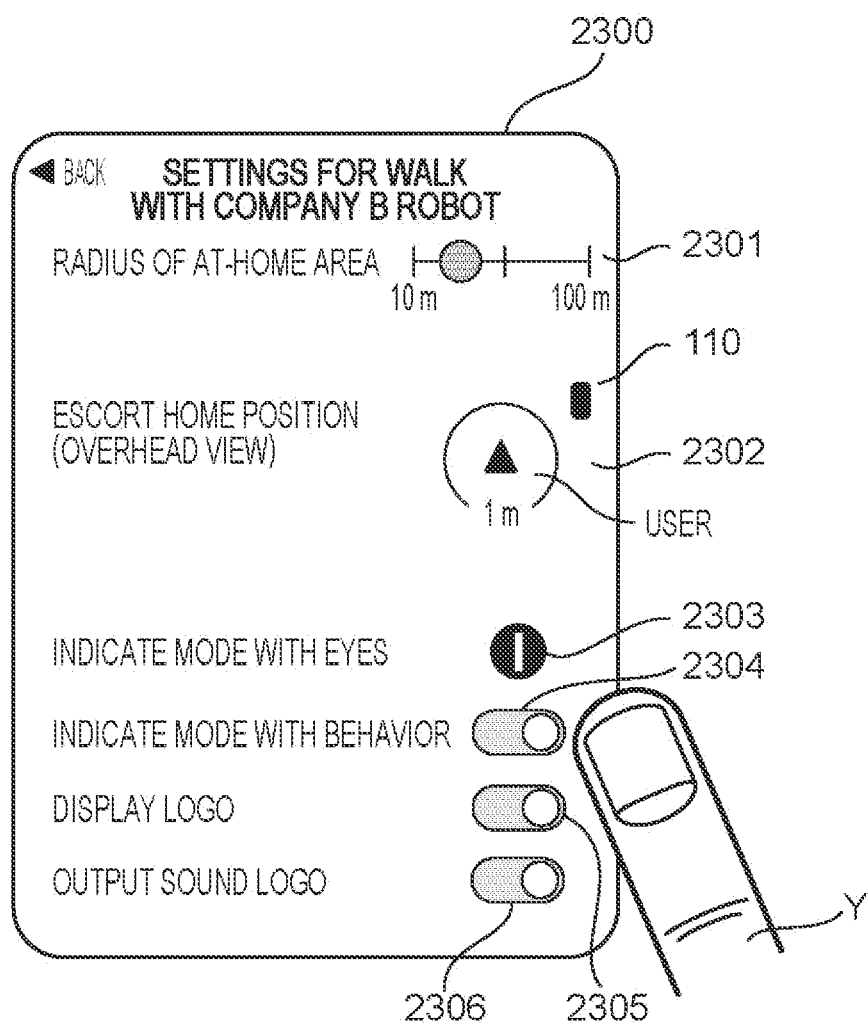
FIG. 24 is a diagram illustrating a settings screen in another example according to the embodiment.

FIG. 24 is a diagram illustrating a settings screen 2300 in another example according to the embodiment. A setting field 2301 labeled "radius of at-home area" is a field for setting the radius 804 illustrated in FIG. 10. In this field, the user can use a slider to input the radius 804 in the range from 10 m to 100 m. In this example, the radius is set to approximately 30 m. Consequently, the range within approximately 30 m from the center of the home is set as the at-home area 802.

A setting field 2302 labeled "escort home position" is a field for setting the home position. The setting field 2302 displays icons representing the robot 110 and the user as though looking down on the robot 110 and the user from overhead. The user sets the home position by moving the icon of the robot 110 with a finger Y. Note that the setting field 2302 may also set the home position by prompting the user to input the home direction and the home distance described above. The user may also set the home position by saying "run on my left side" or by performing a gesture input, for example.

The robot 110 may also use the sensors 110c to sense a state of the user, such as the user walking, jogging, or cycling, and adjust the home position according to the sensed state of the user. The robot 110 may also adjust the home position dynamically on the basis of the surrounding situation, such as the type of road such as a sidewalk, the width of the road, the presence or absence of level differences in the road, and the amount of nearby pedestrian and automotive traffic.

For example, if the sensors 110c detect that nearby people are not present, the robot 110 escorts the user diagonally ahead to the right at the home position set by the user. On the other hand, if there are more people around the user or if the user passes by another person, the robot 110 may escort the user by temporarily moving to a position that does not obstruct the user, the surrounding people, or the passerby. The position that does not obstruct is a position directly in front of or directly behind the user in the forward direction of the user, for example.

In the case where the robot 110 uses image recognition to track the user's body, it is natural for the robot 110 to be positioned behind the user and follow the user. However, there are demerits to staying behind the user from the standpoint of ensuring the user's safety, such as the inability to provide illumination in the forward direction of the user and the inability to detect dangerous objects ahead. Accordingly, the home position may be set in an area not behind the user, and from this home position, the robot 110 may provide illumination in the forward direction of the user and detect dangerous objects ahead.

Note that a settings screen according to the embodiment may also include setting fields from both the settings screen 2200 and the settings screen 2300 in a non-redundant way.

The settings screens 2200 and 2300 are examples of a graphical user interface displayed on the screen of a communication terminal.

A setting field 2303 is a field for setting the image design of the eyes of the robot 110 while the security mode "walk" is in effect. An eye image design like the one described with reference to FIG. 15 is set here.

A setting field 2304 is a field for turning on or turning off the control of the behavior performed using the moving element 110e to notify the user about the code of conduct of the robot 110 or that the security mode has been switched. A setting field 2305 is a setting for turning on or turning off the control for causing the audio/video output device 110f to display the logo of the security company A. A setting field 2306 is a setting for turning on or turning off the control for causing the audio/video output device 110f to output the sound logo of the security company A. By turning these settings on, it is possible to cause the robot 110 to control the moving element 110e and the audio/video output device 110f to perform a specific behavior and output a specific sound like in FIG. 9.

Figure 25:
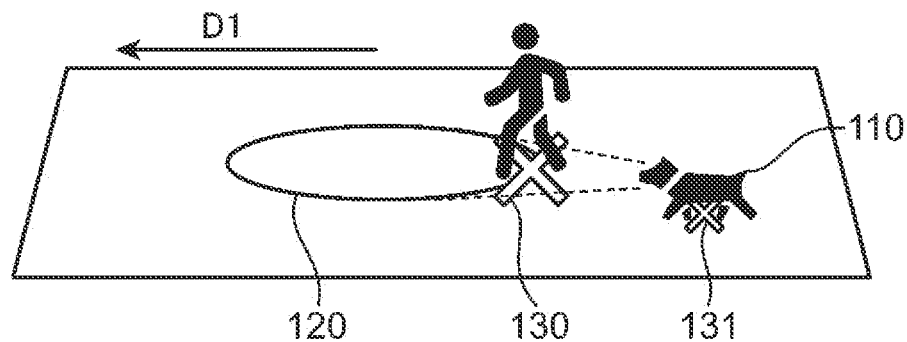
FIG. 25 is a diagram illustrating a first example of a security mode.
Figure 26:
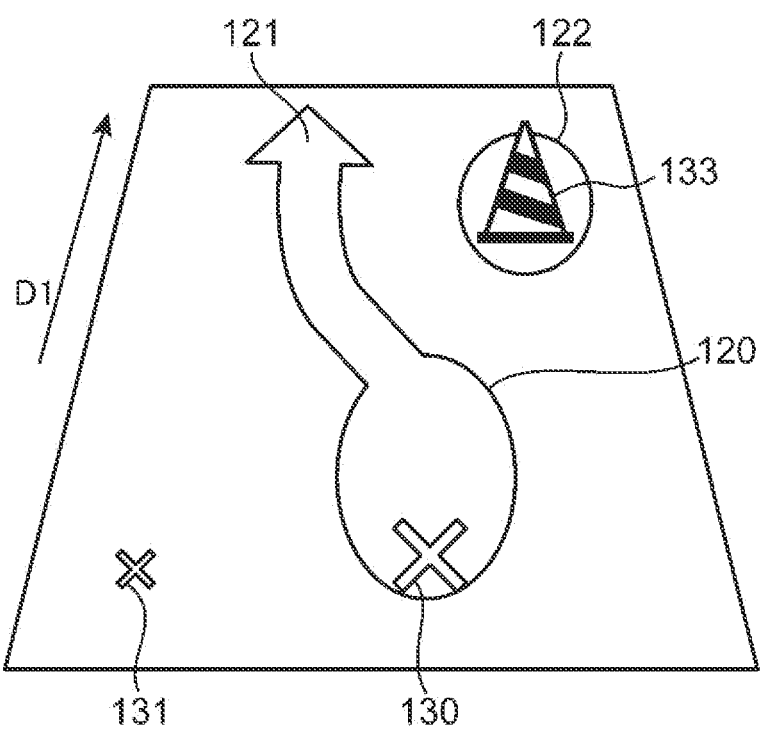
FIG. 26 is a diagram illustrating a first example of a security mode.
Figure 27:
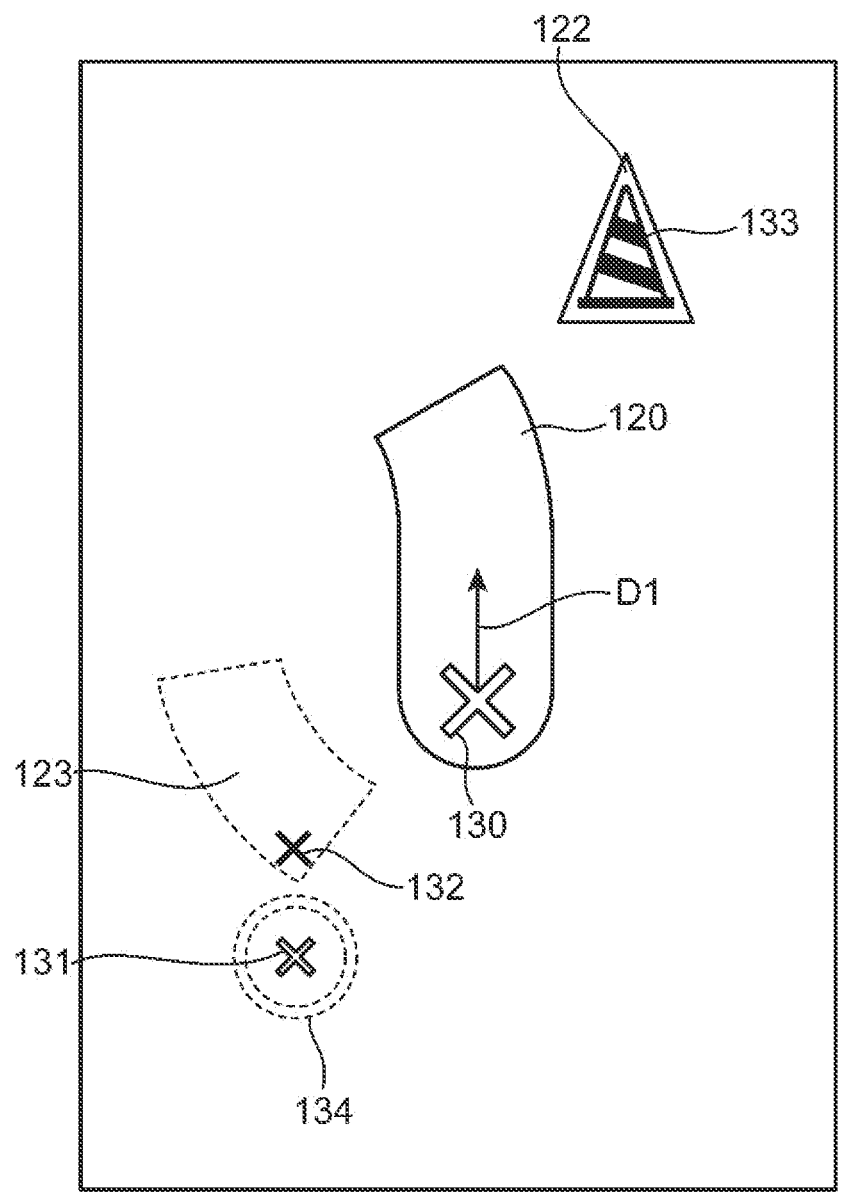
FIG. 27 is a diagram illustrating a first example of a security mode.

FIGS. 25, 26, and 27 are diagrams illustrating a first example of the security mode "walk". FIG. 25 illustrates an example of "illuminate nearby ground" described above. In the example of FIG. 25, the robot 110 is positioned behind the user. In FIG. 25, a robot position 131 which is the center position of the robot 110 is indicated by a small "x" symbol, while a user position 130 which is the center position of the user is indicated by a large "x" symbol. In FIG. 25, the elliptical area extending from the user's feet forward in a movement direction D1 of the user is a nearby ground area 120 where the robot 110 illuminates the ground at the user's feet with the illumination device 110g.

The long-axis direction of the nearby ground area 120 points in the movement direction D1 of the user. By illuminating the nearby ground area 120 in this way, the robot 110 can enable the user to easily see the state of the road surface. Accordingly, the user is able to walk safely with a reduced risk of falling and being injured while on a walk. Note that in the case where a measurement result regarding ambient brightness obtained by the sensors 110c indicates a brightly lit place or daytime, the robot 110 may turn "off" the "illuminate nearby ground" function even if the function is set to "on". Also, in the case where "low battery event information" is issued, the robot 110 may conserve battery power by narrowing the range and lowering the brightness of the nearby ground area 120.

FIG. 26 illustrates an example of "alert user to dangerous objects" described above. In this example, the robot 110 has detected a pylon indicating a restricted area as a dangerous object in the movement direction D1 of the user, and is shining a spotlight on the dangerous object. In this scenario, the necessary security level is 1. A danger area 122 is the area where the robot 110 is illuminating the recognized dangerous object. By causing the illumination device 110g to illuminate the danger area 122, the user can easily see that there is a dangerous object. In the example of FIG. 26, the danger area 122 is a circle of approximately the same size as the dangerous object.

The robot 110 may use a technology such as simultaneous localization and mapping (SLAM) to generate a map of the user's surroundings from sensing data acquired by the sensors 110c. The robot 110 may then use the map to continuously calculate the user position 130, the robot position 131, the positions of dangerous objects, and the like. The robot 110 may calculate the movement direction D1 of the user from the direction that the user is facing, a history of the user position 130, and the like, and determine as a dangerous object an object that is within a prescribed distance to the left or right of the movement direction D1 and also within a prescribed distance ahead in the movement direction D1 from the user position 130.

In addition to the nearby ground area 120, the robot 110 may also illuminate a travel route area 121 indicating a travel route recommended to the user. The travel route area 121 has an arrow shape extending in the forward direction from the nearby ground area 120. The arrow shape has a shape conforming to the travel route recommended for avoiding dangerous objects. With this arrangement, the recommended travel route is illuminated and the user can walk along the recommended travel route. The robot 110 may calculate the recommended travel route on the basis of the user position 130, the robot position 131, a dangerous object position 133, and information about the path width. A path search algorithm for self-driving that calculates a travel route for avoiding dangerous objects is adopted as the process for calculating the recommended travel route, for example.

In this way, in the case where "alert user to dangerous objects" is performed, the robot 110 needs to illuminate not only the nearby ground area 120 but also the travel route area 121 or the danger area 122. For this reason, when the robot 110 illuminates these areas, the robot 110 may move away from the designated home position and to a position where the areas are easily illuminated by the audio/video output device 110f, and assume a pose with which the areas are easily illuminated. In the example in FIG. 27, the robot 110 moves to an emission position 132 diagonally behind to the left of the user and in front of the home position 134 to illuminate a broad range ahead of the user. If there is an area to be illuminated in front, the robot 110 may also move to a position in the front of the user in the area from the left side to the right side.

In the scenario in FIG. 27, the robot 110 has calculated the home position 134 designated in advance on the basis of sensing results regarding the user position 130 and the movement direction D1 of the user, and is escorting the user while positioning itself at the home position 134. The robot 110 senses the surroundings, detects the pylon diagonally ahead to the right as a dangerous object, and bends the leading end of the nearby ground area 120 to the left to guide the user on a travel route that avoids the dangerous object.

Furthermore, the robot 110 is illuminating a triangular danger area 122 fitted to the shape of the pylon treated as a dangerous object. The danger area 122 may be a different color from the nearby ground area 120. For example, the nearby ground area 120 may be white and the danger area 122 may be red. The danger area 122 may also blink to promote user awareness. The blink interval may also vary depending on the distance between the dangerous object and the user. For example, the blink interval may be shortened as the dangerous object and the user get closer to one another. With this arrangement, the user can easily perceive the dangerous object.

The shape, color, and blink pattern of the danger area 122 are not limited to the above, and any appearance may be adopted insofar as the user can distinguish a dangerous object from the surrounding environment. For example, one or more of the shape, color, and blink pattern of the danger area 122 may be controlled. Additionally, one or more of the color and blink pattern of the nearby ground area 120 may also be controlled. In this case, the nearby ground area 120 is controlled differently from the danger area 122.

In FIG. 27, since the user is positioned between the robot 110 and the dangerous object, the robot 110 located at the robot position 131 inside the home position 134 cannot irradiate the nearby ground area 120 and the danger area 122 at the same time, or cannot provide irradiation effectively. Otherwise, there are various possible reasons why the robot 110 would have difficulty irradiating the nearby ground area 120 and the danger area 122 at the same time, such as in the case where the irradiation range of the illumination device 110g of the robot 110 is only in the forward direction of the robot 110, or the case where the illumination device 110g has a structure that cannot radiate light in the opposite direction of the forward direction.

In this way, if it is necessary to irradiate the nearby ground area 120 and the danger area 122 at the same time, but not all of the areas to be irradiated can be irradiated from the home position 134, the robot 110 controls the moving element 110e to temporarily move from the robot position 131 to an emission position 132 suitable for irradiating the nearby ground area 120 and the danger area 122 at the same time. The emission position 132 may be determined as a target position that the robot 110 attempting to change its position relative to the user should reach at a prescribed time.

In the case where the robot 110 newly detects a dangerous object at the emission position 132 after moving and thus detects a plurality of dangerous objects in the movement direction D1 of the user, the robot 110 may determine a new emission position 132 from which a plurality of danger areas 122 irradiating the plurality of dangerous objects and the nearby ground area 120 can be irradiated at the same time, and temporarily move to the newly determined emission position 132.

In FIG. 27, the robot 110 determines an arc-shaped emission area 123 having a certain thickness diagonally behind to the left from the user position 130, determines the emission position 132 inside the emission area 123, moves to the emission position 132, and irradiates the nearby ground area 120 and the danger area 122. The emission area 123 is an area calculated on the basis of the user position 130, the robot position 131, the dangerous object position 133, and the irradiation range of the illumination device 110g, and is an area from which both the danger area 122 and the user position 130 can be irradiated. The emission area 123 may be calculated by the computational device 110b using, for example, a calculation model that accepts the user position 130, the movement direction D1 (or a movement vector indicating both the movement direction and the movement speed), the dangerous object position 133, and the irradiation range of the illumination device 110g as input and outputs the emission area 123.

The emission position 132 is the position inside the emission area 123 that is closest to the robot position 131, for example. However, this is merely an example, the emission position 132 may be any position inside the emission area 123. Note that the robot 110 may also calculate the emission position 132 on the basis of the user position 130, the robot position 131, the dangerous object position 133, and the irradiation range of the illumination device 110g, without calculating the emission area 123. If the irradiation of a dangerous object is no longer necessary, the robot 110 moves back into the home position 134 and continues irradiating the nearby ground area 120 only.

Figure 28:
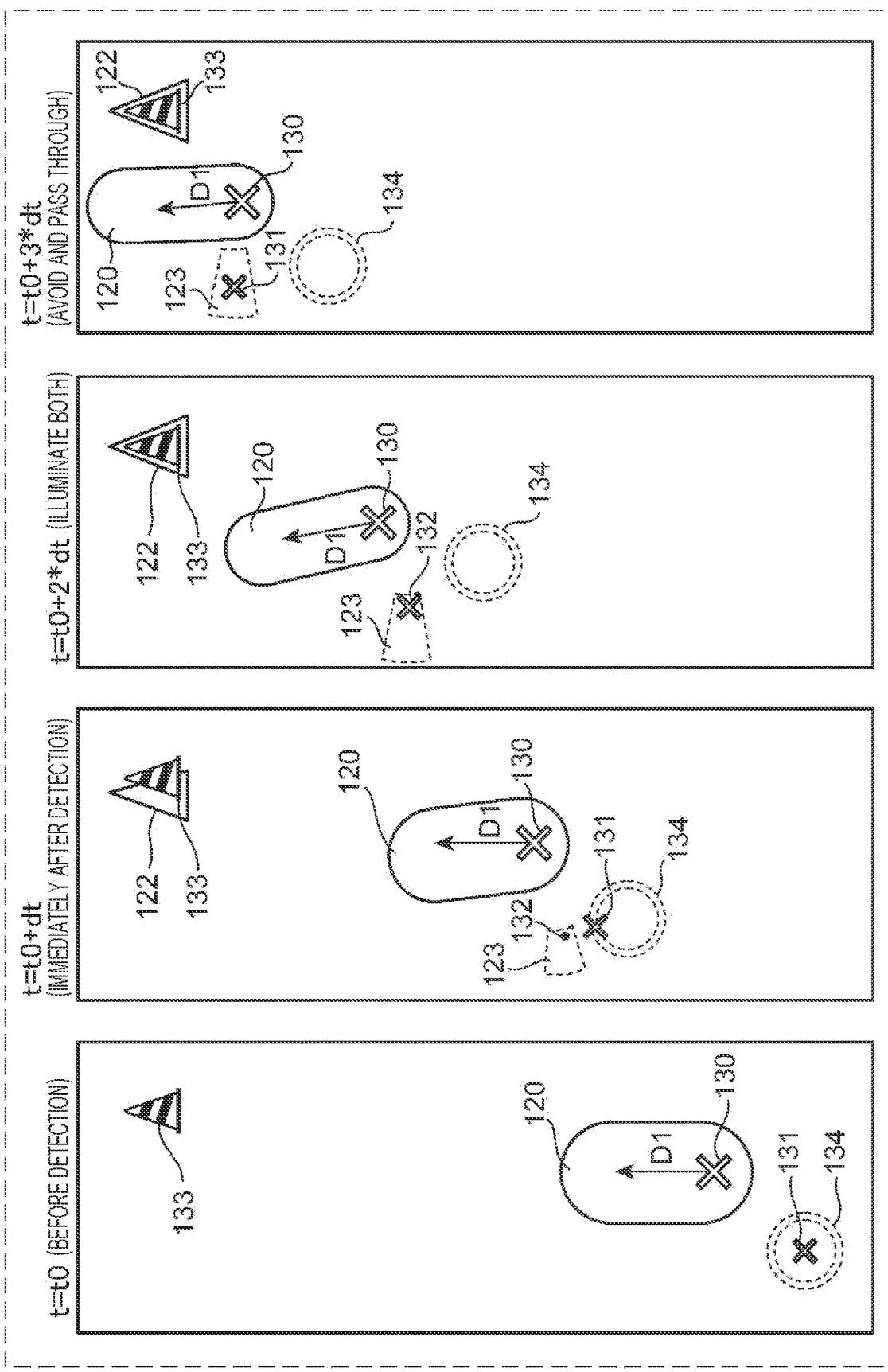
FIG. 28 is a diagram illustrating the behavior of a robot when moving from a home position to an emission position.

FIG. 28 is a diagram illustrating the behavior of the robot 110 when moving from the home position 134 to the emission position 132. At a time to, the robot 110 is not detecting a dangerous object, or is detecting a dangerous object but the distance from the user to the dangerous object is a prescribed distance or longer. Consequently, the robot 110 escorts the user while maintaining the robot position 131 inside the home position 134.

At a time t0+dt, the robot 110 detects a dangerous object, and to irradiate both the dangerous object position 133 and the nearby ground area 120, the robot 110 starts moving from the current robot position 131 to the closest emission position 132 inside the emission area 123 from which both areas can be irradiated effectively. At the same time, the robot 110 directs the long-axis direction of the nearby ground area 120 to the left to guide the user on a travel route that avoids the dangerous object. Furthermore, the robot 110 also starts radiating the danger area 122 toward the dangerous object position 133. However, since the robot 110 has not reached the emission position 132, only a portion of the dangerous object position 133 is irradiated.

At a time t0+2*dt, the robot 110 has moved to the emission position 132. The robot 110 continues detecting the user position 130, the movement direction D1, and the dangerous object position 133, and continues updating the nearby ground area 120 and the danger area 122. The nearby ground area 120 has a shape with the long-axis direction inclined to the left so that the user will avoid the dangerous object. Since the robot 110 has moved to the emission position 132, the danger area 122 is irradiating the entirety of the dangerous object. With this arrangement, the user can recognize the dangerous object and the modified travel route, turn his or her forward direction to the left, and achieve a safe walk that avoids the dangerous object.

At a time t0+3*dt, the user passes by the dangerous object. The robot 110 escorts the user while continuing to detect the user position 130, the movement direction D1, the robot position 131, and the dangerous object position 133, and continuing to update the emission area 123 suitable for irradiating the nearby ground area 120 and the danger area 122 and also update the emission position 132 therein. With this arrangement, the user recognizes the dangerous object and the modified travel route, and passes by the dangerous object.

As illustrated in FIG. 28, the robot 110 continues to irradiate the nearby ground area 120 and the danger area 122 even while moving from the home position 134 to the emission position 132.

Figure 29:
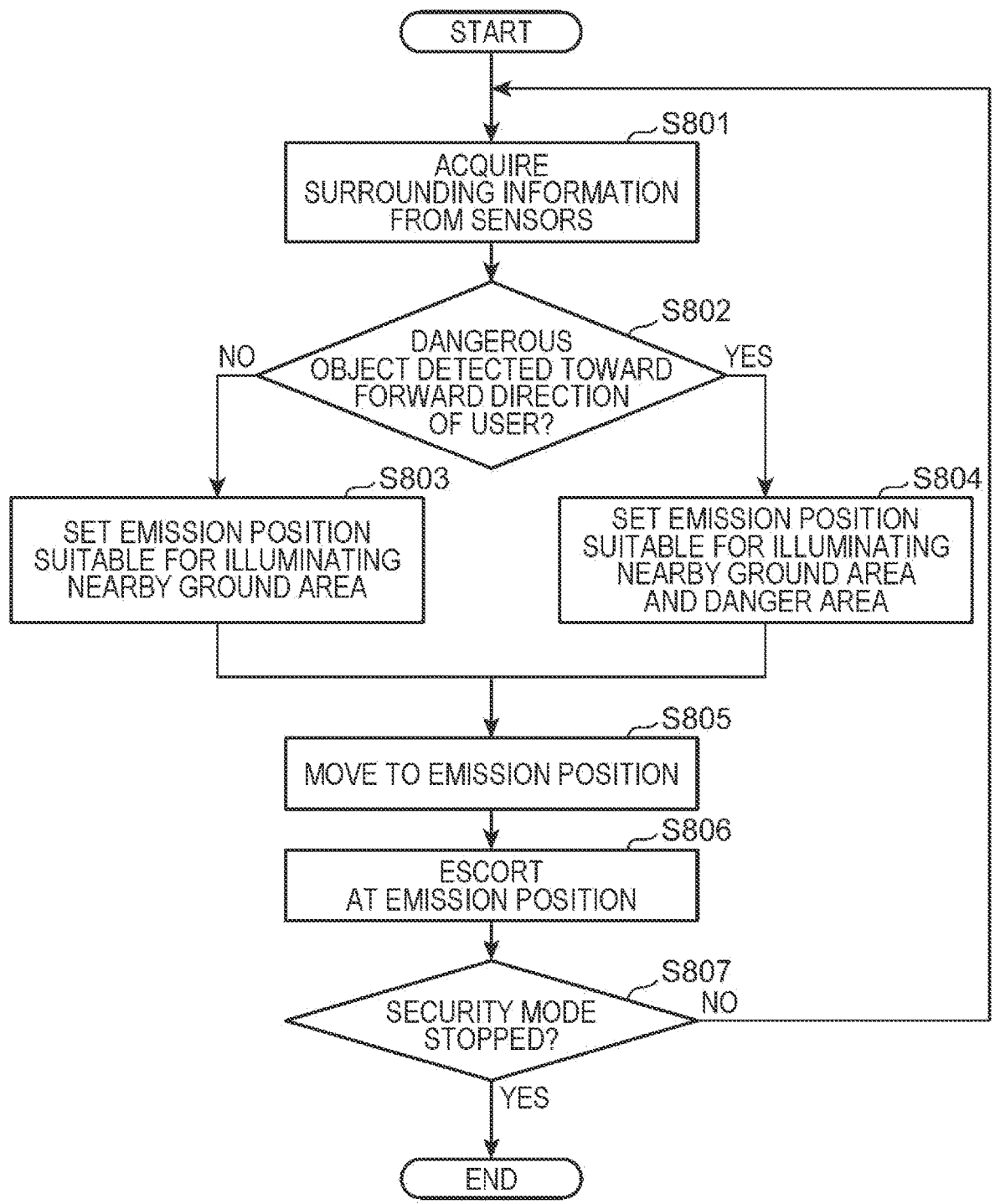
FIG. 29 is a flowchart illustrating an example of a process by a robot in a first example of a security mode.

FIG. 29 is a flowchart illustrating an example of a process by the robot 110 in a first example of the security mode "walk".

(Step S801)

The robot 110 uses the sensors 110c to acquire surrounding information. The surrounding information includes the user position 130, the movement direction D1, the robot position 131, and the dangerous object position 133.

For example, the robot 110 may detect a dangerous object near the user by inputting a camera image acquired by the sensors 110c into a classifier that specifies the type of an object, and detect the dangerous object position 133 by extracting, from a depth image acquired by the sensors 110c, the distance to the detected dangerous object from the robot 110.

Similarly, the robot 110 may detect the user by inputting a camera image acquired by the sensors 110c into a classifier, and detect the user position 130 by extracting, from a depth image acquired by the sensors 110c, the distance to the detected user from the robot 110.

For example, the robot 110 may detect the robot position 131 from location information acquired by a location sensor of the sensors 110c.

For example, the robot 110 may detect the movement direction D1 from the direction the user is facing, which is detected from a history of the user position 130 or a camera image.

(Step S802)

The robot 110 detects whether there is a dangerous object toward the movement direction D1 of the user. If a dangerous object is not detected toward the movement direction D1 of the user (step S802, NO), the process proceeds to step S803, whereas if a dangerous object is detected toward the movement direction D1 of the user (step S802, YES), the process proceeds to step S804. Toward the movement direction D1 of the user refers to ahead of the user. Ahead of the user includes the movement direction D1 of the user and directions included inside an angle range extending 90 degrees to the left and right from the movement direction D1 at the center.

For example, in the case where the detected dangerous object position 133 is located inside a prescribed area ahead of the user, the robot 110 may determine that there is a dangerous object in the forward direction of the user.

(Step S803)

The computational device 110b of the robot 110 sets the necessary security level to 0.

The robot 110 determines the emission position 132 suitable for irradiating the nearby ground area 120. The emission position 132 in this case is basically the home position 134. However, if it is difficult to irradiate the nearby ground area 120 from the preset home position 134, the emission position 132 may also be a sub-home position which is an escort position different from the home position 134.

(Step S804)

The computational device 110b of the robot 110 sets the necessary security level to 1.

The robot 110 determines the emission position 132 suitable for irradiating the nearby ground area 120 and the danger area 122 on the basis of the user position 130, the movement direction D1, the robot position 131, the dangerous object position 133, and the irradiation range of the illumination device 110g. For example, the robot 110 determines the emission area 123 by inputting the user position 130, the movement direction D1, the robot position 131, the dangerous object position 133, and the irradiation range of the illumination device 110g into the calculation model described above. Additionally, if the home position 134 or the sub-home position is not inside the determined emission area 123, the robot 110 calculates the position inside the emission area 123 that is closest to the robot position 131 as the emission position 132. The state in which the home position 134 and the sub-home position are not inside the emission area 123 corresponds to an example in which the emission position 132 is different from the current relative position of the robot 110. If the home position or the sub-home position is inside the emission area 123, the home position or the sub-home position is treated as the emission position 132.

(Step S805)

The robot 110 controls the moving element 110e to move to the emission position 132.

(Step S806)

The robot 110 controls the moving element 110e to escort the user from the emission position 132. The robot 110 continues to calculate the user position 130, the robot position 131, the movement direction D1, and the dangerous object position 133.

(Step S807)

If the security mode "walk" is not stopped (step S807, NO), the robot 110 returns the process to step S801 and continues the process from step S801. If the security mode "walk" is stopped (step S807, YES), the robot 110 ends the process. The security mode "walk" is stopped when the user returns to the at-home area, for example.

The flowchart in FIG. 29 may also include a process for irradiating the nearby ground area 120 only if the "illuminate nearby ground" function described with reference to FIG. 23 is set to "on". The flowchart in FIG. 29 may also include a process for irradiating the danger area 122 only if the "alert user to dangerous objects" function described with reference to FIG. 23 is set to "on".

Figure 30:
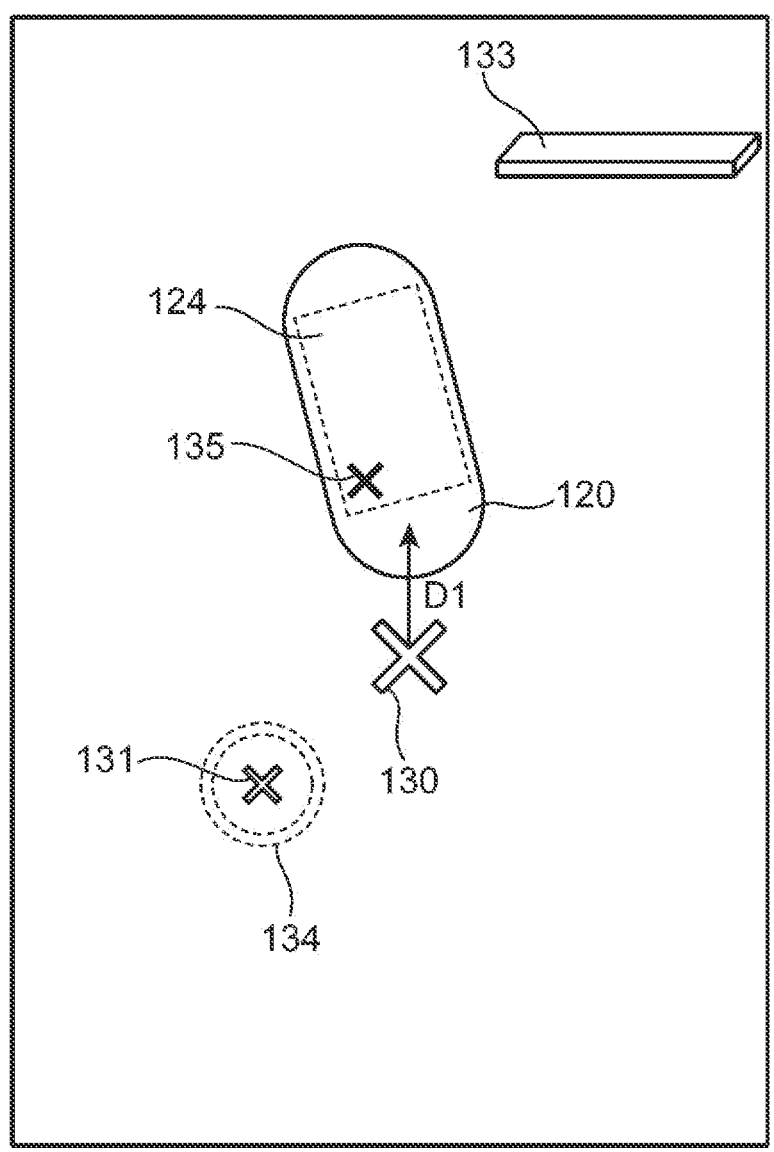
FIG. 30 is a diagram illustrating a second example of a security mode.

FIG. 30 is a diagram illustrating a second example of the security mode "walk". In the second example of the security mode "walk", if a dangerous object is located in the movement direction D1 of the user, the robot 110 sets the robot position 131 to a lead position 135 in a direction ahead of the user in the movement direction (a direction within 90 degrees to the left or right of the movement direction D1) and also different from the movement direction D1, moves to the lead position 135, and escorts the user from the lead position 135. The lead position 135 may be determined as a target position that the robot 110 attempting to change its position relative to the user should reach at a prescribed time.

In the scenario in FIG. 30, the robot 110 has calculated the home position 134 set in advance on the basis of sensing results regarding the user position 130 and the movement direction D1, and is escorting the user while controlling the moving element 110e to position itself inside the home position 134.

The robot 110 senses the surroundings and detects an uneven road surface diagonally ahead to the right as a dangerous object. In this case, the robot 110 calculates the lead position 135 for guiding the user on a travel route recommended to avoid the dangerous object. For example, the robot 110 calculates a recommended travel route using the path search algorithm described above, sets a lead area 124 along the calculated recommended travel route, and calculates the position inside the lead area 124 that is closest to the robot position 131 as the lead position 135.

The lead area 124 is an area of prescribed size along the recommended travel route, located a prescribed distance ahead of the user position 130. Here, the shape of the lead area 124 is rectangular, but this is merely an example, and the shape may also be circular, elliptical, or the like. The lead area 124 may also be an area where the illumination device 110g of the robot 110 can additionally irradiate a dangerous object. The lead position 135 is the position inside the lead area 124 that is closest to the robot position 131, but this is merely an example, and the lead area 124 may be any position inside the lead area 124. The robot 110 continues to irradiate the nearby ground area 120 with light even while moving from the robot position 131 to the lead position 135.

The robot 110 temporarily leaves the home position 134 and escorts the user from the lead position 135 until the user passes the dangerous object. In this example, the dangerous object is located diagonally ahead to the right of the user, and therefore the recommended travel route is pointed diagonally ahead to the left of the user.

Furthermore, in the example of FIG. 30, to guide the user on the recommended travel route, the robot 110 inclines the nearby ground area 120 such that the long-axis direction of the nearby ground area 120 points slightly leftward with respect to the movement direction D1

In this way, the robot 110 moves to the lead position 135 and irradiates the nearby ground area 120 indicating the travel route that the user should follow while guiding the user on the travel route. With this arrangement, the user can avoid dangers such as falling due to the dangerous object. The user follows the guidance provided by the robot 110, and after passing the dangerous object, the robot 110 returns inside the original home position 134 or the sub-home position, and continues to irradiate the nearby ground area 120.

Figure 31:
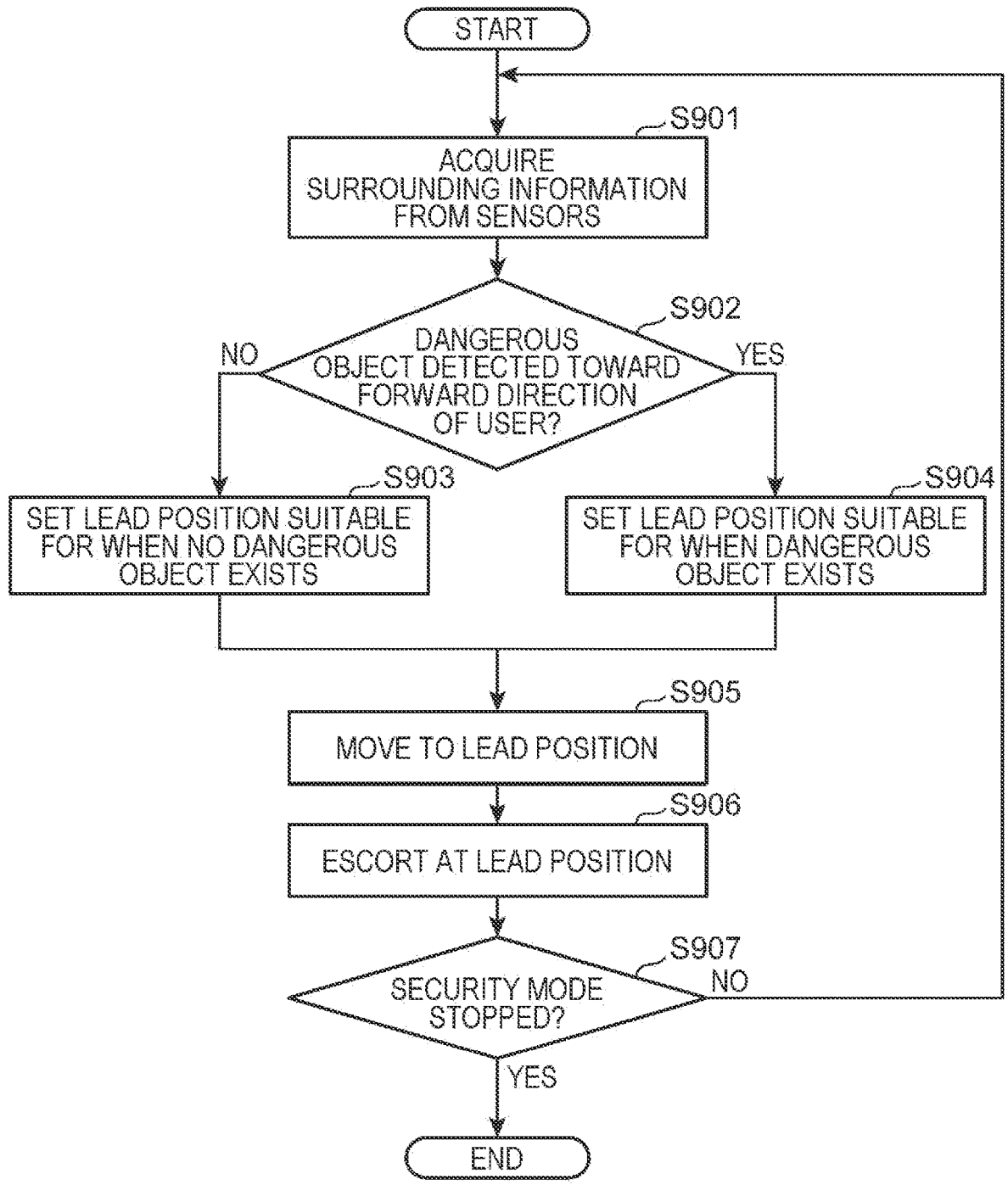
FIG. 31 is a flowchart illustrating an example of a process by a robot in a second example of a security mode.

FIG. 31 is a flowchart illustrating an example of a process by the robot 110 in the second example of the security mode "walk".

Steps S901, S902, and S907 are the same as steps S801, S802, and S807 in FIG. 29.

(Step S903)

The computational device 110b of the robot 110 sets the necessary security level to 0.

The robot 110 sets a lead position 135 suitable for when no dangerous object exists. The lead position 135 is basically the home position 134. However, the lead position 135 may also be the sub-home position if it is difficult to irradiate the nearby ground area 120 from the preset home position 134.

(Step S904)

The computational device 110b of the robot 110 sets the necessary security level to 1.

The robot 110 sets a lead position 135 suitable for when a dangerous object exists. For example, the lead position 135 suitable for when a dangerous object exists is the position inside the lead area 124 that is closest to the robot position 131.

(Step S905)

The robot 110 controls the moving element 110e to move to the lead position 135.

(Step S906)

The robot 110 controls the moving element 110e to escort the user from the lead position 135.

The flowchart in FIG. 31 may also include a process for irradiating the nearby ground area 120 only if the "illuminate nearby ground" function described with reference to FIG. 23 is set to "on". The flowchart in FIG. 31 may also include a process for irradiating the danger area 122 only if the "alert user to dangerous objects" function described with reference to FIG. 23 is set to "on".

Figure 32:
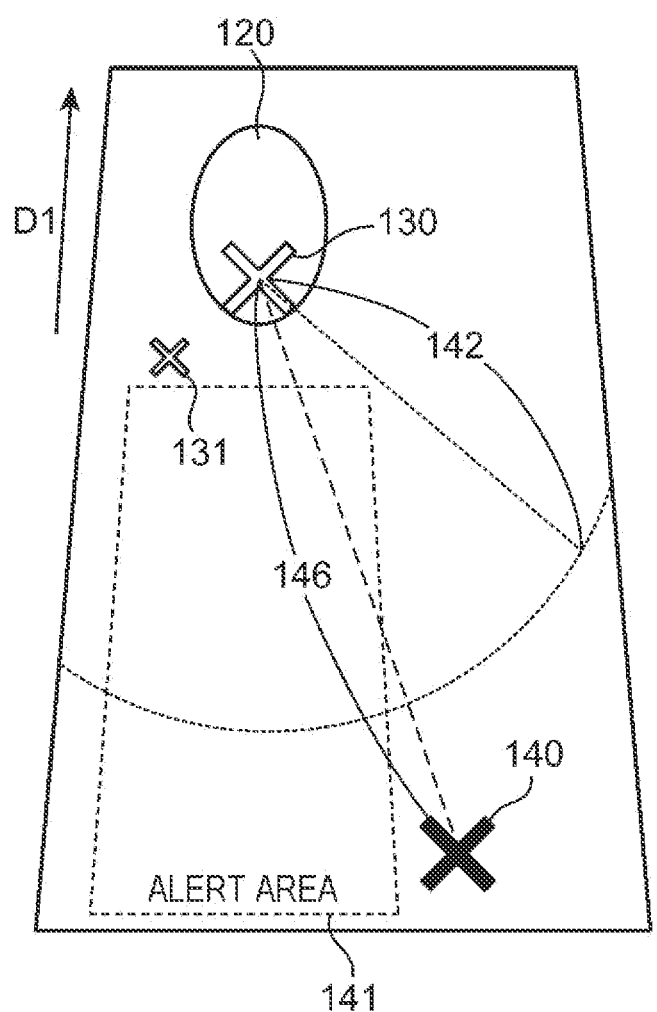
FIG. 32 is a diagram illustrating a third example of a security mode.
Figure 33:
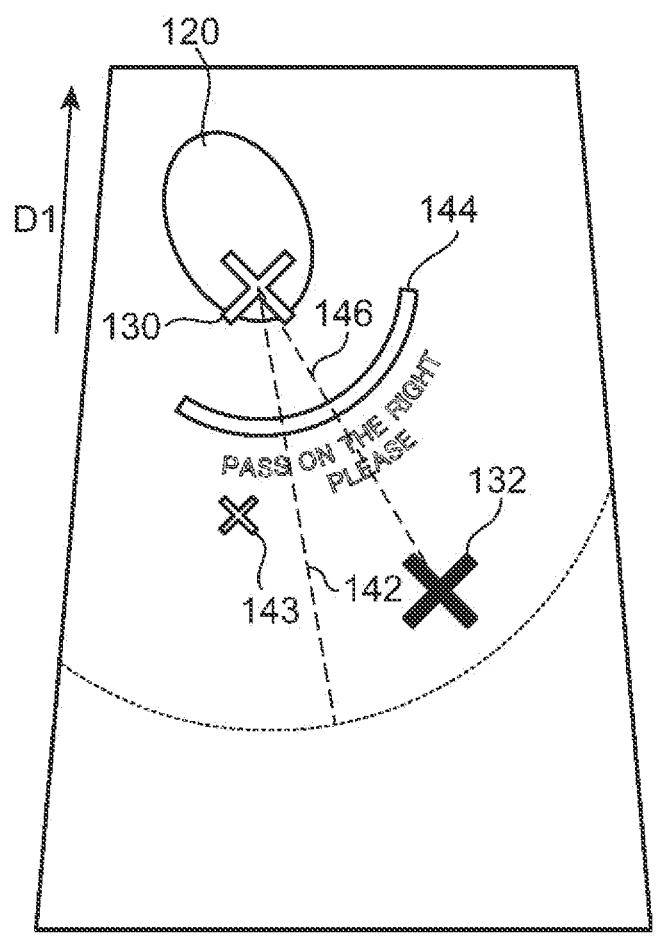
FIG. 33 is a diagram illustrating a third example of a security mode.
Figure 34:
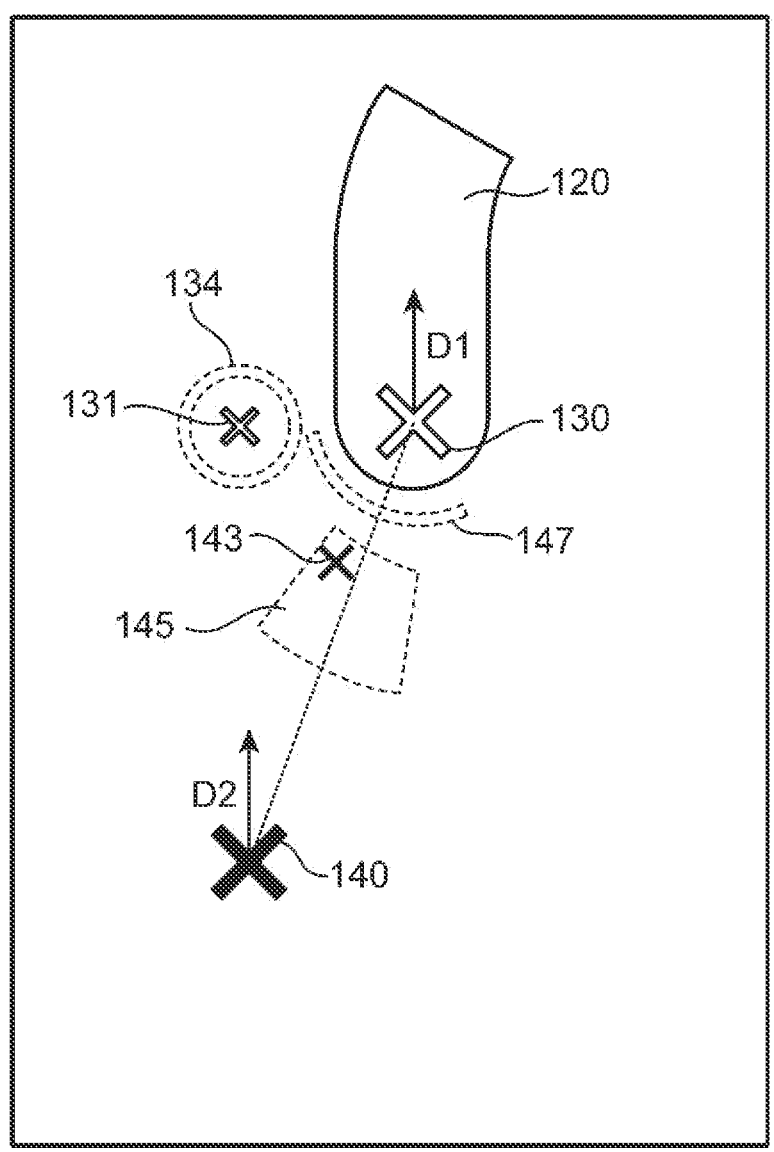
FIG. 34 is a diagram illustrating a third example of a security mode.

Next, a third example of the security mode "walk" will be described. FIGS. 32, 33, and 34 are diagrams illustrating the third example of the security mode "walk". Note that FIG. 34 is a different example from FIGS. 32 and 33. In the third example of the security mode "walk", a moving body exists near the user, and if the moving body comes within the range of a prescribed distance from the user, the robot 110 sets a guard position 143 and escorts the user from the guard position 143. The guard position 143 is a position where the robot 110 is between the user and the moving body. The moving body is a person approaching the user, for example. The guard position 143 may be determined as a target position that the robot 110 attempting to change its position relative to the user should reach at a prescribed time.

In FIG. 32, the large x symbol near the bottom illustrates a person position 140, which is the position of a person approaching the user from behind. In the diagram, the distance 146 between the user position 130 and the person position 140 is greater than an alert radius 142 set by the user, and the person is not alerted.

The robot 110 senses the situation surrounding the user by using a camera image, depth image, infrared image, microphone audio, and the like acquired by the sensors 110c. The robot 110 detects that a person is approaching the user from behind. In this case, the robot 110 sets the guard position 143 (FIG. 33) and controls the moving element 110e to start moving to the guard position 143. The above movement is performed to display information for alerting the person at a position on the road surface between the user and the person approaching the user, and also to maintain the distance 146.

In FIG. 33, the person has further approached the user from behind and the distance 146 is now less than the alert radius 142, and therefore the robot 110 alerts the person. In this scenario, the necessary security level is 2.

The robot 110, having reached the guard position 143 and inserted itself between the user position 130 and the person position 140, uses the illumination device 110g to display alert information at a position on the road surface between the user and the person. In this case, an arc 144 centered on the user position 130 is displayed. With this arrangement, arc 144 can be seen by the person, and the person can be alerted not to approach the user any further. Additionally, the robot 110 displays, near the arc 144, a message to the person. Here, the message "PASS ON THE RIGHT PLEASE" advising the person to pass by on the user's right side is displayed. At the same time, the nearby ground area 120 is changed such that the long axis points in a direction diagonally to the left from the movement direction D1. With this arrangement, the user is guided slightly to the left. Following the guidance, the user shifts to the left. As a result, the person passes the user more easily. In this case, although the nearby ground area 120 is changed, the travel route area 121 (FIG. 26) expressing the travel route of the user is not displayed. The display area of the arc 144 and the message is an example of a notification area between the user and a moving body.

Even if the person has approached the user with malicious intent, it is possible to inform the person that the user's safety is being ensured by the smart and autonomous robot 110, and it can be expected that the person will not harm the user. If the person further approaches the user, or if it is detected that the user feels afraid or agitated, the robot 110 may change the information displayed on the road surface as an alert to a stronger expression or a warning. The user's fear or agitation is detectable by applying an emotion estimation process to a camera image and microphone audio acquired by the sensors 110c. In addition to the display on the road surface, the robot 110 may also use the audio/video output device 110f to output sound or speech that calls out to the person, or sound or speech in a loud voice that intimidates the person. Furthermore, if a dangerous state (necessary security level=3) is determined, the robot 110 may also transmit a report to the company A server 101.

FIGS. 32 and 33 can be applied similarly to the case where a moving body other than a person approaches the user. Moving bodies other than a person include, for example, human-driven cars, bicycles, and flight vehicles (drones), and computer-controlled flight vehicles and ground vehicles that move autonomously.

In FIG. 32, instead of the alert radius 142, an alert area 141 behind the user position 130 may also be adopted. For example, the robot 110 may issue the alert described above if a person advancing in the same forward direction as the user is detected inside the alert area 141. This arrangement makes it possible to alert only a person who has a high likelihood of contacting the user if he or she continues to advance forward. As a result, there is a reduction in alerting persons with a low likelihood of harming the user. The alert area 141 is an area of prescribed size a prescribed distance behind the user position 130.

In FIG. 34, the robot 110 has calculated the home position 134 on the basis of sensing results regarding the user position 130 and the movement direction D1, and is escorting the user from the home position 134. The robot 110 senses the surroundings and detects a person approaching the user from diagonally behind to the left. The robot 110 calculates a travel route for creating distance from the user, and alters the shape of the nearby ground area 120 to guide the user on the travel route. In this case, a travel route guiding the user diagonally ahead to the right is calculated, and the nearby ground area 120 has a shape with the leading end pointed diagonally ahead to the right to guide the user on the travel route. With this arrangement, the person diagonally behind to the left can be kept away from the user.

In the diagram, the robot 110 is positioned at the home position 134 just beside the user position 130, and therefore cannot insert itself between the user and the person while also irradiating the nearby ground area 120.

Accordingly, if the robot 110 determines that it is necessary to insert itself between the person approaching the user and the user to issue an alert, the robot 110 controls the moving element 110e to move toward the guard position 143, which is inside a guard area 145 suitable for getting between the person and the user, and from which the robot 110 can irradiate the nearby ground area 120 at the user's feet.

The robot 110 may determine that an alert is necessary if a person satisfying an alert condition is present near the user. The alert condition is, for example, the presence of a person approaching a circle prescribed by the alert radius 142, the presence of a person inside the circle prescribed by the alert radius 142, the presence of a person near the alert area 141, the presence of a person inside the alert area 141, and the user uttering speech or performing a gesture for requesting protection.

The robot 110 may determine that a person approaching the circle prescribed by the alert radius 142 or the alert area 141 is present if a movement direction D2 of the person within a prescribed distance is pointed toward the circle prescribed by the alert radius 142 or the alert area 141. The robot 110 may determine that a person is present inside the circle prescribed by the alert radius 142 or the alert area 141 if the person position 140 is inside the circle prescribed by the alert radius 142 or the alert area 141.

The robot 110, having determined that the person satisfies the alert condition, sets the guard position 143 and temporarily moves to the guard position 143. The robot 110 may also continue to irradiate the nearby ground area 120 with light even while moving from the home position 134 or the sub-home position to the guard position 143.

When an alert is no longer necessary, the robot 110 leaves the guard position 143, returns to the home position 134, and continues to escort the user from the home position 134. Note that the robot 110 may also return to the home position 134 if the robot 110 detects speech or a gesture from the user indicating that protection is unnecessary.

In the example of FIG. 34, the position which is inside the thick arc-shaped guard area 145 positioned midway between the user position 130 and the person position 140 and which is closest to the robot position 131 is set as the guard position 143.

Note that if it is determined that an alert is necessary, the robot 110 may prioritize moving to the guard position 143 over irradiating the nearby ground area 120. In this case, the nearby ground area 120 may be partially missing or darkened, but by having the robot 110 insert itself between the person approaching the user and the user, it is possible to make the person aware that the user is being guarded by the robot 110, thereby raising the user's safety further.

Furthermore, the robot 110 may display, on the road surface, a warning 147 that advises the approaching person to keep a certain distance from the user. The warning 147 may be a mark or characters for guiding the walking route of the person, for example. The mark is the mark of the security company A, for example. In this case, the robot 110 may move to a position inside the midway area between the user position 130 and the person position 140, and from that position, irradiate the nearby ground area 120 at the user's feet and display the warning 147. The display area of the warning 147 is an example of a notification area between the user and a moving body.

Note that the robot 110 may also display the warning 147 on a display of the audio/video output device 110*f* included in the robot 110.

Figure 35:
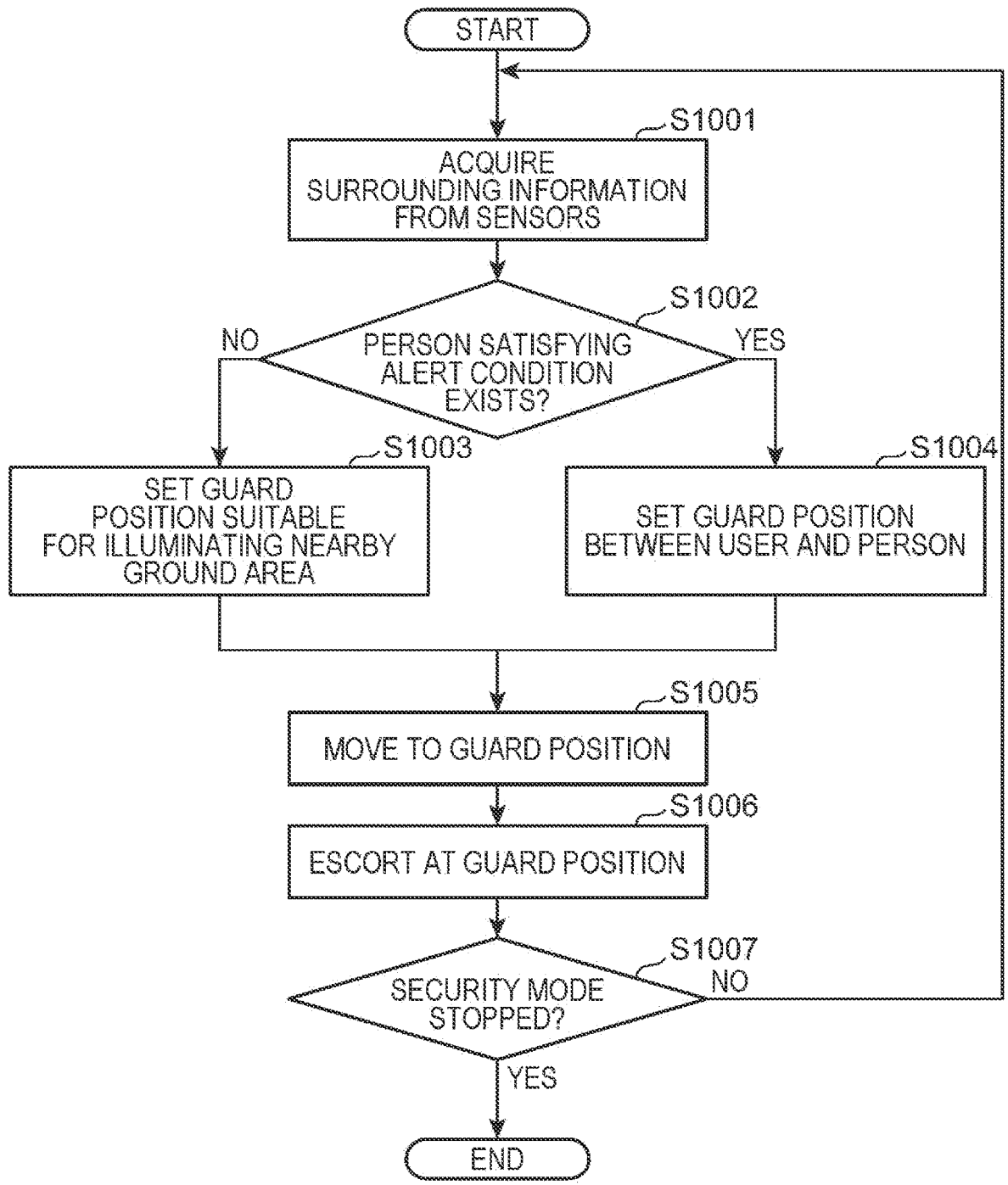
FIG. 35 is a flowchart illustrating an example of a process by a robot in a third example of a security mode.

FIG. 35 is a flowchart illustrating an example of a process by the robot 110 in the third example of the security mode "walk".

Steps S1001 and S1007 are the same as steps S801 and S807 in FIG. 29.

(Step S1002)

The robot 110 determines whether a person satisfying the alert condition exists. If a person satisfying the alert condition exists (step S1002, YES), the process proceeds to step S1004, whereas if a person satisfying the alert condition does not exist (step S1002, NO), the process proceeds to step S1003.

(Step S1003)

The computational device 110*b* of the robot 110 sets the necessary security level to 1 or lower.

The robot 110 determines the guard position 143 suitable for illuminating the nearby ground area 120. The guard position 143 in this case is basically the home position 134. However, the guard position 143 may also be the sub-home position if it is difficult to irradiate the nearby ground area 120 from the home position 134.

(Step S1004)

The computational device 110*b* of the robot 110 sets the necessary security level to 2.

The robot 110 sets the guard position 143 between the user position 130 and the person position 140. First, the robot 110 sets the guard area 145 between the user position 130 and the person position 140. The guard area 145 is an area between the user position 130 and the person position 140, and may also be an area from which the illumination device 110*g* can irradiate the nearby ground area 120, the notification area, or both areas with light. For example, the guard area 145 is calculated on the basis of the user position 130, the movement direction D1, the person position 140, and the irradiation range of the illumination device 110*g*. The guard area 145 may also be determined using a calculation model that accepts the user position 130, the movement direction D1, the person position 140, and the irradiation range of the illumination device 110*g* as input and outputs the guard area 145.

Alternatively, the guard area 145 may be an arc-shaped area which is centered on the midpoint between the user position 130 and the person position 140, and which has a thickness of prescribed size with a radius equal to or less than the distance between the user position 130 and the person position 140. Additionally, if the home position 134 or the sub-home position is not inside the determined guard area 145, the robot 110 calculates the position inside the guard area 145 that is closest to the robot position 131 as the guard position 143. The guard position 143 is not limited to the above and may be any position inside the guard area 145.

The state in which the home position 134 and the sub-home position are not inside the guard area 145 corresponds to an example in which the emission position (guard position 143) is different from the current relative position of the robot 110. If the home position 134 or the sub-home position is inside the guard area 145, the home position 134 or the sub-home position is treated as the guard position 143.

(Step S1005)

The robot 110 controls the moving element 110*e* to move to the guard position 143.

(Step S1006)

The robot 110 escorts the user from the guard position 143. At the same time, the robot 110 uses the audio/video output device 110*f* or the illumination device 110*g* to notify the person approaching the user with an alert or a warning.

The flowchart in FIG. 35 may also include a process for irradiating the nearby ground area 120 only if the "illuminate nearby ground" function described with reference to FIG. 23 is set to "on". The flowchart in FIG. 35 may also include a process for irradiating the danger area 122 only if the "alert surroundings" function described with reference to FIG. 23 is set to "on".

Figure 36:
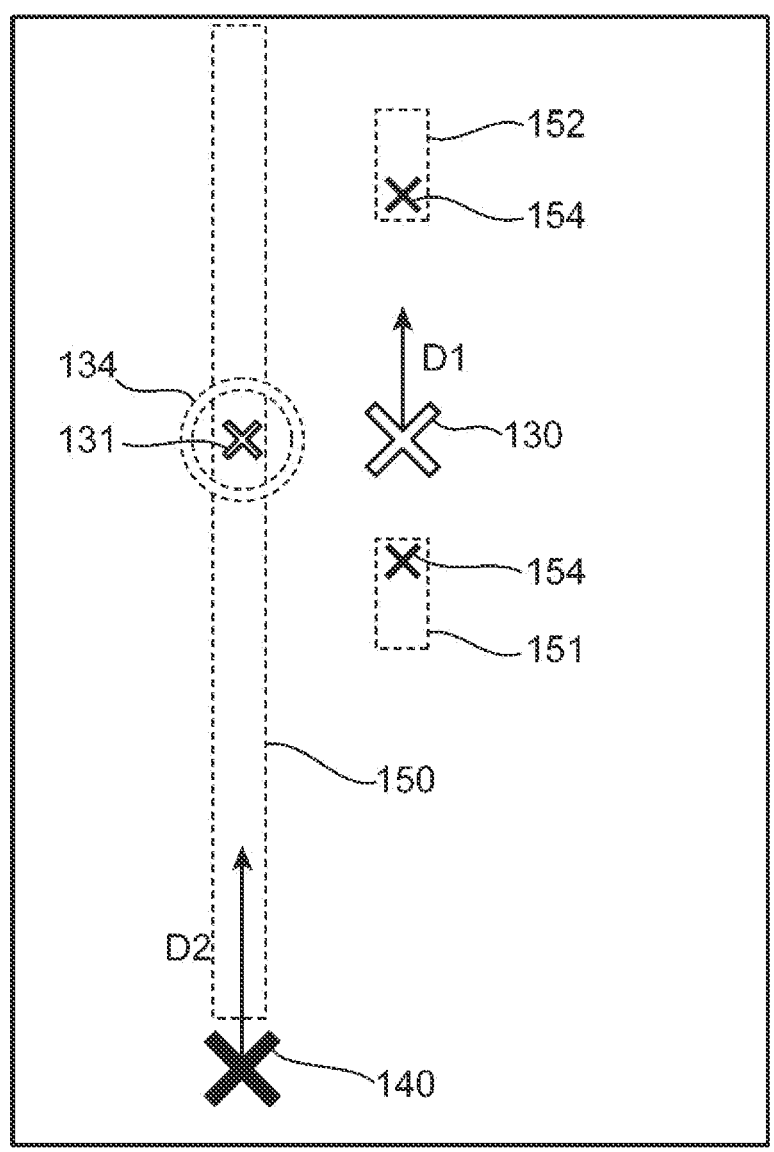
FIG. 36 is a diagram illustrating a situation in which a robot avoids a person approaching a user.

FIG. 36 is a diagram illustrating a situation in which the robot 110 avoids a person approaching the user.

In FIG. 36, the computational device 110b of the robot 110 has calculated the home position 134 on the basis of sensing results regarding the user position 130 and the movement direction D1, and is controlling the moving element 110e to escort the user from the home position 134. The robot 110 senses the surroundings and detects a person approaching the user from diagonally behind to the left.

The robot 110 continuously updates a predicted path 150 of the person approaching the user according to the sensing results, and determines whether the person will pass by the user within a prescribed time. If it is determined that the passing by will occur within the prescribed time, the robot 110 sets an avoidance position 154 inside an avoidance area 152 ahead, or inside an avoidance area 151 behind, in the movement direction D1 of the user. The avoidance position 154 may be determined as a target position that the robot 110 attempting to change its position relative to the user should reach at a prescribed time. Thereafter, the robot 110 leaves the home position 134 and moves to the avoidance position 154. With this arrangement, the robot 110 can move to a position that does not obstruct the passing of the person close to the user.

The avoidance areas 151 and 152 are areas at least a prescribed distance away from the predicted path 150 of the person, the predicted path 150 being predicted from the person position 140 and the movement direction D2 of the person, for example. In particular, in the case where the width of the walkway is narrow, the avoidance area 151 is positioned directly behind the user, and the avoidance area 152 is positioned directly in front of the user.

Such behavior of the robot 110 is effective for allowing the user and a person approaching from in front or behind the user in the movement direction D1 of the user to pass by each other without obstructing the path of either the user or the person. By lining up the user and the robot 110 in single-file in the movement direction D1 at the timing when the user and the person pass by each other, the width of the walkway is not occupied as much and the influence on the path of the person passing by is minimized. This behavior is effective not only on narrow walkways but also when the robot 110 escorts the user in places where there are many people around the user.

If person approaching the user from either in front or behind exists, the robot 110 may move to the avoidance area 151 or the avoidance area 152. For example, if a person approaching the user from behind exists, the robot 110 may move to the avoidance position 154 inside the avoidance area 151. With this arrangement, the person can be made aware that the robot 110 is escorting the user. Furthermore, in this case, it can be expected that the person will be discouraged from acts that would harm the user.

If the robot 110 does not take avoidance action, the person passing by the user will have to change their travel route to avoid the robot 110. This change inconveniences the person and has an adverse influence on the psychological and physical well-being of the person. Accordingly, by causing the robot 110 to take the avoidance action described, such adverse influence can be minimized.

The robot 110 may determine whether to set the avoidance position 154 to a position inside the avoidance area 151 or to a position inside the avoidance area 152 by considering one or more factors such as whether the user's risk of falling can be avoided by irradiating the nearby ground area 120 and whether the user's safety can be increased by the robot 110 positioning itself between an approacher and the user.

Figure 37:
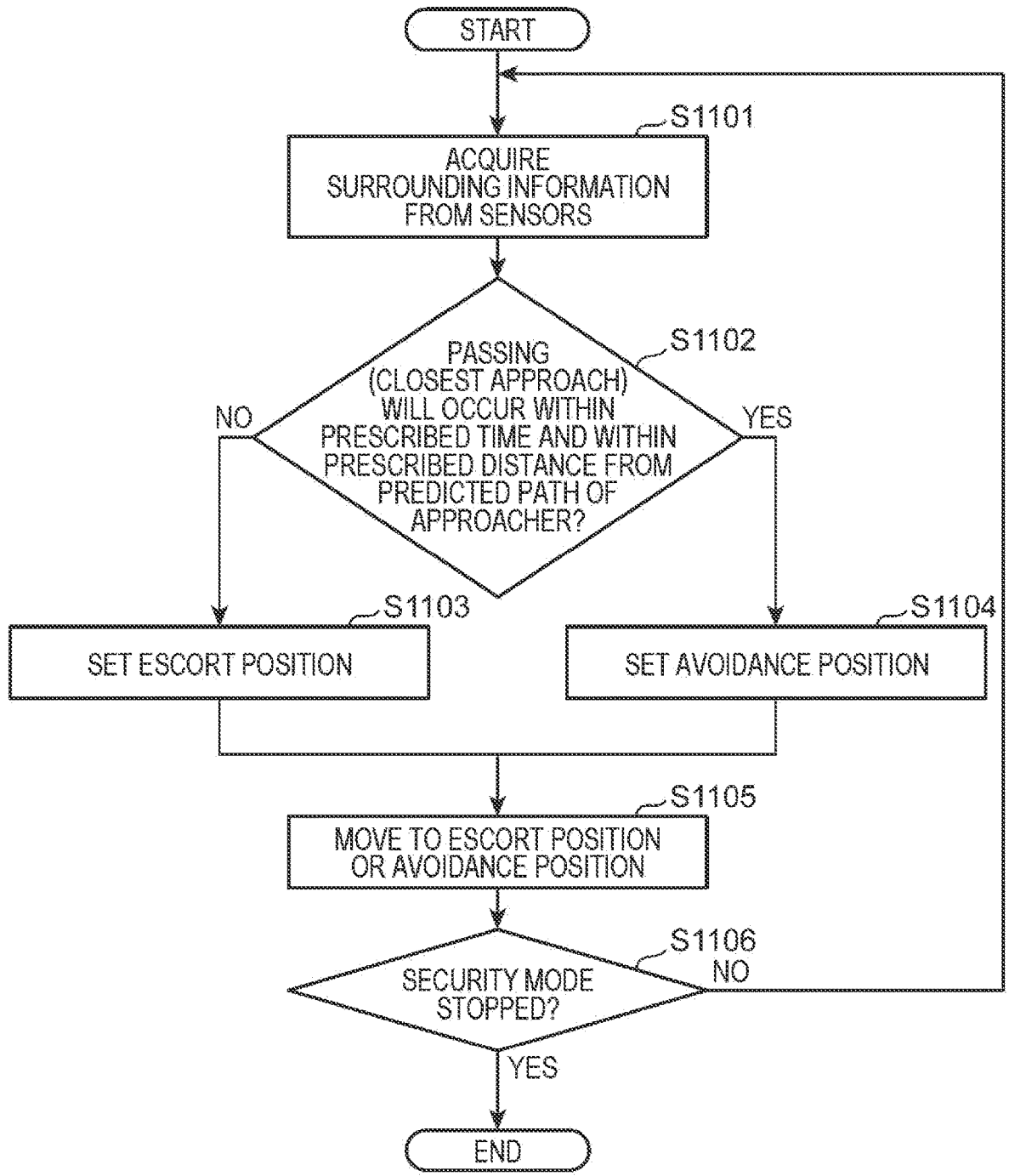
FIG. 37 is a flowchart illustrating an example of a process by a robot when the robot avoids a person approaching a user.

FIG. 37 is a flowchart illustrating an example of a process by the robot 110 when the robot 110 avoids a person approaching the user. In FIG. 37, steps S1101 and S1106 are the same as steps S801 and S807 in FIG. 29.

(Step S1102)

The robot 110 determines whether the person will pass by the robot 110 within a prescribed time, and whether the distance between the person and the robot 110 is within a prescribed distance. For example, the robot 110 calculates a passing position where the person and the robot 110 will pass by each other from the trail of the predicted path of the person calculated from sensing results. The passing position is the position on the trail where the person will come closest to the user position 130. The robot 110 calculates the passing time by dividing the distance on the trail from the person position 140 to the passing position location by the speed of the person calculated from sensing results. Additionally, if the passing time is within a prescribed time, the robot 110 may determine that the person and the robot 110 will pass by each other within the prescribed time. Furthermore, if the distance between the person position 140 and the robot position 131 is within the prescribed distance, the robot 110 may determine that the distance between the user and the robot 110 is within the prescribed distance.

If the determination is positive (step S1102, YES), the process proceeds to step S1104, whereas if the determination is negative (step S1102, NO), the process proceeds to step S1103. Note that the robot 110 may also execute the process in step S1102 by considering only the distance between the person and the user, without considering the passing time.

(Step S1103)

The computational device 110b of the robot 110 sets the necessary security level to 1 or higher.

The robot 110 sets the escort position. The escort position is basically the home position 134. However, the sub-home position is set as the escort position if it is difficult to irradiate the nearby ground area 120 from the home position 134.

(Step S1104)

The computational device 110b of the robot 110 sets the necessary security level to 2 or higher.

The robot 110 sets the avoidance position 154. For example, if a person approaches the user from behind, the robot 110 may set the avoidance area 151 directly behind in the movement direction D1 of the user, and set the avoidance position 154 inside the avoidance area 151. The avoidance area 151 is an area of prescribed size a prescribed distance away from the user position 130 in the opposite direction of the movement direction D1 of the user. The avoidance area 152 is an area of prescribed size a prescribed distance away from the user position 130 in the forward direction of the user. The avoidance position 154 is the position inside the avoidance area 151 or the avoidance area 152 that is closest to the escort position. However this is merely an example, and the avoidance position 154 may be any position inside the avoidance area 151 or the avoidance area 152.

(Step S1105)

The robot 110 controls the moving element 110e to move to the escort position or the avoidance position 154. In this way, in the case where the user and another person pass by each other, the robot 110 can appropriately change the position of escorting so as not to obstruct the progress of the other person.

Next, the basic functionality of the escorting robot 110 will be described. In the basic functionality, the robot 110 acquires setting information from the smartphone 100 (one example of a communication terminal carried by the user) over a network. The setting information is information inputted by the user operating a graphical user interface displayed on the settings screen 2200 or the settings screen 2300. On the basis of the setting information, the robot 110 sets the home position 134 of the robot 110, detects the user position 130 and the movement direction D1 via the sensors 110c, and escorts the user from the home position 134. The home position 134 is a standard relative position where the robot is to be positioned by default.

Figure 38:
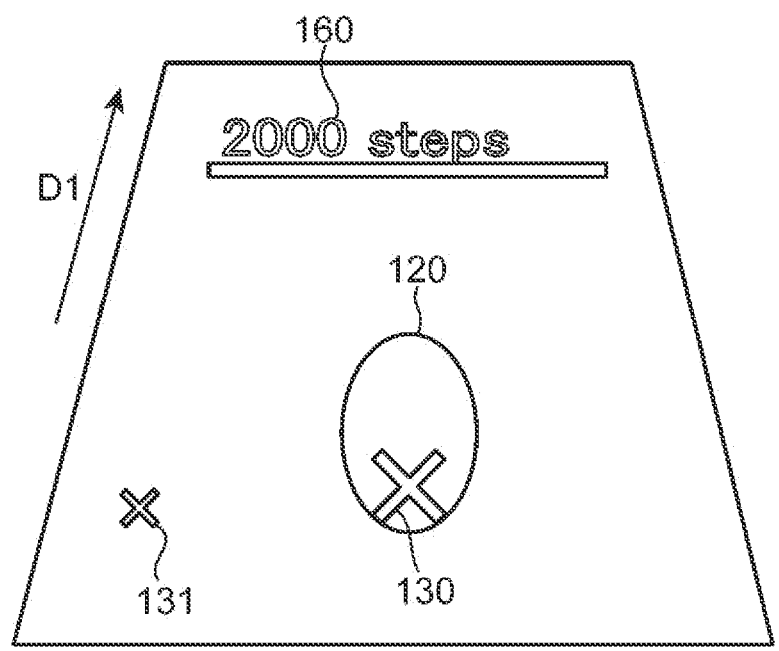
FIG. 38 is a diagram illustrating an example of a basic function of an escorting robot.

FIG. 38 is a diagram illustrating an example of the basic functionality of the escorting robot 110. In this example, the robot 110 is positioned at the robot position 131 on the left side of the user position 130. The robot 110 uses the illumination device 110g to display walk information 160 on the road surface in front of the user position 130. The walk information 160 may also a goal line and a message related to the goal line. This information indicates the number of steps since the user started the walk or the number of steps that the user has taken today, for example. Here, it is assumed that "2000 steps", which indicates that the user has taken 2000 steps since starting the walk, is displayed as the message related to the goal line. With this arrangement, the user can intuitively understand that by walking to the goal line, he or she will achieve 2000 steps. In this scenario, the computational device 110b of the robot 110 sets the necessary security level to 0.

By notifying the user with the walk information 160 that quantitatively indicates an exercise milestone, such as a target number of steps or an achieved number of steps, the user's motivation with respect to walking (exercise) is increased. The walk information 160 is not limited to the above, and a target number of steps for the walk, a target calorie expenditure for the walk, a target walking time for the walk, the number of steps taken since beginning the walk, the number of steps taken today, the remaining number of steps until today's target number of steps is reached, the user's heart rate, the user's calorie expenditure, the elapsed time of the walk, and/or the predicted time remaining on the walk may also be displayed.

The robot 110 may also use the audio/video output device 110f to output audio information or video information indicating the target number of steps, the remaining number of steps until the target number of steps is reached, the calorie expenditure, and the elapsed time. Furthermore, the robot 110 may use the audio/video output device 110f to output speech expressing a message of encouragement to the user, such as "Keep going!".

(Modifications)

(1) The robot 110 may also have wheels instead of the legs 17. In this case, the robot 110 may drive the wheels to escort the user. Furthermore, the robot 110 may also have the legs 17 and wheels.

(2) The actions of the user escorted by the robot 110 are not limited to walking and may also be movement involving the user's legs, such as jogging, or movement involving the user's hands, such as movement by wheelchair or canoe, but does not include movement by car or train in which the user's amount of exercise is excessively low.

(3) FIG. 36 illustrates a person as an example of a moving body that approaches the user, but the moving body is not limited to a person and may also be a car, a bicycle, or a flight vehicle such as a drone.

(4) In the description of FIG. 6 and thereafter, two modes (at home and walk) are described as the security modes activated on the basis of the location of the user and the robot 110, but the security modes are not limited thereto, and there may also be three or more modes (for example, at home, walk, and general going out). Also, the security mode "at home" applied when the user is at home in the above description may be a mode in which security is not provided.

The present disclosure can attain a fusion between cyberspace and physical space, and therefore is useful as a fundamental technology for a wide variety of industrial applications.

What is claimed is:

1. A method for controlling a robot that accompanies a user, the method comprising:
   detecting, through at least one sensor included in the robot, a location and a movement direction of the user who is moving, and an object around the user;
   setting, based on the location and the movement direction of the user, a nearby ground area in front at the feet of the user;
   controlling an illumination device included in the robot to irradiate the nearby ground area with light while driving at least one pair of legs or wheels of the robot to cause the robot to accompany the user;
   specifying a type and a location of the detected object; and
   controlling, in a case where the object is a dangerous object and is located in the movement direction of the user, the illumination device to irradiate a new nearby ground area with light to guide the user to change the movement direction, the new nearby ground area being located in front at the feet of the user and in a direction different from the movement direction.

2. A robot comprising:
   a main body;
   the at least one pair of legs or wheels;
   an actuator that drives the at least one pair of legs or wheels;
   the at least one sensor;
   the illumination device including at least one light source;
   a processor; and
   a memory storing a program causing the processor to execute the method according to claim 1.

3. A non-transitory computer-readable medium storing a program causing a processor installed in the robot to execute the method according to claim 1.

* * * * *